US006317438B1

(12) United States Patent
Trebes, Jr.

(10) Patent No.: US 6,317,438 B1
(45) Date of Patent: Nov. 13, 2001

(54) SYSTEM AND METHOD FOR PROVIDING PEER-ORIENTED CONTROL OF TELECOMMUNICATIONS SERVICES

(76) Inventor: Harold Herman Trebes, Jr., 1361 Middlessex Ave., NE., Atlanta, GA (US) 30306

( * ) Notice: Subject to any disclaimer, the term of this patent is extended or adjusted under 35 U.S.C. 154(b) by 0 days.

(21) Appl. No.: 09/291,485

(22) Filed: Apr. 14, 1999

Related U.S. Application Data

(60) Provisional application No. 60/081,710, filed on Apr. 14, 1998.

(51) Int. Cl.[7] .................................. H04S 3/16; H04S 3/22
(52) U.S. Cl. ......................... 370/466; 370/395; 370/410; 370/351
(58) Field of Search ..................................... 370/395, 397, 370/399, 400, 401, 408, 409, 410, 254, 465, 460, 351; 709/220, 221, 222

(56) References Cited

U.S. PATENT DOCUMENTS

| 5,412,797 | * | 5/1995 | Rubin .................................... 709/303 |
| 5,949,780 |   | 9/1999 | Gopinath . |
| 5,991,301 | * | 11/1999 | Christie ................................. 370/395 |
| 6,014,378 | * | 1/2000 | Christie et al. ....................... 370/356 |
| 6,026,091 | * | 2/2000 | Christie et al. ....................... 370/395 |
| 6,078,586 | * | 6/2000 | Dugan et al. ......................... 370/395 |

* cited by examiner

*Primary Examiner*—Ajit Patel
(74) *Attorney, Agent, or Firm*—Troutman Sanders LLP; R. Steven Coursey

(57) ABSTRACT

In a telecommunications network environment including non-participating elements and participating elements, a method for providing a telecommunications service between a first peer element connected to the telecommunications network environment and a second peer element connected to the telecommunications network. At a first peer element, an indication of the type of telecommunications service to be provided between the first peer element and the second peer element is received. A telecommunications service template in association with the indicated telecommunications service is determined, the telecommunications service template including instructions for configuring the non-participating elements of the telecommunications network environment to provide the indicated telecommunications service and instructions for configuring the participating elements of the telecommunications network environment. The telecommunications service template may further comprise routing instructions for the non-participating elements of the telecommunications network environment and routing instructions for the participating elements of the telecommunications network environment. The instructions to configure the participating elements and non-participating elements of the telecommunications network environment are executed to provide the telecommunications service.

11 Claims, 97 Drawing Sheets

FIG. 2A

| Application Environment | Peer Control Requests | Pre-transformed Data | | |
|---|---|---|---|---|
| Peer Control Messages | Peer Control | Peer Control Messages | Peer Control Messages<br><br>Peer Signaling | Network Signaling Messages |
| Pre-transformed Data | | Stream Functions and AAL | Post-transformed Data | |
| | Peer Control Messages<br><br>Peer Signaling | Post-transformed Data | Control/Data Mux-DeMux | Multiplexed Peer Control and Data |
| | Network Signaling Messages | | Multiplexed Peer Control and Data | Communications Controller |

FIG. 2B

| Server Environment | Peer Control Requests | Pre-transformed Data | | |
|---|---|---|---|---|
| Peer Control Messages | Peer Control | Peer Control Messages | Peer Control Messages<br><br>Peer Signaling | Network Signaling Messages |
| Pre-transformed Data | | Stream Functions and AAL | Post-transformed Data | |
| | Peer Control Messages<br><br>Peer Signaling | Post-transformed Data | Control/Data Mux-DeMux | Multiplexed Peer Control and Data |
| | Network Signaling Messages | | Multiplexed Peer Control and Data | Communications Controller |

FIG. 2C

| Switch Control | Switch Status Data | Switch Control Response | | | | Network Signaling |
|---|---|---|---|---|---|---|
| | Switch MIB | Switch Status Data | | | | |
| Peer Control Requests | Request For Switch Status Data | Peer Control | Peer Control Messages | Peer Signaling Cells<br><br>Peer Control Messages | | |
| | | | Stream Functions and AAL | Post-transformed Data | | |
| | | Peer Signaling Cells<br><br>Peer Control Messages | Pre-transformed Data | Peer Control/ Data Mux-DeMux | | Multi-plexed Peer Control and Data |
| | | | | Multi-plexed Peer Control and Data | Switch Fabric | Multi-plexed Peer Control and Data |
| Network Signaling | | Peer Signaling Cells<br><br>Peer Control Messages | | Multi-plexed Peer Control and Data | Multiplexed Peer Control and Data | Switch Ports |

FIG. 3

|  |  | ATM Domain | | Alternative Domain | |
|---|---|---|---|---|---|
|  |  | Participating | Non-Participating | Participating | Non-participating |
| End Device | Participating | A | B | C | G |
|  | Non-participating | E | F | D | H |

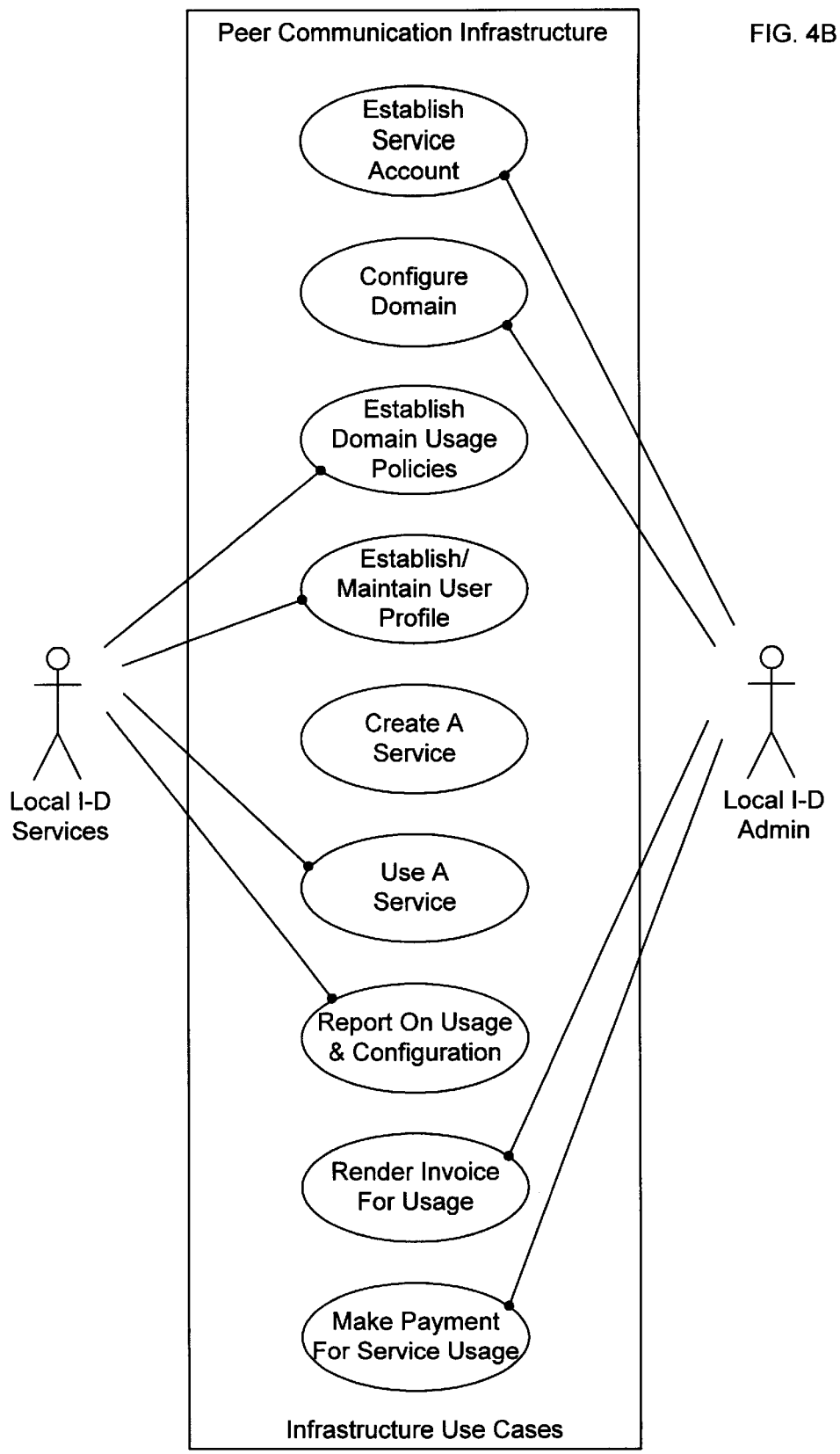

FIG. 5

| Actor | Description |
|---|---|
| End User | The ultimate user of the peer communications infrastructure. |
| End User Organization | The responsible entity for service usage. The user and organization may be the same for individuals although the roles are distinct. |
| Global Interdomain Administrator | The organization responsible for operating the Global Interdomain Services. |
| Global Interdomain Services | The aggregate capabilities offered by the agent-based Global Interdomain Services supported by the infrastructure. |
| Local Interdomain Administrator | The organization responsible for operating the Local Interdomain Services. |
| Local Interdomain Services | The aggregate capabilities offered by the agent-based Local Interdomain Services supported by the infrastructure. |

FIG. 6

| Actor | Use Cases in Which the Actor Participates |
|---|---|
| End User | • Establish / Maintain User Profile<br>• Create A Service<br>• Use A Service<br>• Report On Usage & Configuration |
| End User Organization | • Establish Service Account<br>• Configure Domain<br>• Establish Domain Usage Policies<br>• Create A Service<br>• Report On Usage & Configuration<br>• Render Invoice For Usage<br>• Make Payment For Service Usage |
| Global Interdomain Administrator | • Configure Domain |
| Global Interdomain Services | • Establish Domain Usage Policies<br>• Establish / Maintain User Profile<br>• Use A Service<br>• Report On Usage & Configuration |
| Local Interdomain Administrator | • Establish Service Account<br>• Configure Domain<br>• Render Invoice For Usage<br>• Make Payment For Service Usage |
| Local Interdomain Services | • Establish Domain Usage Policies<br>• Establish / Maintain User Profile<br>• Use A Service<br>• Report On Usage & Configuration |

FIG. 7A

| Use Case | Establish Service Account |
|---|---|
| Actors | • End User Organization (initiator)<br>• Local Interdomain Administrator |
| Purpose | Establish the end users as part of the larger inter-organization / interdomain communications infrastructure. |
| Overview | The End User Organization ( which may be identical to the End User in the case of individuals) subscribes to the infrastructure and becomes financially responsible for use of services. The End User Organization is accepted by the Local Interdomain Administrator and permitted to use infrastructure resources. |
| Type | Secondary (in general will only occur once per End User Organization) |

FIG. 7B

| Use Case | Configure Domain |
|---|---|
| Actors | • End User Organization (initiator)<br>• Local Interdomain Administrator<br>• Global Interdomain Administrator |
| Purpose | Establish a sharable (to User Organization defined limits) domain map and resource capabilities inventory. |
| Overview | The End User Organization prepares a sharable domain map and resource capabilities inventory. This information is provided to Local and Global Administrators for loading into the Local and Global Services so that other domain entities can use the information to connect to the End User Organization's End Users via the infrastructure. Eventually, this information may be provided direct from the End User Organization to the Local and Global Interdomain Services, in which case the list of actors would change from including Local and Global Interdomain Administrators to including Local and Global Interdomain Services. |
| Type | Secondary (done infrequently, initially and as domain configuration changes) |

FIG. 8A

| Use Case | Establish Domain Usage Policies |
|---|---|
| Actors | • End User Organization (initiator)<br>• Local Interdomain Services<br>• Global Interdomain Services |
| Purpose | To establish the limits of use for End Users within the End User Organization as well as to limit the access and visibility into the End User Organization Domain for End Users within other End User Organizations that would try to establish a service connection to an End User within its domain. |
| Overview | The End User Organization establishes policy rules that are used by software agents within the communications infrastructure. These rules define permission levels and generally constrain behavior of the agents in performing dynamic service configuration, setup, and establishment. |
| Type | Secondary (done infrequently, initially and as domain policy changes) |

FIG. 8B

| Use Case | Establish / Maintain User Profile |
|---|---|
| Actors | • End User (initiator)<br>• Local Interdomain Services<br>• Global Interdomain Services |
| Purpose | To establish End User service use preferences and requirements. |
| Overview | The End User establishes and maintains a current profile of characteristics regarding use preferences and requirements. This profile can be consulted by other End Users in order to establish a service connection. |
| Type | Primary |

FIG. 8C

| Use Case | Create A Service |
|---|---|
| Actors | • End User<br>• End User Organization |
| Purpose | To develop a new service or modify an existing service. |
| Overview | Normally service definitions are available from a library of predefined services. End Users or End User Organizations have the ability to add to the existing library either by defining a completely new service or by modifying an existing service. |
| Type | Secondary |

FIG. 9A

| Use Case | Use A Service |
|---|---|
| Actors | • End User<br>• Local Interdomain Services<br>• Global Interdomain Services |
| Purpose | To provide peer-oriented multimedia communications. |
| Overview | The ultimate purpose of the peer infrastructure is to provide multimedia communications. This purpose is accomplished by selecting a service template and requesting the system to establish the service. |
| Type | Primary |

FIG. 9B

| Use Case | Report on Usage & Configuration |
|---|---|
| Actors | • End User<br>• End User Organization<br>• Local Interdomain Services<br>• Global Interdomain Services |
| Purpose | To provide feedback information on the state of the infrastructure and the current amount of usage. |
| Overview | On demand reporting regarding various aspects of the configuration of the environment and status of usage is an important component of the functionality to be delivered by the communications infrastructure. |
| Type | Primary |

FIG. 9C

| Use Case | Render Invoice for Usage |
|---|---|
| Actors | • End User Organization<br>• Local Interdomain Administrator (initiator) |
| Purpose | To initiate the service account settlement process. |
| Overview | The periodic invoice is prepared and submitted to the End User Organization for services used during the period. |
| Type | Primary |

FIG. 9D

| Use Case | Make Payment for Service Usage |
|---|---|
| Actors | • End User Organization<br>• Local Interdomain Administrator |
| Purpose | To complete the settlement process for use of services. |
| Overview | The End User Organization makes payment for the invoiced amount for services used, thus completing the settlement process started by the Local Interdomain Administrator's submission of the invoice for services used during the period. |
| Type | Primary |

FIG. 10

| Function Category | Meaning |
|---|---|
| Evident | Should perform, and user should be cognizant that it is performed. |
| Hidden | Should perform, but not be visible to users. This is true of many underlying technical services, such as *save information in a persistent storage mechanism*. Hidden functions are often (incorrectly) missed during the requirements gathering process. |
| Frill | Optional; adding it does not significantly affect cost or other functions. |

FIG. 11A

| Ref # | Function | Category |
|---|---|---|
| UC.2.1 | Install and set up applicable infrastructure hardware and software. | Evident |
| UC.2.2 | Register device and capabilities with use domain services. | Evident |
| UC.2.3 | Create a user domain map and resource inventory for the user domain. | Evident |
| UC.3.1 | Establish / maintain user domain usage policies. | Evident |
| UC.4.1 | Establish / maintain end user profile information. | Evident |
| UC.5.1 | After checking for authorization, allow user to define or modify a service definition. | Evident |
| UC.6.1 | Initiate establishment of selected service template. | Evident |
| UC.6.2 | Establish requested service. | Hidden |
| UC.6.3 | Monitor and support requested service. | Hidden |
| UC.7.1 | Initiate recall of report information from involved peers. | Evident |
| UC.7.2 | Provide applicable portion of requested information. | Hidden |
| UC.7.3 | Coordinate assembly of requested information elements. | Hidden |
| UC.7.4 | Present assembled information. | Evident |
| IO.IA.1 | Provide user interface mechanisms for creating, storing, and using service templates. | Evident |
| IO.IA.2 | Provide orthogonal control service interpreter and network control command generation mechanism. | Hidden |
| IO.IA.3 | Provide service establishment, monitoring, local control, and termination capabilities for participating in the collective orthogonal control effort. | Hidden |
| IO.IA.4 | Provide collective peer service creation and control capabilities with interface to local device orthogonal control capabilities. | Hidden |
| IO.IB.1 | Provide a mechanism for storing and manipulating service element components as well as the ability to aggregate service element components into more complex service templates. | Evident |
| IO.IB.2 | Provide a mechanism to interpret service templates for use by the orthogonal control mechanism. | Hidden |
| IO.IC.1 | Provide a facility for storing and selectively retrieving service templates and components with separate access for privately (locally defined) as well as globally defined (interdomain provided definitions). | Evident |
| IO.ID1.1 | Provide a mechanism that allows the peer control and service creation facility to be modified while in operation. This should include modifications to the base infrastructure software as well as to the service template facility and library. | Hidden |

FIG. 11B

| Ref # | Function | Category |
|---|---|---|
| IO.ID2.1 | The upgrade facility should be on demand. This means that if a particular peer control facility is currently handling multiple concurrent sessions, one of which requires some upgrade in order to complete the current requested action, the peer control facility should be able to upgrade the facilities to support the one session immediately without disrupting the operation of the other session. It complete version synchronization as the other sessions terminate. | Hidden |
| IO.ID3.1 | Provide design-level architecture mechanisms to ensure that no system-wide shutdown will be required to accomplish any system maintenance or upgrade activity. | Hidden |
| IO.ID4.1 | Provide the ability to change to alternative physical connectivity media (the local unit may need to be taken out of service to accomplish this upgrade) without diminishing the upper level functionality. | Hidden |
| IO.IE.1 | Service establishment monitors will be included with other performance monitors in order to track service establishment times to ensure performance objectives are met. | Evident |
| IO.IG1.1 | Monitor and report on device resources used by session. | Hidden |
| IO.IG3.1 | Monitor and report on QoS delivered by this device to each session that is being supported. | Hidden |
| IO.IIA.1 | For devices that do not fully support the peer control and service creation infrastructure, provide an alternative command protocol to establish service through a gateway server. | Evident |
| IO.IIIA.1 | Monitor QoS for service level degradation and provide local intelligence to influence the management of local resources to provide the best overall level of service for all current sessions. | Hidden |
| IO.IIIB.1 | Architect for dual path (primary and backup) routing among participating peers. | Hidden |
| IO.IIIC.1 | Monitor link-level performance between adjacent peers. Initiate recovery reroute of session in case of primary link failure. | Hidden |
| IO.IVA.1 | Utilize active autonomous agents and distributed domain services servers reduce the scalability problem. | Hidden |
| IO.IVB.1 | Associate workstations, and domain service servers with domains and store map of the domain on the domain services server for use during reconfiguration procedures. | Hidden |
| IO.VA.1 | Provide an implementation mechanism that allows for multiple versions of functional elements to be available and operating simultaneously. | Hidden |

FIG. 11C

| Ref # | Function | Category |
|---|---|---|
| IO.VB.1 | Provide an interface mechanism to allow entry of alternative transmission path selection criteria and a local intelligence capability to utilize these criteria in the selection of alternative route to maximize the service value. | Evident |
| IO.VB.2 | Provide a collaborative dynamic alternative route selection planning that can act on the route preference selection criteria to select the transmission path yielding the greatest service value. | Hidden |
| IO.VB.3 | Provide adaptive call setup mechanisms capable of acting to implement the high-value service transmission path determined by the collaborative planning function. | Hidden |
| IO.VC.1 | Provide an interface mechanism to allow QoS value decisions to be made explicitly from the interface for incorporation into service templates and to interact with the collaborative decision making process when requested QoS levels cannot be initially met or subsequently cannot be maintained and must, therefore, be degraded in order to establish or continue the service. | Evident |
| IO.VC.2 | Provide a collaborative QoS monitoring and selective QoS level adjustment coordination mechanism. | Hidden |

FIG. 12A

| Ref # | Function | Category |
|---|---|---|
| UC.2.1 | Install and set up applicable infrastructure hardware and software. | Evident |
| UC.2.2 | Register device and capabilities with use domain services. | Evident |
| UC.6.2 | Establish requested service. | Hidden |
| UC.6.3 | Monitor and support requested service. | Hidden |
| UC.7.2 | Provide applicable portion of requested information. | Hidden |
| IO.IA.2 | Provide orthogonal control service interpreter and network control command generation mechanism. | Hidden |
| IO.IA.3 | Provide service establishment, monitoring, local control, and termination capabilities for participating in the collec-tive orthogonal control effort. | Hidden |
| IO.IA.4 | Provide collective peer service creation and control capabilities with interface to local device orthogonal control capabilities. | Hidden |
| IO.IB.2 | Provide a mechanism to interpret service templates for use by the orthogonal control mechanism. | Hidden |
| IO.ID1.1 | Provide a mechanism that allows the peer control and service creation facility to be modified while in operation. This should include modifications to the base infrastructure software as well as to the service template facility and library. | Hidden |
| IO.ID2.1 | The upgrade facility should be on demand. This means that if a particular peer control facility is currently handling multiple concurrent sessions, one of which requires some upgrade in order to complete the current requested action, the peer control facility should be able to upgrade the facilities to support the one session immediately without disrupting the operation of the other session. It complete version synchronization as the other sessions terminate. | Hidden |
| IO.ID3.1 | Provide design-level architecture mechanisms to ensure that no system-wide shutdown will be required to accom-plish any system maintenance or upgrade activity. | Hidden |
| IO.ID4.1 | Provide the ability to change to alternative physical con-nectivity media (the local unit may need to be taken out of service to accomplish this upgrade) without diminishing the upper level functionality. | Hidden |
| IO.IG1.1 | Monitor and report on device resources used by session. | Hidden |
| IO.IG3.1 | Monitor and report on QoS delivered by this device to each session that is being supported. | Hidden |

FIG. 12B

| Ref # | Function | Category |
|---|---|---|
| IO.IIC.1 | For participating switches that are establishing session connectivity through a non-participating domain, provide a surrogate management object to monitor and participate (to the extent possible) in the peer control and service creation activity on behalf of the non-participating domain. | Hidden |
| IO.IIIA.1 | Monitor QoS for service level degradation and provide local intelligence to influence the management of local resources to provide the best overall level of service for all current sessions. | Hidden |
| IO.IIIB.1 | Architect for dual path (primary and backup) routing among participating peers. | Hidden |
| IO.IIIC.1 | Monitor link-level performance between adjacent peers. Initiate recovery reroute of session in case of primary link failure. | Hidden |
| IO.IVA.1 | Utilize active autonomous agents and distributed domain services servers reduce the scalability problem. | Hidden |
| IO.IVB.1 | Associate workstations, and domain service servers with domains and store map of the domain on the domain services server for use during reconfiguration procedures. | Hidden |
| IO.VA.1 | Provide an implementation mechanism that allows for multiple versions of functional elements to be available and operating simultaneously. | Hidden |
| IO.VB.2 | Provide a collaborative dynamic alternative route selection planning that can act on the route preference selection criteria to select the transmission path yielding the greatest service value. | Hidden |
| IO.VB.3 | Provide adaptive call setup mechanisms capable of acting to implement the high-value service transmission path determined by the collaborative planning function. | Hidden |
| IO.VC.2 | Provide a collaborative QoS monitoring and selective QoS level adjustment coordination mechanism. | Hidden |

FIG. 13A

| Ref # | Function | Category |
|---|---|---|
| UC.1.1 | Create user account and access rights profile. | Hidden |
| UC.2.1 | Install and set up applicable infrastructure hardware and software. | Evident |
| UC.2.2 | Register device and capabilities with use domain services. | Hidden |
| UC.2.4 | Store user domain map and resource inventory for the user domain. | Hidden |
| UC.2.5 | Register the user domain map and resource inventory with the appropriate Interdomain Services | Hidden |
| UC.3.2 | Store user domain usage policies. | Hidden |
| UC.4.2 | Store user profile information | Hidden |
| UC.5.2 | Update local domain library of service definition templates. | Hidden |
| UC.6.2 | Establish requested sevice. | Hidden |
| UC.6.3 | Monitor and support requested service. | Hidden |
| UC.7.2 | Provide applicable portion of requested information. | Hidden |
| UC.8.1 | Initiate preparation of user invoices. | Evident |
| UC.8.2 | Collect and assemble usage details. | Evident |
| UC.8.3 | Rate usage and prepare invoices. | Evident |
| UC.8.4 | Prepare interdomain usage charge settlement statement. | Evident |
| UC.9.1 | Apply user payment and clear usage account balance. | Evident |
| UC.9.2 | Apply payments to interdomain settlement accounts. | Evident |
| IO.IA.2 | Provide orthogonal control service interpreter and network control command generation mechanism. | Hidden |
| IO.IA.3 | Provide service establishment, monitoring, local control, and termination capabilities for participating in the collective orthogonal control effort. | Hidden |
| IO.IA.4 | Provide collective peer service creation and control capabilities with interface to local device orthogonal control capabilities. | Hidden |
| IO.IB.2 | Provide a mechanism to interpret service templates for use by the orthogonal control mechanism. | Hidden |
| IO.IC.1 | Provide a facility for storing and selectively retrieving service templates and components with separate access for privately (locally defined) as well as globally defined (interdomain provided definitions). | Evident |
| IO.ID1.1 | Provide a mechanism that allows the peer control and service creation facility to be modified while in operation. This should include modifications to the base infrastructure software as well as to the service template facility and library. | Hidden |

FIG. 13B

| Ref # | Function | Category |
|---|---|---|
| IO.ID2.1 | The upgrade facility should be on demand. This means that if a particular peer control facility is currently handling multiple concurrent sessions, one of which requires some upgrade in order to complete the current requested action, the peer control facility should be able to upgrade the facilities to support the one session immediately without disrupting the operation of the other session. It complete version synchronization as the other sessions terminate. | Hidden |
| IO.ID3.1 | Provide design-level architecture mechanisms to ensure that no system-wide shutdown will be required to accomplish any system maintenance or upgrade activity. | Hidden |
| IO.ID4.1 | Provide the ability to change to alternative physical connectivity media (the local unit may need to be taken out of service to accomplish this upgrade) without diminishing the upper level functionality. | Hidden |
| IO.IE.1 | Service establishment monitors will be included with other performance monitors in order to track service establishment times to ensure performance objectives are met. | Evident |
| IO.IF.1 | Provide a set of services that will support the interconnection of various local domains. | Hidden |
| IO.IG1.1 | Monitor and report on device resources used by session. | Hidden |
| IO.IG2.1 | Provide capability to reconcile and aggregate usage of resources associated with all devices in the domain as it relates to support of services utilized by a session. | Hidden |
| IO.IG3.1 | Monitor and report on QoS delivered by this device to each session that is being supported. | Hidden |
| IO.IG3.2 | Reconcile and report on QoS delivered by participating devices in support of various sessions that they were part of. | Evident |
| IO.IG4.1 | Reconcile, aggregate, and report on services provided by various domains and prorate revenue form usage charges associated with sessions that crossed multiple domains. | Evident |
| IO.IIA.2 | Provide gateway conversion services including surrogate peer control and service creation functionality in support of a non-participating device. | Hidden |
| IO.IIB.1 | Provide gateway conversion services between the native infrastructure protocol ATM and the alternative frame based protocol. | Hidden |
| IO.IIC.2 | Provide the capability for the monitoring and reporting functions to accommodate surrogate objects representing non-participating domains that were crossed in order to establish the connectivity necessary to support a requested service. | Hidden |

FIG. 13C

| Ref # | Function | Category |
|---|---|---|
| IO.IIIA.1 | Monitor QoS for service level degradation and provide local intelligence to influence the management of local resources to provide the best overall level of service for all current sessions. | Hidden |
| IO.IIIA.2 | Provide intelligence to coordinate domain and interdomain QoS management actions among participating peer control elements. | Hidden |
| IO.IIIB.1 | Architect for dual path (primary and backup) routing among participating peers. | Hidden |
| IO.IIIC.1 | Monitor link-level performance between adjacent peers. Initiate recovery reroute of session in case of primary link failure. | Hidden |
| IO.IIID.1 | Provide intelligence and focal point for peer control activities related to dynamic network reconfiguration and rerouting tasks. | Hidden |
| IO.IVA.1 | Utilize active autonomous agents and distributed domain services. | Hidden |
| IO.IVB.1 | Associate workstations, and domain service servers with domains and store map of the domain on the domain services server for use during reconfiguration procedures. | Hidden |
| IO.VA.1 | Provide an implementation mechanism that allows for multiple versions of functional elements to be available and operating simultaneously. | Hidden |
| IO.VB.2 | Provide a collaborative dynamic alternative route selection planning that can act on the route preference selection criteria to select the transmission path yielding the greatest service value. | Hidden |
| IO.VB.3 | Provide adaptive call setup mechanisms capable of acting to implement the high-value service transmission path determined by the collaborative planning function. | Hidden |
| IO.VC.2 | Provide a collaborative QoS monitoring and selective QoS level adjustment coordination mechanism. | Hidden |

FIG. 14A

|  | Data<br>What? | Rules<br>Why? | Process<br>How? | Network<br>Where? | People<br>Who? | Events<br>When? |
|---|---|---|---|---|---|---|
| Plan-<br>ning | Deliver<br>multi-media<br>collabora-<br>tive com-<br>munications<br><br>Provide<br>control and<br>usage<br>reporting<br>data | Seek<br>highest<br>value<br>service<br>transport | Services<br>created by<br>end users<br>independent<br>of<br>intervening<br>carriers | Seamless<br>scale from<br>work-group<br>to global<br>Utility | End user<br>organiza-<br>tions and<br>interdomain<br>providers | Service<br>should be<br>on demand |
| Anal-<br>ysis | Impact of<br>domain<br>boundaries<br>and change<br>of transport<br>on com-<br>munications<br>data stream | Domain<br>usage<br>policies<br><br>QoS<br>establish-<br>ment,<br>monitoring,<br>and control<br>rules<br><br>Financial<br>settlement<br>rules | Control<br>through<br>collaboration<br>of peer<br>autonomous<br>active<br>agents | Organized<br>around<br>domains<br>which may<br>be either<br>private or<br>public<br><br>Notion of<br>inter-<br>domain<br>services<br>which<br>include<br>basic<br>public<br>connec-<br>tivity | Identified six<br>actor roles:<br>End User<br>End User<br>Org<br>Local I-D<br>Admin<br>Global I-D<br>Admin<br>Local I-D<br>Service<br>Global I-D<br>Service | Identified<br>four<br>service<br>events<br>three of<br>which are<br>cyclical:<br>Establish<br>Acct.<br>Domain<br>Maint.<br>Normal<br>Use<br>Acct.<br>Settlement |

FIG. 17

| Pattern<br>Name | Purpose | Description |
|---|---|---|
| Self-<br>organizing<br>Peer<br>Collabora-<br>tion | Coordinate the activities of<br>several autonomous pro-<br>cesses or agents which im-<br>plicitly join and cooperate<br>(based upon their capability<br>to do so) in order to accom-<br>plish a task agreed upon by<br>the initiating collaborating<br>peers. | This is a control pattern in which an intel-<br>ligent peer agent first establishes a logical<br>bus or communications path between itself<br>and collaborating peer(s). The act of es-<br>tablishing this common channel implicitly<br>invites the participation of intervening<br>autonomous agents to join the collabora-<br>tive control process for accomplishing the<br>task or activity associated with the opening<br>of the communication channel. |

FIG. 14B

|  | Data What? | Rules Why? | Process How? | Network Where? | People Who? | Events When? |
|---|---|---|---|---|---|---|
| Logical Design | Gateway servers for non-participating devices and non-ATM transport | Separation of delivery behavior and interdomain control behavior | Control specified through the orthogonal control paradigm | Time and event triggered architecture | Separate aggregate actor roles and map to autonomous active agents | Identified nine major transaction events: 1) Establish Service Acct. 2) Configure Domain 3) Establish Usage Policies 4) Maintain User Profile 5) Create a Service 6) Use a Service 7) Report on Usage & config. 8) Render Invoice 9) Make Payment |
| Physical Design |  |  |  |  |  |  |
| Construction |  |  |  |  |  |  |
| Deployment |  |  |  |  |  |  |

FIG. 16B

| Pattern Name | Purpose | Description |
|---|---|---|
| Safety Executive | Manage potentially complex safety processes in the presence of faults. | This pattern uses a centralized coordinator for safety monitoring and control of system recovery from faults. It has also been referred to as the Safety Kernel Pattern. The safety executive acts like a really smart watchdog that tracks and coordinates all safety monitoring. Typically, it captures the following inputs:<br>• Watchdog timeouts<br>• Software error assertions<br>• Continuous or periodic BITSs<br>• Faults identified by monitors in the Monitor-Action Pattern |

FIG. 15

| Pattern Name | Purpose | Description |
|---|---|---|
| Master-Slave | Coordinate the activities of several processors. | Control pattern in which an intelligent controller issues commands and receives inputs from slave devices. |
| Micro-kernel | Decompose complex components into sets of hierarchical abstraction layers to facilitate portability and reuse. | Control pattern in which the structure of a subsystem is layered into distinct sets of classes or packages that can be arranged in a set of hierarchical client-server associations. |
| Proxy | Handle the distribution of data from a central server to multiple remote clients. | A marginal architectural pattern which serves as the basis for the Broker Pattern. This pattern is applicable when a normal reference or pointer to an object is inappropriate or impossible, such as when the object resides in another thread or processor. This pattern decouples clients from their servers by creating a local proxy, or stand-in, for the less accessible server. |
| Broker | Handle the distribution of data from a central server to multiple remote clients when the location of the servers and clients is not known at compile time. | The Broker Pattern is an elaborated Proxy Pattern that goes another step towards decoupling the clients from the servers. An object broker is an object that knows the location of other objects. The broker can have the knowledge a priori (at compile-time) or can gather the information dynamically as objects register themselves, or a combination of both. The primary advantage of the Broker Pattern is that it is possible to construct a Proxy Pattern when the location of the server isn't known when the system is compiled. |

FIG. 16A

| Pattern Name | Purpose | Description |
|---|---|---|
| Homogeneous Redundancy | Increase reliability and safety in the presence of single point failures. | This pattern uses identical channels to increase reliability. All redundant channels are run in parallel and the output of the channels is compared. If an odd number of channels is used, then a majority-wins policy can be implemented that can detect and correct failures in the minority channels. |
| Diverse Redundancy | Increase reliability and safety in the presence of single point failures and systematic errors. | This pattern mitigates the primary disadvantage of homogeneous redundancy by providing redundant channels that are implemented using different means. This can be accomplished in several ways:<br>• Different but equal<br>• Light-weight redundancy<br>• Separation of monitoring and actuation |
| Monitor-Actuator | Low-cost improvement in safety with a specific type of diverse redundancy. | This pattern is a special type of diverse redundancy. In this case, however, the channels are separated into monitoring and actuator channels. The actuator channel performs the actions while the monitor channel keeps track of what the actuation is supposed to be doing and monitors the physical environment to ensure that the results of the actuator are appropriate. Note that the actuator itself cannot rely on this monitor – closed loop actuators must use separate sensors that are independent of the sensor used in the monitoring channel. |
| Watchdog | Mechanism to detect failures and faults during execution. | A watchdog is a subsystem that receives messages from other subsystems on a periodic or sequence-keyed basis. If a service of the watchdog occurs too late or out of sequence, the watchdog takes some corrective action, such as reset, shutdown, alarming, or initiating a more elaborate error recovery mechanism. Although watchdogs are rather more mechanistic in their level, they are usually used within a global scope of safety and redundancy and so are included with the discussion of patterns. |

FIG. 18A

| Tech Importance | | Realization Mechanism | Objective Target Values | Org. Diff. |
|---|---|---|---|---|
| Rel | Abs | | | |
| 16 | 188 | Common Comm Bus | Single common Comm Bus | 8 |
| 3 | 511 | Peer Cntrl Msg In Data | Cntrl Msg Follows Data Path | 7 |
| 33 | 46 | Path-based Logical Network Overlay | Dynamic Path Net Overlays | 5 |
| 27 | 65 | Statistical Reservation of Virtual Channels | Service Based Stat Chnl Res | 3 |
| 23 | 96 | Differential Priorities For Network Traffic | Transit vs Entry Separation | 7 |
| 4 | 392 | Distributed Adaptive Link-level Scheduling | On-demand Scheduling | 9 |
| 21 | 105 | Cell-In-Frame Protocol | Seamless ATM / Ethernet | 4 |
| 32 | 48 | Hybrid Deposit Model Protocol | Multi-session Capability | 8 |
| 13 | 304 | Scripting Language | Platform Indpndt / Good Intgr | 4 |
| 34 | 40 | Hybrid Time- / Event- Triggered Architecture | Comprehensive Event Triggers | 5 |
| 30 | 53 | Coordination Language | Time-Space Uncoupling | 5 |
| 30 | 53 | Coordination Mechanism | Time-Space Uncoupling | 5 |
| 11 | 322 | Algorithmic Assignment of Site / Node Ids | Full Ids For Arbitrary Net Path | 4 |
| 2 | 551 | Use of PNNI For Routing & UNI Signaling | Control Over Defined Features | 3 |
| 14 | 234 | Two Tier Network Control Architecture | Dynamic Peer-Agent Based Cntrl | 9 |
| 35 | 30 | Agent behaviors Composed Of Primitives | (Re)Use of Elementary Behaviors | 2 |
| 18 | 134 | Layers Of Activity (Behavior, Local & Coop Plan) | Behavior, Local & Co-op Planning | 3 |
| 13 | 285 | Software Trellis | Utilize Trellis Structure Features | 4 |
| 20 | 124 | Roles For Agents Spanning Expectations | Defined Agent Expected Horizons | 4 |
| 1 | 575 | Active Network Architecture | Fully Utilize Active Net Paradigm | 8 |
| 12 | 308 | Distributed Planning Among Multiple Agents | Utilize Distributed Planning Model | 5 |
| 10 | 340 | Template Based Service Definitions | Service Def In Terms Of Components | 7 |
| 17 | 144 | (S) Dynamic Client Membership | Provide Dynamic Membership | 5 |
| 25 | 95 | (S) Client Level Binding | Provide Client-Level Binding | 7 |
| 29 | 56 | (S) Multicast | Provide Multicast Capability | 5 |
| 11 | 339 | QoS Establishment At Call Setup | Support QoS At Call Setup | 2 |
| 9 | 343 | Joint Receiver QoS Signaling And CallSetup QoS | QoS At Call setup & Client Signaling | 3 |
| 8 | 358 | Resouce Management Framework | Provide resource Mgmt Framework | 6 |

FIG. 18B

| Tech Importance | | | Realization Mechanism | Structural Classification | Orig. # |
|---|---|---|---|---|---|
| Rel | Abs | | | | |
| 16 | 188 | | Common Comm Bus | First-class Communication Links | 1 |
| 3 | 511 | | Peer Cntrl Msg In Data | First-class Communication Links | 2 |
| 33 | 46 | | Path-based Logical Network Overlay | First-class Communication Links | 3 |
| 27 | 65 | | Statistical Reservation of Virtual Channels | First-class Communication Links | 4 |
| 23 | 96 | | Differential Priorities For Network Traffic | First-class Communication Links | 5 |
| 4 | 392 | | Distributed Adaptive Link-level Scheduling | First-class Communication Links | 6 |
| 21 | 105 | | Cell-In-Frame Protocol | First-class Communication Links | 7 |
| 32 | 48 | | Hybrid Deposit Model Protocol | First-class Communication Links | 8 |
| 13 | 304 | | Scripting Language | Distributed Control | 9 |
| 34 | 40 | | Hybrid Time- / Event- Triggered Architecture | Distributed Control | 10 |
| 30 | 53 | | Coordination Language | Distributed Control | 11 |
| 30 | 53 | | Coordination Mechanism | Distributed Control | 12 |
| 11 | 322 | | Algorithmic Assignment of Site / Node Ids | Distributed Control | 13 |
| 2 | 551 | | Use of PNNI For Routing & UNI Signaling | Distributed Control | 14 |
| 14 | 234 | | Two Tier Network Control Architecture | Distributed Control | 15 |
| 35 | 30 | | Agent behaviors Composed Of Primitives | Agent Architecture | 16 |
| 18 | 134 | | Layers Of Activity (Behavior, Local & Coop Plan) | Agent Architecture | 17 |
| 13 | 285 | | Software Trellis | Agent Architecture | 18 |
| 20 | 124 | | Roles For Agents Spanning Expectations | Agent Architecture | 19 |
| 1 | 575 | | Active Network Architecture | Service Creation | 20 |
| 12 | 308 | | Distributed Planning Among Multiple Agents | Service Creation | 21 |
| 10 | 340 | | Template Based Service Definitions | Service Creation | 22 |
| 17 | 144 | | (S) Dynamic Client Membership | Second-class realization Mechanisms | 23 |
| 25 | 95 | | (S) Client Level Binding | Second-class realization Mechanisms | 24 |
| 29 | 56 | | (S) Multicast | Second-class realization Mechanisms | 25 |
| 11 | 339 | | QoS Establishment At Call Setup | QoS | 26 |
| 9 | 343 | | Joint Receiver QoS Signaling And CallSetup QoS | QoS | 27 |
| 8 | 358 | | Resouce Management Framework | QoS | 28 |

FIG. 18C

| Tech Importance | | Realization Mechanism | Objective Target Values | Org. Diff. |
|---|---|---|---|---|
| Rel | Abs | | | |
| 19 | 131 | Open Distributed Processing | Max Use of Open Dist. Processing | 7 |
| 36 | 8 | Use Of Design Patterns | Max Use Of Design Patterns | 4 |
| 22 | 97 | Object Partitioning For Max Hdwr / Sftwr Intchng | Max Flex Choice Hrdwr / Sftwr | 2 |
| 27 | 66 | SLCFSM | Support Single Link Comm FSM | 2 |
| 23 | 96 | TCFSM | Support Time Communicating FSM | 3 |
| 6 | 366 | Object Request broker With Mobile Objects | Max Support For Mobile Objects | 5 |
| 28 | 63 | InterLanguage Unification System | Support InterLanguage Approach | 4 |
| 4 | 385 | Distributed Intelligent & Adaptive Agents | Utilize Agent based Paradigm | 7 |

FIG. 18D

| Tech Importance | | Realization Mechanism | Structural Classification | Orig. # |
|---|---|---|---|---|
| Rel | Abs | | | |
| 19 | 131 | Open Distributed Processing | Software design And Development Techniques | 29 |
| 36 | 8 | Use Of Design Patterns | Software design And Development Techniques | 30 |
| 22 | 97 | Object Partitioning For Max Hdwr / Sftwr Intchng | Software design And Development Techniques | 31 |
| 27 | 66 | SLCFSM | Software design And Development Techniques | 32 |
| 23 | 96 | TCFSM | Software design And Development Techniques | 33 |
| 6 | 366 | Object Request broker With Mobile Objects | Software design And Development Techniques | 34 |
| 28 | 63 | InterLanguage Unification System | Software design And Development Techniques | 35 |
| 4 | 385 | Distributed Intelligent & Adaptive Agents | Software design And Development Techniques | 36 |

FIG. 18E

| Tech Importance | | Realization Mechanism | Objective Target Values | Orig. Diff. |
|---|---|---|---|---|
| Rel | Abs | | | |
| 1 | 575 | Active Network Architecture | Fully Utilize Active Net Paradigm | 8 |
| 2 | 551 | Use of PNNI For Routing & UNI Signaling | Control Over Defined Features | 3 |
| 3 | 511 | Peer Cntrl Msg In Data | Cntrl Msg Follows Data Path | 7 |
| 4 | 392 | Distributed Adaptive Link-level Scheduling | On-demand Scheduling | 9 |
| 5 | 385 | Distributed Intelligent & Adaptive Agents | Utilize Agent based Paradigm | 7 |
| 6 | 366 | Object Request broker With Mobile Objects | Max Support For Mobile Objects | 5 |
| 7 | 358 | Resource Management Framework | Provide resource Mgmt Framework | 6 |
| 8 | 343 | Joint Receiver QoS Signaling And CallSetup QoS | QoS At Call setup & Client Signaling | 3 |
| 9 | 340 | Template Based Service Definitions | Service Def In Terms Of Components | 7 |
| 10 | 339 | QoS Establishment At Call Setup | Support QoS At Call Setup | 2 |
| 11 | 322 | Algorithmic Assignment of Site / Node Ids | Full Ids For Arbitrary Net Path | 4 |
| 12 | 308 | Distributed Planning Among Multiple Agents | Utilize Distributed Planning Model | 5 |
| 13 | 304 | Scripting Language | Platform Indpndt / Good Intgr | 4 |
| 14 | 285 | Software Trellis | Utilize Trellis Structure Features | 4 |
| 15 | 234 | Two Tier Network Control Architecture | Dynamic Peer-Agent Based Cntrl | 9 |
| 16 | 188 | Common Comm Bus | Single common Comm Bus | 8 |
| 17 | 144 | (S) Dynamic Client Membership | Provide Dynamic Membership | 5 |
| 18 | 134 | Layers Of Activity (Behavior, Local & Coop Plan) | Behavior, Local & Co-op Planning | 3 |
| 19 | 131 | Open Distributed Processing | Max Use of Open Dist. Processing | 7 |
| 20 | 124 | Roles For Agents Spanning Expectations | Defined Agent Expected Horizons | 4 |
| 21 | 105 | Cell-In-Frame Protocol | Seamless ATM / Ethernet | 4 |

FIG. 18F

| Tech Importance | | | | Orig. # |
|---|---|---|---|---|
| Rel | Abs | Realization Mechanism | Structural Classification | |
| 1 | 575 | Active Network Architecture | Service Creation | 20 |
| 2 | 551 | Use of PNNI For Routing & UNI Signaling | Distributed Control | 14 |
| 3 | 511 | Peer Cntrl Msg In Data | First-class Communication Links | 2 |
| 4 | 392 | Distributed Adaptive Link-level Scheduling | First-class Communication Links | 6 |
| 5 | 385 | Distributed Intelligent & Adaptive Agents | Software design And Development Techniques | 36 |
| 6 | 366 | Object Request broker With Mobile Objects | Software design And Development Techniques | 34 |
| 7 | 358 | Resouce Management Framework | QoS | 28 |
| 8 | 343 | Joint Receiver QoS Signaling And CallSetup | QoS | 27 |
| 9 | 340 | Template Based Service Definitions | Service Creation | 22 |
| 10 | 339 | QoS Establishment At Call Setup | QoS | 26 |
| 11 | 322 | Algorithmic Assignment of Site / Node Ids | Distributed Control | 13 |
| 12 | 308 | Distributed Planning Among Multiple Agents | Service Creation | 21 |
| 13 | 304 | Scripting Language | Distributed Control | 9 |
| 14 | 285 | Software Trellis | Agent Architecture | 18 |
| 15 | 234 | Two Tier Network Control Architecture | Distributed Control | 15 |
| 16 | 188 | Common Comm Bus | First-class Communication Links | 1 |
| 17 | 144 | (S) Dynamic Client Membership | Second-class realization Mechanisms | 23 |
| 18 | 134 | Layers Of Activity (Behavior, Local & Coop Plan) | Agent Architecture | 17 |
| 19 | 131 | Open Distributed Processing | Software design And Development Techniques | 29 |
| 20 | 124 | Roles For Agents Spanning Expectations | Agent Architecture | 19 |
| 21 | 105 | Cell-In-Frame Protocol | First-class Communication Links | 7 |

FIG. 18G

| Tech Importance | | Realization Mechanism | Objective Target Values | Orig. Diff. |
|---|---|---|---|---|
| Rel | Abs | | | |
| 22 | 97 | Object Partitioning For Max Hdwr / Sftwr Intchng | Max Flex Choice Hrdwr / Sftwr | 2 |
| 23 | 96 | Differential Priorities For Network Traffic | Transit vs Entry Separation | 7 |
| 23 | 96 | TCFSM | Support Time Communicating FSM | 3 |
| 25 | 95 | (S) Client Level Binding | Provide Client-Level Binding | 7 |
| 26 | 66 | SLCFSM | Support Single Link Comm FSM | 2 |
| 27 | 65 | Statistical Reservation of Virtual Channels | Service Based Stat Chnl Res | 3 |
| 28 | 63 | InterLanguage Unification System | Support InterLanguage Approach | 4 |
| 29 | 56 | (S) Multicast | Provide Multicast Capability | 5 |
| 30 | 53 | Coordination Language | Time-Space Uncoupling | 5 |
| 30 | 53 | Coordination Mechanism | Time-Space Uncoupling | 5 |
| 32 | 48 | Hybrid Deposit Model Protocol | Multi-session Capability | 8 |
| 33 | 46 | Path-based Logical Network Overlay | Dynamic Path Net Overlays | 5 |
| 34 | 40 | Hybrid Time- / Event- Triggered Architecture | Comprehensive Event Triggers | 5 |
| 35 | 30 | Agent behaviors Composed Of Primitives | (Re)Use of Elementary Behaviors | 2 |
| 36 | 8 | Use Of Design Patterns | Max Use Of Design Patterns | 4 |

FIG. 18H

| Tech Importance | | Realization Mechanism | Structural Classification | Orig. # |
|---|---|---|---|---|
| Rel | Abs | | | |
| 22 | 97 | Object Partitioning For Max Hdwr / Sftwr Intchng | Software design And Development Techniques | 31 |
| 23 | 96 | Differential Priorities For Network Traffic | First-class Communication Links | 5 |
| 23 | 96 | TCFSM | Software design And Development Techniques | 33 |
| 25 | 95 | (S) Client Level Binding | Second-class realization Mechanisms | 24 |
| 26 | 66 | SLCFSM | Software design And Development Techniques | 32 |
| 27 | 65 | Statistical Reservation of Virtual Channels | First-class Communication Links | 4 |
| 28 | 63 | InterLanguage Unification System | Software design And Development Techniques | 35 |
| 29 | 56 | (S) Multicast | Second-class realization Mechanisms | 25 |
| 30 | 53 | Coordination Language | Distributed Control | 11 |
| 30 | 53 | Coordination Mechanism | Distributed Control | 12 |
| 32 | 48 | Hybrid Deposit Model Protocol | First-class Communication Links | 8 |
| 33 | 46 | Path-based Logical Network Overlay | First-class Communication Links | 3 |
| 34 | 40 | Hybrid Time- / Event- Triggered Architecture | Distributed Control | 10 |
| 35 | 30 | Agent behaviors Composed Of Primitives | Agent Architecture | 16 |
| 36 | 8 | Use Of Design Patterns | Software design And Development Techniques | 30 |

FIG. 19B

| Customer Requirements \ Realization Mechanisms | Common Comm Bus | Peer Cntrl Msg In Data | Path-based Logical Network Overlay | Statistical Reservation of Virtual Channels | Differential Priorities For Network Traffic | Distributed Adaptive Link-level Scheduling | Cell-In-Frame Protocol | Hybrid Deposit Model Protocol | Scripting Language | Hybrid Time- / Event- Triggered Architecture | Coordination Language | Coordination Mechanism | Algorithmic Assignment Of Site / Node Ids |
|---|---|---|---|---|---|---|---|---|---|---|---|---|---|
| Orthogonal Control | | & | % | % | % | | | & | | | | | & |
| User Service Definition | | | | | % | | | % | & | | | | |
| Service Libraries | | | | | | | | | | | | | |
| Flex Control & Service Creation | & | & | | | & | | | # | | % | % | % | |
| Modifiable While In Operation | | | | | | | | & | | | | | |
| Upgrades on Demand | | | | | | | | & | | | | | |
| No System-wide Shutdown | % | & | | | # | | | | | | | | % |
| Works On Different Phy. Networks | | % | | | | | | % | | | | | % |
| Comp. Service Establishment Rate | | | | | | | | | | | | | |
| Works Over Mixed Domains | & | & | | | | | | & | | | | | # |
| Flexible Resource Accounting | % | % | | | | | | | | | | | & |
| Track by Participating Device | | | | | | | | | | | | | # |
| Resource Consumption By Domain | % | % | | | | | | | | | | | & |
| Report QoS In Relation To SLA | | % | | | | | | | | | | | & |
| Consumption Proration By Session | | & | | | | | | | | | | | |
| Non-participating Devices On Net Edge | | & | | | | # | | | | | | | |
| Frame Based Edge-networks | | | | | | # | | | | | | | |
| Span Non-participating Switches | & | & | % | | | | | | | | | | |
| Support Graceful Srvc. Degradation | % | # | | & | & | & | | | | & | & | & | |
| No Single Point of Failure | % | # | % | % | | # | | | | & | | | % |
| Fault Isolation & Adaptive Avoidance | & | # | | | | # | | | | | | | & |
| Dynamic Network Reconfiguration | & | # | % | & | % | # | | | & | | % | % | & |
| Scalable From Work Group To Global | & | # | % | & | # | # | | | % | % | & | & | # |
| Resolves Dynam. Reconfig. Issues | & | # | % | | | % | | | & | | % | % | & |
| Support Alternative Implementations | & | & | | | | | & | & | # | % | % | % | & |
| Selective Use Of Transmission Paths | | & | % | % | % | # | | | | | | | & |
| QoS Decisions From User Interface | % | & | | % | % | & | | & | % | | | | |
| Organizational Difficulty | 8 | 7 | 5 | 3 | 7 | 9 | 4 | 8 | 4 | 5 | 5 | 4 | 4 |

Relationship Indicators: # 9 Strong relationship; & 3 Medium relationship; and, % 1 Weak relationship

FIG. 19C

| Customer Requirements \ Realization Mechanisms | Use of PNNI For Routing & UNI Signaling | Two Tier Network Control Architecture | Agent Behaviors Composed Of Primitives | Layers Of Activity (Behavior, Local & Coop Plan) | Software Trellis | Roles for Agents Spanning Expectations | Active Network Architecture | Distributed Planning Among Multiple Agents | Template Based Service Definitions | (S) Dynamic Client Membership | (S) Client Level Binding | (S) Multicast | QoS Establishment At Call Setup |
|---|---|---|---|---|---|---|---|---|---|---|---|---|---|
| Orthogonal Control | & | & | | | | | & | & | # | | & | | # |
| User Service Definition | | | % | | | | | | & | % | & | % | # |
| Service Libraries | | | % | | | | | | # | | | | |
| Flex Control & Service Creation | | | | | | | & | | # | | | | # |
| Modifiable While In Operation | | | | # | | | | | | | | | |
| Upgrades on Demand | | % | | # | | | | | | | | | |
| No System-wide Shutdown | # | % | | | & | % | & | % | | | | | |
| Works On Different Phy. Networks | & | % | | | | | % | | | | | | |
| Comp. Service Establishment Rate | % | | | | | | | | % | | | | |
| Works Over Mixed Domains | # | | | | | | | & | % | | | | |
| Flexible Resource Accounting | & | & | | | | | & | | & | | | | # |
| Track by Participating Device | & | | | | | | # | | | | | | |
| Resource Consumption By Domain | & | % | | | | | & | | | | | | |
| Report QoS In Relation To SLA | % | & | | % | | | & | | % | | | | |
| Consumption Proration By Session | | | | % | & | | | | | | | | # |
| Non-participating Devices On Net Edge | | % | | | | | % | | | | | | |
| Frame Based Edge-networks | % | % | | | | | % | | | | | | |
| Span Non-participating Switches | | | | | | | % | | | | | | |
| Support Graceful Srvc. Degradation | & | & | | # | & | # | # | & | | | | | |
| No Single Point of Failure | # | & | | & | | & | # | # | | % | | % | |
| Fault Isolation & Adaptive Avoidance | # | & | | & | & | & | # | # | | & | % | % | |
| Dynamic Network Reconfiguration | # | & | | % | & | % | # | & | | # | & | & | % |
| Scalable From Work Group To Global | # | # | % | & | & | & | # | # | & | | | | |
| Resolves Dynam. Reconfig. Issues | # | & | | & | | & | # | # | | # | & | & | |
| Support Alternative Implementations | | & | | & | # | % | # | & | % | | | | |
| Selective Use Of Transmission Paths | # | % | | % | | % | # | % | % | % | | | |
| QoS Decisions From User Interface | % | % | | | | | & | | & | | | | % |
| Organizational Difficulty | 3 | 9 | 2 | 3 | 4 | 4 | 8 | 5 | 7 | 5 | 7 | 5 | 2 |

Relationship Indicators: # 9 Strong relationship; & 3 Medium relationship; and, % 1 Weak relationship

FIG. 19D

| Customer Requirements \ Realization Mechanisms | Joint Receiver QoS Signaling And Call Setup QoS | Resource Management Framework | Open Distributed Processing | Use Of Design Patterns | Object Partitioning For Max Hdwr/ Sftwr Intchange | SLCFSM | TCFSM | Object Request Broker With Mobile Objects | InterLanguage Unification System | Distributed Intelligent & Adaptive Agents | Customer Importance |
|---|---|---|---|---|---|---|---|---|---|---|---|
| Orthogonal Control | # | & | | | | | | | | & | 9 |
| User Service Definition | # | & | % | % | & | | | % | % | % | 9 |
| Service Libraries | | | | % | | | | | | | 8 |
| Flex Control & Service Creation | # | & | % | | | & | & | | & | % | 9 |
| Modifiable While In Operation | | | | | | | | | | % | 8 |
| Upgrades on Demand | | | | | | | | | | % | 8 |
| No System-wide Shutdown | | % | | | | | | % | | & | 7 |
| Works On Different Phy. Networks | | % | % | | | | | | % | | 6 |
| Comp. Service Establishment Rate | | | | | # | | | | | | 4 |
| Works Over Mixed Domains | | | # | | | | | & | | & | 7 |
| Flexible Resource Accounting | # | # | | | | | | & | | & | 5 |
| Track by Participating Device | | & | | | | | | & | | & | 4 |
| Resource Consumption By Domain | | # | | | | | | & | | & | 5 |
| Report QoS In Relation To SLA | | & | | | | | | | | % | 3 |
| Consumption Proration By Session | # | % | | | | | | | | % | 4 |
| Non-participating Devices On Net Edge | | & | | | & | | | | | % | 5 |
| Frame Based Edge-networks | | | | | | | | | | % | 5 |
| Span Non-participating Switches | | | % | | | | | % | | % | 8 |
| Support Graceful Srvc. Degradation | % | & | | | % | | | % | | % | 4 |
| No Single Point of Failure | | % | % | | | % | % | # | | # | 6 |
| Fault Isolation & Adaptive Avoidance | | | % | | | | | | # | # | 5 |
| Dynamic Network Reconfiguration | % | & | | | | | # | # | & | & | 7 |
| Scalable From Work Group To Global | | # | & | | & | | | # | | # | 5 |
| Resolves Dynam. Reconfig. Issues | | & | % | | | & | | # | | & | 5 |
| Support Alternative Implementations | | % | % | | | | | % | | % | 5 |
| Selective Use Of Transmission Paths | | % | | | & | | | & | | & | 6 |
| QoS Decisions From User Interface | % | & | | | | | | | | % | 8 |
| Organizational Difficulty | 3 | 6 | 7 | 4 | 2 | 2 | 3 | 5 | 4 | 7 | |

Relationship Indicators: # 9 Strong relationship; & 3 Medium relationship; and, % 1 Weak relationship

FIG. 19E

| | | Realization Mechanisms | Common Comm Bus | Peer Cntrl Msg In Data | Path-based Logical Network Overlay | Statistical Reservation of Virtual Channels | Differential Priorities For Network Traffic | Distributed Adaptive Link-level Scheduling | Cell-In-Frame Protocol | Hybrid Deposit Model Protocol | Scripting Language | Hybrid Time- / Event- Triggered Architecture | Coordination Language | Coordination Mechanism | Algorithmic Assignment Of Site / Node Ids |
|---|---|---|---|---|---|---|---|---|---|---|---|---|---|---|---|
| Organizational Difficulty | | | 8 | 7 | 5 | 3 | 7 | 9 | 4 | 8 | 4 | 5 | 5 | 4 | 4 |
| Objective Target Values | | | Single Common Comm Bus | Cntrl Msg Follows Data Path | Dynamic Path Net Overlays | Service Based Stat Chnl Res | Transit vs Entry Separation | On-demand Scheduling | Seamless ATM / Ethernet | Multi-session Capability | Platform Indpndt / Good Intgr | Comprehensive Event Triggers | Time-Space Uncoupling | Time-Space Uncoupling | Full Ids For Arbitrary Net Path |
| Technical Importance | Absolute | | 188 | 511 | 46 | 65 | 96 | 392 | 105 | 48 | 304 | 40 | 53 | 53 | 322 |
| | Relative | | 16 | 3 | 33 | 27 | 23 | 4 | 21 | 32 | 13 | 34 | 30 | 30 | 11 |

FIG. 19F

| | | Realization Mechanisms | Use of PNNI For Routing & UNI Signaling | Two Tier Network Control Architecture | Agent Behaviors Composed Of Primitives | Layers Of Activity (Behavior, Local & Coop Plan) | Software Trellis | Roles for Agents Spanning Expectations | Active Network Architecture | Distributed Planning Among Multiple Agents | Template Based Service Definitions | (S) Dynamic Client Membership | (S) Client Level Binding | (S) Multicast | QoS Establishment At Call Setup |
|---|---|---|---|---|---|---|---|---|---|---|---|---|---|---|---|
| Organizational Difficulty | | | 3 | 9 | 2 | 3 | 4 | 4 | 8 | 5 | 7 | 5 | 7 | 5 | 2 |
| Objective Target Values | | | Control Over Defined Features | Dynamic Peer-Agent Based Cntrl | (Re)Use of Elementary Behaviors | Behavior, Local & Co-op Planning | Utilize Trellis Structure Features | Defined Agent Expected Horizons | Fully Utilize Active Net Paradigm | Utilize Distributed Planning Model | Service Def In Terms Of Components | Provide Dynamic Membership | Provide Client-Level Binding | Provide Multicast Capability | Support QoS At Call Setup |
| Technical Importance | Absolute | | 551 | 234 | 30 | 134 | 285 | 124 | 575 | 308 | 340 | 144 | 95 | 56 | 339 |
| | Relative | | 2 | 14 | 35 | 18 | 13 | 20 | 1 | 12 | 10 | 17 | 25 | 29 | 11 |

FIG. 19G

| | Realization Mechanisms | Joint Receiver QoS Signaling And Call Setup QoS | Resource Management Framework | Open Distributed Processing | Use Of Design Patterns | Object Partitioning For Max Hdwr/ Sftwr Intchange | SLCFSM | TCFSM | Object Request Broker With Mobile Objects | InterLanguage Unification System | Distributed Intelligent & Adaptive Agents | Customer Importance |
|---|---|---|---|---|---|---|---|---|---|---|---|---|
| Organizational Difficulty | | 3 | 6 | 7 | 4 | 2 | 2 | 3 | 5 | 4 | 7 | |
| Objective Target Values | | QoS At Call Setup & Client Signal | Provide Resource Mgmt Frework | Max Use of Open Dist. Processing | Max Use Of Design Patterns | Max Flex Choice Hrdwr/Sftwr | Support Single Link Comm FSM | Support Time Communicating FSM | Max Support For Mobile Objects | Support InterLanguage Approach | Utilize Agent Based Paradigm | |
| Technical Importance | Absolute | 343 | 358 | 131 | 8 | 97 | 66 | 96 | 366 | 63 | 385 | |
| | Relative | 9 | 8 | 19 | 36 | 22 | 27 | 23 | 6 | 28 | 4 | |

FIG. 20A

| Concepts | Customer weight | First-class Communication Links ||||||||
| --- | --- | --- | --- | --- | --- | --- | --- | --- | --- |
| | | Elm 1 | Elm 2 | Elm 3 | Elm 4 | Elm 5 | Elm 6 | Elm 7 | Elm 8 |
| Orthogonal Control | 9 | 0 | 3 | 1 | 1 | 1 | 0 | 0 | 0 |
| User Service Definition | 9 | 0 | 0 | 0 | 0 | 1 | 0 | 0 | 1 |
| Service Libraries | 8 | 0 | 0 | 0 | 0 | 0 | 0 | 0 | 0 |
| Flex Control & Service Creation | 9 | 3 | 3 | 0 | 0 | 0 | 3 | 0 | 0 |
| Modifiable While In Operation | 8 | 0 | 0 | 0 | 0 | 0 | 0 | 0 | 0 |
| Upgrades on Demand | 8 | 0 | 0 | 0 | 0 | 0 | 0 | 0 | 0 |
| No System-wide Shutdown | 7 | 1 | 3 | 0 | 0 | 0 | 9 | 0 | 0 |
| Works On Different Phy. Networks | 6 | 0 | 1 | 0 | 0 | 0 | 0 | 0 | 0 |
| Comp. Service Establishment Rate | 4 | 0 | 0 | 0 | 0 | 0 | 0 | 0 | 0 |
| Works Over Mixed Domains | 7 | 3 | 3 | 0 | 0 | 0 | 0 | 0 | 0 |
| Flexible Resource Accounting | 5 | 1 | 1 | 0 | 0 | 0 | 0 | 0 | 0 |
| Track by Participating Device | 4 | 0 | 0 | 0 | 0 | 0 | 0 | 0 | 0 |
| Resource Consumption By Domain | 5 | 1 | 1 | 0 | 0 | 0 | 0 | 0 | 0 |
| Report QoS In Relation To SLA | 3 | 0 | 1 | 0 | 0 | 0 | 0 | 0 | 0 |
| Consumption Proration By Session | 4 | 0 | 3 | 0 | 0 | 0 | 0 | 0 | 0 |
| Non-participating Devices On Net Edge | 5 | 0 | 3 | 0 | 0 | 0 | 0 | 9 | 0 |
| Frame Based Edge-networks | 5 | 0 | 0 | 0 | 0 | 0 | 0 | 9 | 0 |
| Span Non-participating Switches | 8 | 3 | 3 | 1 | 0 | 0 | 0 | 0 | 0 |
| Support Graceful Srvc. Degradation | 4 | 1 | 9 | 0 | 0 | 3 | 3 | 0 | 0 |
| No Single Point of Failure | 6 | 1 | 9 | 1 | 1 | 0 | 9 | 0 | 0 |
| Fault Isolation & Adaptive Avoidance | 5 | 3 | 9 | 0 | 0 | 0 | 9 | 0 | 0 |
| Dynamic Network Reconfiguration | 7 | 3 | 9 | 1 | 3 | 1 | 9 | 0 | 0 |
| Scalable From Work Group To Global | 5 | 3 | 9 | 1 | 3 | 9 | 9 | 0 | 0 |
| Resolves Dynam. Reconfig. Issues | 5 | 3 | 9 | 1 | 0 | 0 | 1 | 0 | 0 |
| Support Alternative Implementations | 5 | 3 | 3 | 0 | 0 | 0 | 0 | 3 | 3 |
| Selective Use Of Transmission Paths | 6 | 0 | 3 | 1 | 1 | 1 | 9 | 0 | 0 |
| QoS Decisions From User Interface | 8 | 1 | 3 | 0 | 1 | 1 | 3 | 0 | 3 |

FIG. 20B

| Concepts | Distributed Control | | | | | | | Agent Architecture | | | |
|---|---|---|---|---|---|---|---|---|---|---|---|
| | Elm 1 | Elm 2 | Elm 3 | Elm 4 | Elm 5 | Elm 6 | Elm 7 | Elm 1 | Elm 2 | Elm 3 | Elm 4 |
| Orthogonal Control | 3 | 0 | 0 | 0 | 3 | 3 | 3 | 0 | 0 | 0 | 0 |
| User Service Definition | 3 | 0 | 0 | 0 | 0 | 0 | 0 | 1 | 0 | 0 | 0 |
| Service Libraries | 0 | 0 | 0 | 0 | 0 | 0 | 0 | 1 | 0 | 0 | 0 |
| Flex Control & Service Creation | 9 | 0 | 1 | 1 | 1 | 0 | 0 | 0 | 0 | 0 | 0 |
| Modifiable While In Operation | 3 | 0 | 0 | 0 | 0 | 0 | 0 | 0 | 0 | 9 | 0 |
| Upgrades on Demand | 3 | 0 | 0 | 0 | 0 | 0 | 0 | 1 | 0 | 9 | 0 |
| No System-wide Shutdown | 0 | 0 | 0 | 0 | 1 | 9 | 1 | 0 | 0 | 3 | 1 |
| Works On Different Phy. Networks | 1 | 0 | 0 | 0 | 1 | 3 | 1 | 0 | 0 | 0 | 0 |
| Comp. Service Establishment Rate | 0 | 0 | 0 | 0 | 0 | 1 | 0 | 0 | 0 | 0 | 0 |
| Works Over Mixed Domains | 3 | 0 | 0 | 0 | 9 | 9 | 0 | 0 | 0 | 0 | 0 |
| Flexible Resource Accounting | 0 | 0 | 0 | 0 | 3 | 3 | 3 | 0 | 0 | 0 | 0 |
| Track by Participating Device | 0 | 0 | 0 | 0 | 9 | 3 | 0 | 0 | 0 | 0 | 0 |
| Resource Consumption By Domain | 0 | 0 | 0 | 0 | 3 | 3 | 1 | 0 | 0 | 0 | 0 |
| Report QoS In Relation To SLA | 0 | 0 | 0 | 0 | 3 | 1 | 3 | 0 | 1 | 0 | 0 |
| Consumption Proration By Session | 0 | 0 | 0 | 0 | 0 | 0 | 0 | 0 | 1 | 3 | 0 |
| Non-participating Devices On Net Edge | 0 | 0 | 0 | 0 | 0 | 0 | 1 | 0 | 0 | 0 | 0 |
| Frame Based Edge-networks | 0 | 0 | 0 | 0 | 0 | 1 | 1 | 0 | 0 | 0 | 0 |
| Span Non-participating Switches | 0 | 0 | 0 | 0 | 0 | 0 | 0 | 0 | 0 | 0 | 0 |
| Support Graceful Srvc. Degradation | 0 | 3 | 3 | 3 | 0 | 3 | 3 | 0 | 9 | 3 | 9 |
| No Single Point of Failure | 0 | 0 | 0 | 0 | 1 | 9 | 3 | 0 | 3 | 0 | 3 |
| Fault Isolation & Adaptive Avoidance | 0 | 3 | 0 | 0 | 3 | 9 | 3 | 0 | 3 | 3 | 3 |
| Dynamic Network Reconfiguration | 3 | 0 | 1 | 1 | 3 | 9 | 3 | 0 | 1 | 3 | 1 |
| Scalable From Work Group To Global | 1 | 1 | 3 | 3 | 9 | 9 | 9 | 1 | 3 | 3 | 3 |
| Resolves Dynam. Reconfig. Issues | 3 | 0 | 1 | 1 | 3 | 9 | 3 | 0 | 3 | 0 | 3 |
| Support Alternative Implementations | 9 | 1 | 1 | 0 | 3 | 0 | 3 | 0 | 3 | 9 | 1 |
| Selective Use Of Transmission Paths | 0 | 0 | 0 | 0 | 3 | 9 | 1 | 0 | 1 | 0 | 1 |
| QoS Decisions From User Interface | 1 | 0 | 0 | 0 | 0 | 1 | 1 | 0 | 0 | 0 | 0 |

FIG. 20C

| Concepts | Srvc. Creation | | | 2nd Class Mech. | | | QoS | | |
|---|---|---|---|---|---|---|---|---|---|
| | Elm 1 | Elm 2 | Elm 3 | Elm 1 | Elm 2 | Elm 3 | Elm 1 | Elm 2 | Elm 3 |
| Orthogonal Control | 3 | 3 | 9 | 0 | 3 | 0 | 9 | 9 | 3 |
| User Service Definition | 0 | 0 | 3 | 1 | 3 | 1 | 9 | 9 | 3 |
| Service Libraries | 0 | 0 | 9 | 0 | 0 | 0 | 0 | 0 | 0 |
| Flex Control & Service Creation | 3 | 0 | 9 | 0 | 0 | 0 | 9 | 9 | 3 |
| Modifiable While In Operation | 0 | 0 | 0 | 0 | 0 | 0 | 0 | 0 | 0 |
| Upgrades on Demand | 0 | 0 | 0 | 0 | 0 | 0 | 0 | 0 | 0 |
| No System-wide Shutdown | 3 | 1 | 0 | 0 | 0 | 0 | 0 | 0 | 1 |
| Works On Different Phy. Networks | 1 | 0 | 0 | 0 | 0 | 0 | 0 | 0 | 1 |
| Comp. Service Establishment Rate | 0 | 0 | 1 | 0 | 0 | 0 | 0 | 0 | 0 |
| Works Over Mixed Domains | 0 | 3 | 1 | 0 | 0 | 0 | 0 | 0 | 0 |
| Flexible Resource Accounting | 3 | 0 | 3 | 0 | 0 | 0 | 9 | 9 | 9 |
| Track by Participating Device | 9 | 0 | 0 | 0 | 0 | 0 | 0 | 0 | 3 |
| Resource Consumption By Domain | 3 | 0 | 0 | 0 | 0 | 0 | 0 | 0 | 9 |
| Report QoS In Relation To SLA | 3 | 0 | 1 | 0 | 0 | 0 | 0 | 0 | 3 |
| Consumption Proration By Session | 0 | 0 | 0 | 0 | 0 | 0 | 9 | 9 | 1 |
| Non-participating Devices On Net Edge | 0 | 1 | 0 | 0 | 0 | 0 | 0 | 0 | 3 |
| Frame Based Edge-networks | 0 | 1 | 0 | 0 | 0 | 0 | 0 | 0 | 0 |
| Span Non-participating Switches | 1 | 0 | 0 | 0 | 0 | 0 | 0 | 0 | 0 |
| Support Graceful Svc. Degradation | 9 | 3 | 0 | 0 | 0 | 0 | 0 | 1 | 3 |
| No Single Point of Failure | 9 | 9 | 0 | 1 | 0 | 1 | 0 | 0 | 1 |
| Fault Isolation & Adaptive Avoidance | 9 | 9 | 0 | 3 | 1 | 1 | 0 | 0 | 0 |
| Dynamic Network Reconfiguration | 9 | 3 | 3 | 9 | 3 | 3 | 1 | 1 | 3 |
| Scalable From Work Group To Global | 9 | 9 | 0 | 0 | 0 | 0 | 0 | 0 | 9 |
| Resolves Dynam. Reconfig. Issues | 9 | 9 | 3 | 9 | 3 | 3 | 0 | 0 | 3 |
| Support Alternative Implementations | 9 | 3 | 1 | 0 | 0 | 0 | 0 | 0 | 1 |
| Selective Use Of Transmission Paths | 9 | 1 | 1 | 1 | 0 | 0 | 0 | 0 | 1 |
| QoS Decisions From User Interface | 3 | 0 | 3 | 0 | 0 | 0 | 1 | 1 | 3 |

FIG. 20D

| Concepts | Software Design and Analysis Techniques | | | | | | | |
|---|---|---|---|---|---|---|---|---|
| | Elm 1 | Elm 2 | Elm 3 | Elm 4 | Elm 5 | Elm 6 | Elm 7 | Elm 8 |
| Orthogonal Control | 0 | 0 | 0 | 0 | 0 | 0 | 0 | 3 |
| User Service Definition | 1 | 0 | 3 | 0 | 0 | 1 | 1 | 1 |
| Service Libraries | 0 | 1 | 0 | 0 | 0 | 0 | 0 | 0 |
| Flex Control & Service Creation | 1 | 0 | 0 | 3 | 3 | 0 | 3 | 1 |
| Modifiable While In Operation | 0 | 0 | 0 | 0 | 0 | 0 | 0 | 1 |
| Upgrades on Demand | 0 | 0 | 0 | 0 | 0 | 0 | 0 | 1 |
| No System-wide Shutdown | 0 | 0 | 0 | 0 | 0 | 1 | 0 | 3 |
| Works On Different Phy. Networks | 1 | 0 | 0 | 0 | 0 | 0 | 1 | 0 |
| Comp. Service Establishment Rate | 0 | 0 | 9 | 0 | 0 | 0 | 0 | 0 |
| Works Over Mixed Domains | 9 | 0 | 0 | 0 | 0 | 3 | 0 | 3 |
| Flexible Resource Accounting | 0 | 0 | 0 | 0 | 0 | 3 | 0 | 3 |
| Track by Participating Device | 0 | 0 | 0 | 0 | 0 | 3 | 0 | 3 |
| Resource Consumption By Domain | 0 | 0 | 0 | 0 | 0 | 3 | 0 | 3 |
| Report QoS In Relation To SLA | 0 | 0 | 0 | 0 | 0 | 0 | 0 | 1 |
| Consumption Proration By Session | 0 | 0 | 0 | 0 | 0 | 0 | 0 | 1 |
| Non-participating Devices On Net Edge | 0 | 0 | 0 | 0 | 0 | 0 | 0 | 1 |
| Frame Based Edge-networks | 0 | 0 | 0 | 0 | 0 | 0 | 0 | 1 |
| Span Non-participating Switches | 1 | 0 | 0 | 0 | 0 | 1 | 0 | 1 |
| Support Graceful Srvc. Degradation | 0 | 0 | 1 | 0 | 0 | 1 | 0 | 1 |
| No Single Point of Failure | 1 | 0 | 0 | 1 | 1 | 9 | 0 | 9 |
| Fault Isolation & Adaptive Avoidance | 1 | 0 | 0 | 0 | 0 | 9 | 0 | 9 |
| Dynamic Network Reconfiguration | 0 | 0 | 0 | 0 | 9 | 9 | 3 | 3 |
| Scalable From Work Group To Global | 3 | 0 | 3 | 0 | 0 | 9 | 0 | 9 |
| Resolves Dynam. Reconfig. Issues | 1 | 0 | 0 | 3 | 0 | 9 | 0 | 3 |
| Support Alternative Implementations | 1 | 0 | 0 | 0 | 0 | 1 | 0 | 1 |
| Selective Use Of Transmission Paths | 0 | 0 | 0 | 3 | 0 | 3 | 0 | 3 |
| QoS Decisions From User Interface | 0 | 0 | 0 | 0 | 0 | 0 | 0 | 1 |

FIG. 20E

| | Calculated Weight | First-class Communication Links | | | | | | | |
|---|---|---|---|---|---|---|---|---|---|
| | | Elm 1 | Elm 2 | Elm 3 | Elm 4 | Elm 5 | Elm 6 | Elm 7 | Elm 8 |
| Calculated Weight | | 188 | 511 | 46 | 65 | 96 | 392 | 105 | 48 |
| | Orthogonal Control | 0 | 27 | 9 | 9 | 9 | 0 | 0 | 0 |
| | User Service Definition | 0 | 0 | 0 | 0 | 9 | 0 | 0 | 9 |
| | Service Libraries | 0 | 0 | 0 | 0 | 0 | 0 | 0 | 0 |
| | Flex Control & Service Creation | 27 | 27 | 0 | 0 | 0 | 27 | 0 | 0 |
| | Modifiable While In Operation | 0 | 0 | 0 | 0 | 0 | 0 | 0 | 0 |
| | Upgrades on Demand | 0 | 0 | 0 | 0 | 0 | 0 | 0 | 0 |
| | No System-wide Shutdown | 7 | 21 | 0 | 0 | 0 | 63 | 0 | 0 |
| | Works On Different Phy. Networks | 0 | 6 | 0 | 0 | 0 | 0 | 0 | 0 |
| | Comp. Service Establishment Rate | 0 | 0 | 0 | 0 | 0 | 0 | 0 | 0 |
| | Works Over Mixed Domains | 21 | 21 | 0 | 0 | 0 | 0 | 0 | 0 |
| | Flexible Resource Accounting | 5 | 5 | 0 | 0 | 0 | 0 | 0 | 0 |
| | Track by Participating Device | 0 | 0 | 0 | 0 | 0 | 0 | 0 | 0 |
| | Resource Consumption By Domain | 5 | 5 | 0 | 0 | 0 | 0 | 0 | 0 |
| | Report QoS In Relation To SLA | 0 | 3 | 0 | 0 | 0 | 0 | 0 | 0 |
| | Consumption Proration By Session | 0 | 12 | 0 | 0 | 0 | 0 | 0 | 0 |
| | Non-participating Devices On Net Edge | 0 | 15 | 0 | 0 | 0 | 0 | 45 | 0 |
| | Frame Based Edge-networks | 0 | 0 | 0 | 0 | 0 | 0 | 45 | 0 |
| | Span Non-participating Switches | 24 | 24 | 8 | 0 | 0 | 0 | 0 | 0 |
| | Support Graceful Srvc. Degradation | 4 | 36 | 0 | 6 | 12 | 12 | 0 | 0 |
| | No Single Point of Failure | 6 | 54 | 6 | 0 | 0 | 54 | 0 | 0 |
| | Fault Isolation & Adaptive Avoidance | 15 | 45 | 0 | 0 | 0 | 45 | 0 | 0 |
| | Dynamic Network Reconfiguration | 21 | 63 | 7 | 21 | 7 | 63 | 0 | 0 |
| | Scalable From Work Group To Global | 15 | 45 | 5 | 15 | 45 | 45 | 0 | 0 |
| | Resolves Dynam. Reconfig. Issues | 15 | 45 | 5 | 0 | 0 | 5 | 0 | 0 |
| | Support Alternative Implementations | 15 | 15 | 0 | 0 | 0 | 0 | 15 | 15 |
| | Selective Use Of Transmission Paths | 0 | 18 | 6 | 6 | 6 | 54 | 0 | 0 |
| | QoS Decisions From User Interface | 8 | 24 | 0 | 8 | 8 | 24 | 0 | 24 |

FIG. 20F

| | First-class Communication Links | | | | | | | |
|---|---|---|---|---|---|---|---|---|
| | Elm 1 | Elm 2 | Elm 3 | Elm 4 | Elm 5 | Elm 6 | Elm 7 | Elm 8 |
| Design decision | 1 | 1 | 1 | 1 | 1 | 1 | 1 | 1 |
| Effective weight | 188 | 511 | 46 | 65 | 96 | 392 | 105 | 48 |

FIG. 20G

| | | Distributed Control | | | | | | | Agent Architecture | | | |
|---|---|---|---|---|---|---|---|---|---|---|---|---|
| | | Elm 1 | Elm 2 | Elm 3 | Elm 4 | Elm 5 | Elm 6 | Elm 7 | Elm 1 | Elm 2 | Elm 3 | Elm 4 |
| Calculated Weight | | 304 | 40 | 53 | 53 | 322 | 551 | 234 | 30 | 134 | 285 | 124 |
| | Orthogonal Control | 27 | 0 | 0 | 0 | 27 | 27 | 27 | 0 | 0 | 0 | 0 |
| | User Service Definition | 27 | 0 | 0 | 0 | 0 | 0 | 0 | 9 | 0 | 0 | 0 |
| | Service Libraries | 0 | 0 | 0 | 0 | 0 | 0 | 0 | 8 | 0 | 0 | 0 |
| | Flex Control & Service Creation | 81 | 0 | 9 | 9 | 9 | 0 | 0 | 0 | 0 | 0 | 0 |
| | Modifiable While In Operation | 24 | 0 | 0 | 0 | 0 | 0 | 0 | 0 | 0 | 72 | 0 |
| | Upgrades on Demand | 24 | 0 | 0 | 0 | 0 | 0 | 0 | 8 | 0 | 72 | 0 |
| | No System-wide Shutdown | 0 | 0 | 0 | 0 | 7 | 0 | 7 | 0 | 0 | 21 | 7 |
| | Works On Different Phy. Networks | 6 | 0 | 0 | 0 | 6 | 63 | 18 | 6 | 0 | 0 | 0 |
| | Comp. Service Establishment Rate | 0 | 0 | 0 | 0 | 0 | 0 | 18 | 4 | 0 | 0 | 0 |
| | Works Over Mixed Domains | 21 | 0 | 0 | 0 | 0 | 63 | 63 | 0 | 0 | 0 | 0 |
| | Flexible Resource Accounting | 0 | 0 | 0 | 0 | 63 | 15 | 15 | 0 | 0 | 0 | 0 |
| | Track by Participating Device | 0 | 0 | 0 | 0 | 15 | 12 | 0 | 0 | 0 | 0 | 0 |
| | Resource Consumption By Domain | 0 | 0 | 0 | 0 | 36 | 15 | 5 | 0 | 0 | 0 | 0 |
| | Report QoS In Relation To SLA | 0 | 0 | 0 | 0 | 15 | 15 | 9 | 0 | 3 | 0 | 0 |
| | Consumption Proration By Session | 0 | 0 | 0 | 0 | 9 | 3 | 0 | 0 | 4 | 12 | 0 |
| | Non-participating Devices On Net Edge | 0 | 0 | 0 | 0 | 0 | 0 | 5 | 0 | 0 | 0 | 0 |
| | Frame Based Edge-networks | 0 | 0 | 0 | 0 | 0 | 0 | 5 | 0 | 0 | 0 | 0 |
| | Span Non-participating Switches | 0 | 0 | 0 | 0 | 0 | 5 | 5 | 0 | 0 | 0 | 0 |
| | Support Graceful Srvc. Degradation | 0 | 12 | 12 | 12 | 0 | 12 | 12 | 0 | 36 | 12 | 36 |
| | No Single Point of Failure | 0 | 18 | 0 | 0 | 6 | 54 | 18 | 0 | 18 | 0 | 18 |
| | Fault Isolation & Adaptive Avoidance | 0 | 0 | 0 | 0 | 15 | 45 | 15 | 0 | 15 | 15 | 15 |
| | Dynamic Network Reconfiguration | 21 | 0 | 7 | 7 | 21 | 63 | 21 | 0 | 7 | 21 | 7 |
| | Scalable From Work Group To Global | 5 | 5 | 15 | 15 | 45 | 45 | 45 | 5 | 15 | 15 | 15 |
| | Resolves Dynam. Reconfig. Issues | 15 | 0 | 5 | 5 | 15 | 45 | 15 | 0 | 15 | 15 | 15 |
| | Support Alternative Implementations | 45 | 5 | 5 | 5 | 15 | 0 | 15 | 0 | 15 | 0 | 15 |
| | Selective Use Of Transmission Paths | 0 | 0 | 0 | 0 | 18 | 54 | 6 | 0 | 6 | 45 | 6 |
| | QoS Decisions From User Interface | 8 | 0 | 0 | 0 | 0 | 8 | 8 | 0 | 0 | 0 | 0 |

FIG. 20H

|  | Distributed Control | | | | | | | Agent Architecture | | | |
|---|---|---|---|---|---|---|---|---|---|---|---|
|  | Elm 1 | Elm 2 | Elm 3 | Elm 4 | Elm 5 | Elm 6 | Elm 7 | Elm 1 | Elm 2 | Elm 3 | Elm 4 |
| Design decision | 1 | 1 | 1 | 1 | 1 | 1 | 1 | 1 | 1 | 1 | 1 |
| Effective weight | 304 | 40 | 53 | 53 | 322 | 551 | 234 | 30 | 134 | 285 | 124 |

FIG. 20I

|  | Srvc. Creation | | | 2nd Class Mech. | | | QoS | | |
|---|---|---|---|---|---|---|---|---|---|
|  | Elm 1 | Elm 2 | Elm 3 | Elm 1 | Elm 2 | Elm 3 | Elm 1 | Elm 2 | Elm 3 |
| Calculated Weight | 575 | 308 | 340 | 144 | 95 | 56 | 339 | 343 | 358 |
| Orthogonal Control | 27 | 27 | 81 | 0 | 27 | 0 | 81 | 81 | 27 |
| User Service Definition | 0 | 0 | 27 | 9 | 27 | 9 | 81 | 81 | 27 |
| Service Libraries | 0 | 0 | 72 | 0 | 0 | 0 | 0 | 0 | 0 |
| Flex Control & Service Creation | 27 | 0 | 81 | 0 | 0 | 0 | 81 | 81 | 27 |
| Modifiable While In Operation | 0 | 0 | 0 | 0 | 0 | 0 | 0 | 0 | 0 |
| Upgrades on Demand | 0 | 0 | 0 | 0 | 0 | 0 | 0 | 0 | 0 |
| No System-wide Shutdown | 21 | 7 | 0 | 0 | 0 | 0 | 0 | 0 | 7 |
| Works On Different Phy. Networks | 6 | 0 | 0 | 0 | 0 | 0 | 0 | 0 | 6 |
| Comp. Service Establishment Rate | 0 | 0 | 4 | 0 | 0 | 0 | 0 | 0 | 0 |
| Works Over Mixed Domains | 0 | 21 | 7 | 0 | 0 | 0 | 0 | 0 | 0 |
| Flexible Resource Accounting | 15 | 0 | 15 | 0 | 0 | 0 | 45 | 45 | 45 |
| Track by Participating Device | 36 | 0 | 0 | 0 | 0 | 0 | 0 | 0 | 12 |
| Resource Consumption By Domain | 15 | 0 | 0 | 0 | 0 | 0 | 0 | 0 | 45 |
| Report QoS In Relation To SLA | 9 | 0 | 3 | 0 | 0 | 0 | 0 | 0 | 9 |
| Consumption Proration By Session | 0 | 0 | 0 | 0 | 0 | 0 | 36 | 36 | 4 |
| Non-participating Devices On Net Edge | 0 | 5 | 0 | 0 | 0 | 0 | 0 | 0 | 15 |
| Frame Based Edge-networks | 0 | 5 | 0 | 0 | 0 | 0 | 0 | 0 | 0 |
| Span Non-participating Switches | 8 | 0 | 0 | 0 | 0 | 0 | 0 | 0 | 0 |
| Support Graceful Srvc. Degradation | 36 | 12 | 0 | 0 | 0 | 0 | 0 | 4 | 12 |
| No Single Point of Failure | 54 | 54 | 0 | 6 | 0 | 6 | 0 | 0 | 6 |
| Fault Isolation & Adaptive Avoidance | 45 | 45 | 0 | 15 | 5 | 5 | 0 | 0 | 0 |
| Dynamic Network Reconfiguration | 63 | 21 | 0 | 63 | 21 | 21 | 7 | 7 | 21 |
| Scalable From Work Group To Global | 45 | 45 | 15 | 0 | 0 | 0 | 0 | 0 | 45 |
| Resolves Dynam. Reconfig. Issues | 45 | 45 | 0 | 45 | 15 | 15 | 0 | 0 | 15 |
| Support Alternative Implementations | 45 | 15 | 5 | 0 | 0 | 0 | 0 | 0 | 5 |
| Selective Use Of Transmission Paths | 54 | 6 | 6 | 6 | 0 | 0 | 0 | 0 | 6 |
| QoS Decisions From User Interface | 24 | 0 | 24 | 0 | 0 | 0 | 8 | 8 | 24 |

FIG. 20J

|  | Srvc. Creation ||| 2nd Class Mech. ||| QoS |||
|  | Elm 1 | Elm 2 | Elm 3 | Elm 1 | Elm 2 | Elm 3 | Elm 1 | Elm 2 | Elm 3 |
|---|---|---|---|---|---|---|---|---|---|
| Design decision | 1 | 1 | 1 | 1 | 1 | 1 | 1 | 1 | 1 |
| Effective weight | 575 | 308 | 340 | 144 | 95 | 56 | 339 | 343 | 358 |

FIG. 20K

| | | Software Design and Analysis Techniques | | | | | | | |
|---|---|---|---|---|---|---|---|---|---|
| | | Elm 1 | Elm 2 | Elm 3 | Elm 4 | Elm 5 | Elm 6 | Elm 7 | Elm 8 |
| Calculated Weight | | 131 | 8 | 97 | 66 | 96 | 366 | 63 | 385 |
| | Orthogonal Control | 0 | 0 | 0 | 0 | 0 | 0 | 0 | 27 |
| | User Service Definition | 9 | 0 | 27 | 0 | 0 | 9 | 9 | 9 |
| | Service Libraries | 0 | 8 | 0 | 0 | 0 | 0 | 0 | 0 |
| | Flex Control & Service Creation | 9 | 0 | 0 | 27 | 27 | 0 | 27 | 9 |
| | Modifiable While In Operation | 0 | 0 | 0 | 0 | 0 | 0 | 0 | 8 |
| | Upgrades on Demand | 0 | 0 | 0 | 0 | 0 | 0 | 0 | 8 |
| | No System-wide Shutdown | 0 | 0 | 0 | 0 | 0 | 7 | 0 | 21 |
| | Works On Different Phy. Networks | 6 | 0 | 0 | 0 | 0 | 0 | 6 | 0 |
| | Comp. Service Establishment Rate | 0 | 0 | 36 | 0 | 0 | 0 | 0 | 0 |
| | Works Over Mixed Domains | 63 | 0 | 0 | 0 | 0 | 21 | 0 | 21 |
| | Flexible Resource Accounting | 0 | 0 | 0 | 0 | 0 | 15 | 0 | 15 |
| | Track by Participating Device | 0 | 0 | 0 | 0 | 0 | 12 | 0 | 12 |
| | Resource Consumption By Domain | 0 | 0 | 0 | 0 | 0 | 15 | 0 | 15 |
| | Report QoS In Relation To SLA | 0 | 0 | 0 | 0 | 0 | 0 | 0 | 3 |
| | Consumption Proration By Session | 0 | 0 | 0 | 0 | 0 | 0 | 0 | 4 |
| | Non-participating Devices On Net Edge | 0 | 0 | 15 | 0 | 0 | 0 | 0 | 5 |
| | Frame Based Edge-networks | 0 | 0 | 0 | 0 | 0 | 0 | 0 | 5 |
| | Span Non-participating Switches | 8 | 0 | 0 | 0 | 0 | 8 | 0 | 8 |
| | Support Graceful Srvc. Degradation | 0 | 0 | 4 | 0 | 0 | 4 | 0 | 4 |
| | No Single Point of Failure | 6 | 0 | 0 | 6 | 6 | 54 | 0 | 54 |
| | Fault Isolation & Adaptive Avoidance | 5 | 0 | 0 | 0 | 0 | 45 | 0 | 45 |
| | Dynamic Network Reconfiguration | 0 | 0 | 0 | 0 | 63 | 63 | 21 | 21 |
| | Scalable From Work Group To Global | 15 | 0 | 15 | 0 | 0 | 45 | 0 | 45 |
| | Resolves Dynam. Reconfig. Issues | 5 | 0 | 0 | 15 | 0 | 45 | 0 | 15 |
| | Support Alternative Implementations | 5 | 0 | 0 | 0 | 0 | 5 | 0 | 5 |
| | Selective Use Of Transmission Paths | 0 | 0 | 0 | 18 | 0 | 18 | 0 | 18 |
| | QoS Decisions From User Interface | 0 | 0 | 0 | 0 | 0 | 0 | 0 | 8 |

FIG. 20L

| | Software Design and Analysis Techniques | | | | | | | |
|---|---|---|---|---|---|---|---|---|
| | Elm 1 | Elm 2 | Elm 3 | Elm 4 | Elm 5 | Elm 6 | Elm 7 | Elm 8 |
| Design decision | 1 | 1 | 1 | 1 | 1 | 1 | 1 | 1 |
| Effective weight | 131 | 8 | 97 | 66 | 96 | 366 | 63 | 385 |

FIG. 21A

| Concepts | | | Effective | Peer Control | | Domain Services | |
|---|---|---|---|---|---|---|---|
| Dimensions | | Elements | weight | In Chnl. | Out Chnl. | 2-Tier | Hierarchy |
| First-class Comm Links | | Common Comm Bus | 188 | 9 | 9 | 9 | 1 |
| | 5 | Peer Cntrl Msg In Data | 511 | 9 | 0 | 9 | 3 |
| | 6 | Path-based Logical Network Overlay | 46 | 9 | 9 | 3 | 3 |
| | 7 | Statistical Reservation of Virtual Channels | 65 | | | | |
| | 8 | Differential Priorities For Network Traffic | 96 | 3 | 1 | | |
| | 9 | Distributed Adaptive Link-level Scheduling | 392 | 9 | 0 | | |
| | 10 | Cell-In-Frame Protocol | 105 | 3 | 0 | | |
| | 11 | Hybrid Deposit Model Protocol | 48 | 3 | 0 | | |
| Distributed Control | | Scripting Language | 304 | | | 9 | 3 |
| | 13 | Hybrid Time- / Event- Triggered Architecture | 40 | 3 | 1 | | |
| | 14 | Coordination Language | 53 | | | | |
| | 15 | Coordination Mechanism | 53 | | | | |
| | 16 | Algorithmic Assignment Of Site / Node Ids | 322 | 3 | 1 | 9 | 3 |
| | 17 | Use of PNNI For Routing & UNI Signaling | 551 | 3 | 1 | 9 | 9 |
| | 18 | Two Tier Network Control Architecture | 234 | 3 | 1 | 9 | 1 |
| Agent Architecture | | Agent Behaviors Composed Of Primitives | 30 | | | | |
| | 20 | Layers Of Activity (Behavior, Local & Coop Plan) | 134 | | | 3 | 1 |
| | 21 | Software Trellis | 285 | | | | |
| | 22 | Roles for Agents Spanning Expectations | 124 | | | | |
| | 23 | Active Network Architecture | 575 | 9 | 3 | 9 | 3 |
| | 24 | Distributed Planning Among Multiple Agents | 308 | | | 9 | 3 |
| | 25 | Template Based Service Definitions | 340 | | | 3 | 3 |
| | 26 | (S) Dynamic Client Membership | 144 | 9 | 1 | 9 | 3 |
| | 27 | (S) Client Level Binding | 95 | 9 | 1 | 9 | 3 |
| | 28 | (S) Multicast | 56 | 9 | 1 | 9 | 3 |
| QoS | | QoS Establishment At Call Setup | 339 | | | | |
| | 30 | Joint Receiver QoS Signaling And Call Setup QoS | 343 | | | | |
| | 31 | Resource Management Framework | 358 | | | | |

FIG. 21B

| Concepts | | Effective | Peer Control | | Domain Services | |
|---|---|---|---|---|---|---|
| Dimensions | Elements | weight | In Chnl. | Out Chnl. | 2-Tier | Hierarchy |
| Software Design Techniques | | | | | | |
| | 33 Open Distributed Processing | 131 | | | 3 | 3 |
| | 34 Use Of Design Patterns | 8 | | | | |
| | 35 Object Partitioning For Max Hdwr/ Sftwr Intchange | 97 | | | | |
| | 36 SLCFSM | 66 | | | 3 | 3 |
| | 37 TCFSM | 96 | | 1 | 1 | 1 |
| | 38 Object Request Broker With Mobile Objects | 366 | 9 | | 9 | 3 |
| | 39 InterLanguage Unification System | 63 | | | | |
| | Distributed Intelligent & Adaptive Agents | 385 | | | | |

FIG. 21C

| Calculated Weight | Peer Control | | Domain Services | |
|---|---|---|---|---|
| | In Chnl. | Out Chnl | 2-Tier | Hierarchy |
| | 25545 | 5735 | 35133 | 15403 |
| Orthogonal Control | 1080 | 279 | 2214 | 1026 |
| User Service Definition | 540 | 63 | 837 | 351 |
| Service Libraries | 0 | 0 | 216 | 216 |
| Flex Control & Service Creation | 999 | 333 | 1917 | 837 |
| Modifiable While In Operation | 0 | 0 | 216 | 72 |
| Upgrades on Demand | 0 | 0 | 216 | 72 |
| No System-wide Shutdown | 1302 | 210 | 1260 | 770 |
| Works On Different Phy. Networks | 198 | 48 | 450 | 258 |
| Comp. Service Establishment Rate | 12 | 4 | 48 | 48 |
| Works Over Mixed Domains | 945 | 336 | 2289 | 1239 |
| Flexible Resource Accounting | 495 | 150 | 810 | 350 |
| Track by Participating Device | 576 | 168 | 864 | 360 |
| Resource Consumption By Domain | 465 | 140 | 675 | 295 |
| Report QoS In Relation To SLA | 171 | 48 | 315 | 111 |
| Consumption Proration By Session | 108 | 0 | 120 | 40 |
| Non-participating Devices On Net Edge | 285 | 5 | 225 | 65 |
| Frame Based Edge-networks | 165 | 10 | 135 | 65 |
| Span Non-participating Switches | 648 | 320 | 624 | 192 |
| Support Graceful Srvc. Degradation | 972 | 196 | 1152 | 424 |
| No Single Point of Failure | 2448 | 432 | 2922 | 1290 |
| Fault Isolation & Adaptive Avoidance | 2205 | 415 | 2715 | 1125 |
| Dynamic Network Rconfiguration | 3801 | 721 | 4263 | 1771 |
| Scalable From Work Group To Global | 2355 | 545 | 3165 | 1275 |
| Resolves Dynam. Reconfig Issues | 2340 | 510 | 3360 | 1380 |
| Support Alternative Implementations | 915 | 310 | 1605 | 495 |
| Selective Use Of Transmission Paths | 1656 | 324 | 1728 | 948 |
| QoS Decisions From User Interface | 864 | 168 | 792 | 328 |

FIG. 21D

| | Peer Control | | Domain Services | |
|---|---|---|---|---|
| | In Chnl. | Out Chnl | 2-Tier | Hierarchy |
| Design Decision A | 1 | | 1 | |
| Design Decision B | 1 | | 1 | 1 |

FIG. 21E

| Concepts | | | Service Definition | | Core ATM Transmission | |
|---|---|---|---|---|---|---|
| Dimensions | | Elements | Component | Discreet | Part. Only | Inc. NonPart |
| First-class Comm Links | | Common Comm Bus | | | | |
| | 5 | Peer Cntrl Msg In Data | | | 3 | 3 |
| | 6 | Path-based Logical Network Overlay | | | 9 | 3 |
| | 7 | Statistical Reservation of Virtual Channels | | | 3 | 3 |
| | 8 | Differential Priorities For Network Traffic | | | 3 | 3 |
| | 9 | Distributed Adaptive Link-level Scheduling | | | 9 | 3 |
| | 10 | Cell-In-Frame Protocol | | | 9 | 3 |
| | 11 | Hybrid Deposit Model Protocol | | | | |
| Distributed Control | | Scripting Language | 3 | 1 | | |
| | 13 | Hybrid Time- / Event- Triggered Architecture | | | | 0 |
| | 14 | Coordination Language | | | | 0 |
| | 15 | Coordination Mechanism | | | 3 | 3 |
| | 16 | Algorithmic Assignment Of Site / Node Ids | | | 3 | 9 |
| | 17 | Use of PNNI For Routing & UNI Signaling | | | 9 | 3 |
| | 18 | Two Tier Network Control Architecture | | | 9 | |
| Agent Architecture | | Agent Behaviors Composed Of Primitives | 9 | 1 | | |
| | 20 | Layers Of Activity (Behavior, Local & Coop Plan) | | | | |
| | 21 | Software Trellis | | | 3 | 0 |
| | 22 | Roles for Agents Spanning Expectations | | | 3 | 0 |
| | 23 | Active Network Architecture | | | 9 | 3 |
| | 24 | Distributed Planning Among Multiple Agents | | | | |
| | 25 | Template Based Service Definitions | 9 | | | |
| | 26 | (S) Dynamic Client Membership | | | | |
| | 27 | (S) Client Level Binding | | | | |
| | 28 | (S) Multicast | | | | |
| QoS | | QoS Establishment At Call Setup | 3 | 3 | 3 | 3 |
| | 30 | Joint Receiver QoS Signaling And Call Setup QoS | 9 | 3 | 3 | 1 |
| | 31 | Resource Management Framework | 9 | 3 | 9 | 3 |

FIG. 21F

| Concepts | | Service Definition | | Core ATM Transmission | |
|---|---|---|---|---|---|
| Dimensions | Elements | Component | Discreet | Part. Only | Inc. NonPart |
| Software Design Techniques | Open Distributed Processing | | | | |
| | 33 Use Of Design Patterns | 9 | 3 | | |
| | 34 Object Partitioning For Max Hdwr/ Sftwr Intchange | | | 9 | 1 |
| | 35 SLCFSM | | | 9 | 9 |
| | 36 TCFSM | | | | |
| | 37 Object Request Broker With Mobile Objects | 3 | 3 | 3 | 3 |
| | 38 InterLanguage Unification System | | | | |
| | 39 Distributed Intelligent & Adaptive Agents | | | 3 | 1 |

FIG. 21G

| Calculated Weight | Service Definition | | Core ATM Transmission | |
|---|---|---|---|---|
| | Component | Discreet | Part. Only | Inc. NonPart |
| | 12738 | 4916 | 34032 | 16854 |
| Orthogonal Control | 2025 | 675 | 1998 | 1080 |
| User Service Definition | 1647 | 657 | 1107 | 495 |
| Service Libraries | 792 | 104 | 0 | 0 |
| Flex Control & Service Creation | 2187 | 729 | 1944 | 1008 |
| Modifiable While In Operation | 72 | 24 | 240 | 8 |
| Upgrades on Demand | 144 | 32 | 240 | 8 |
| No System-wide Shutdown | 84 | 42 | 1869 | 1008 |
| Works On Different Phy. Networks | 72 | 24 | 396 | 252 |
| Comp. Service Establishment Rate | 36 | 4 | 360 | 72 |
| Works Over Mixed Domains | 189 | 91 | 1197 | 966 |
| Flexible Resource Accounting | 1125 | 465 | 1290 | 675 |
| Track by Participating Device | 144 | 72 | 720 | 408 |
| Resource Consumption By Domain | 450 | 180 | 930 | 465 |
| Report QoS In Relation To SLA | 108 | 30 | 333 | 147 |
| Consumption Proration By Session | 468 | 228 | 408 | 196 |
| Non-participating Devices On Net Edge | 135 | 45 | 465 | 125 |
| Frame Based Edge-networks | 0 | 0 | 105 | 65 |
| Span Non-participating Switches | 24 | 24 | 504 | 224 |
| Support Graceful Srvc. Degradation | 156 | 60 | 1464 | 504 |
| No Single Point of Failure | 216 | 180 | 2682 | 1386 |
| Fault Isolation & Adaptive Avoidance | 135 | 135 | 2250 | 1125 |
| Dynamic Network Rconfiguration | 525 | 315 | 3381 | 1729 |
| Scalable From Work Group To Global | 735 | 295 | 3660 | 1650 |
| Resolves Dynam. Reconfig Issues | 315 | 195 | 2055 | 1170 |
| Support Alternative Implementations | 240 | 80 | 1050 | 350 |
| Selective Use Of Transmission Paths | 162 | 78 | 2160 | 1242 |
| QoS Decisions From User Interface | 552 | 152 | 1224 | 496 |

|  | Service Definition | | Core ATM Transmission | |
|---|---|---|---|---|
|  | Component | Discreet | Part. Only | Inc. NonPart |
| Design Decision A | 1 | | 1 | |
| Design Decision B | | 1 | | 1 |

| Concepts | | | Edge Domains | | Term. Device | |
|---|---|---|---|---|---|---|
| Dimensions | | Elements | ATM Only | ATM/Frame | Part. Only | Inc. NonPart |
| First-class Comm Links | | Common Comm Bus | 9 | 9 | 3 | 1 |
| | 5 | Peer Cntrl Msg In Data | 9 | 9 | 3 | 1 |
| | 6 | Path-based Logical Network Overlay | 3 | 3 | 3 | 1 |
| | 7 | Statistical Reservation of Virtual Channels | 9 | 3 | 3 | 0 |
| | 8 | Differential Priorities For Network Traffic | 9 | 3 | 3 | 1 |
| | 9 | Distributed Adaptive Link-level Scheduling | 9 | 3 | 3 | 1 |
| | 10 | Cell-In-Frame Protocol | 0 | 9 | | 3 |
| | 11 | Hybrid Deposit Model Protocol | 3 | 3 | | |
| Distributed Control | | Scripting Language | | | 9 | 0 |
| | 13 | Hybrid Time- / Event- Triggered Architecture | | | | |
| | 14 | Coordination Language | | | 3 | 0 |
| | 15 | Coordination Mechanism | | | 3 | 0 |
| | 16 | Algorithmic Assignment Of Site / Node Ids | | | | |
| | 17 | Use of PNNI For Routing & UNI Signaling | 9 | 3 | 3 | 1 |
| | 18 | Two Tier Network Control Architecture | 3 | 1 | 3 | 1 |
| Agent Architecture | | Agent Behaviors Composed Of Primitives | | | | |
| | 20 | Layers Of Activity (Behavior, Local & Coop Plan) | | | 3 | 0 |
| | 21 | Software Trellis | 3 | 1 | | |
| | 22 | Roles for Agents Spanning Expectations | | | | |
| | 23 | Active Network Architecture | 3 | 1 | 3 | 0 |
| | 24 | Distributed Planning Among Multiple Agents | | | | |
| | 25 | Template Based Service Definitions | | | | |
| | 26 | (S) Dynamic Client Membership | 3 | 1 | 3 | 1 |
| | 27 | (S) Client Level Binding | 3 | 1 | | |
| | 28 | (S) Multicast | 3 | 1 | | |
| QoS | | QoS Establishment At Call Setup | | | | |
| | 30 | Joint Receiver QoS Signaling And Call Setup QoS | 1 | 3 | 3 | 0 |
| | 31 | Resource Management Framework | 3 | 1 | 3 | 1 |

FIG. 21J

| Concepts | | Edge Domains | | | Term. Device | |
|---|---|---|---|---|---|---|
| Dimensions | Elements | ATM Only | ATM/Frame | Part. Only | Inc. | NonPart |
| Software Design Techniques | | | | | | |
| 33 | Open Distributed Processing | | | | | |
| 34 | Use Of Design Patterns | 3 | 1 | | | |
| 35 | Object Partitioning For Max Hdwr/ Sftwr Intchange | | | | | |
| 36 | SLCFSM | | | | | |
| 37 | TCFSM | | | | | |
| 38 | Object Request Broker With Mobile Objects | | | | | |
| 39 | InterLanguage Unification System | | | 3 | | 1 |
| | Distributed Intelligent & Adaptive Agents | | | | | |

FIG. 21K

| Calculated Weight | Edge Domains | | Term. Device | |
|---|---|---|---|---|
| | ATM Only | ATM/Frame | Part. Only | Inc. NonPart |
| | 23116 | 13947 | 15840 | 3220 |
| Orthogonal Control | 1242 | 810 | 1053 | 153 |
| User Service Definition | 648 | 450 | 648 | 54 |
| Service Libraries | 0 | 0 | 0 | 0 |
| Flex Control & Service Creation | 1215 | 945 | 1512 | 117 |
| Modifiable While In Operation | 216 | 72 | 240 | 8 |
| Upgrades on Demand | 216 | 72 | 240 | 8 |
| No System-wide Shutdown | 1554 | 686 | 651 | 189 |
| Works On Different Phy. Networks | 270 | 126 | 180 | 36 |
| Comp. Service Establishment Rate | 144 | 48 | 12 | 4 |
| Works Over Mixed Domains | 945 | 567 | 630 | 126 |
| Flexible Resource Accounting | 630 | 390 | 495 | 100 |
| Track by Participating Device | 252 | 84 | 216 | 36 |
| Resource Consumption By Domain | 420 | 200 | 330 | 90 |
| Report QoS In Relation To SLA | 135 | 63 | 117 | 27 |
| Consumption Proration By Session | 300 | 268 | 180 | 20 |
| Non-participating Devices On Net Edge | 240 | 575 | 255 | 175 |
| Frame Based Edge-networks | 60 | 425 | 180 | 150 |
| Span Non-participating Switches | 480 | 464 | 288 | 64 |
| Support Graceful Srvc. Degradation | 916 | 556 | 588 | 104 |
| No Single Point of Failure | 1854 | 990 | 1026 | 258 |
| Fault Isolation & Adaptive Avoidance | 1635 | 905 | 900 | 225 |
| Dynamic Network Rconfiguration | 2821 | 1477 | 1617 | 350 |
| Scalable From Work Group To Global | 2400 | 1170 | 1365 | 335 |
| Resolves Dynam. Reconfig Issues | 1410 | 840 | 990 | 205 |
| Support Alternative Implementations | 645 | 560 | 855 | 100 |
| Selective Use Of Transmission Paths | 1476 | 612 | 720 | 174 |
| QoS Decisions From User Interface | 992 | 592 | 552 | 112 |

FIG. 21L

|  | Edge Domains | | Term. Device | |
|---|---|---|---|---|
|  | ATM Only | ATM/Frame | Part. Only | Inc. NonPart |
| Design Decision A | 1 | | 1 | |
| Design Decision B | | 1 | | 1 |

FIG. 22A

| | Total Design Score | Peer Control | | Domain Services | | Service Definition | | Core ATM Transmission | | | Edge Domains | | Term. Device | |
|---|---|---|---|---|---|---|---|---|---|---|---|---|---|---|
| | | In Chnl. | Out Chnl. | 2-Tier | Hier-archy | Com-ponent | Dis-creet | Part. Only | Inc. Non-Part | | ATM Only | ATM/Frame | Part. Only | Inc. Non-Part |
| | 146404 | | | | | | | | | | | | | |
| Orthogonal Control | 9612 | 1080 | 0 | 2214 | 0 | 2025 | 0 | 1998 | 0 | | 1242 | 0 | 1053 | 0 |
| User Service Definition | 5427 | 540 | 0 | 837 | 0 | 1647 | 0 | 1107 | 0 | | 648 | 0 | 648 | 0 |
| Service Libraries | 1008 | 0 | 0 | 216 | 0 | 792 | 0 | 0 | 0 | | 0 | 0 | 0 | 0 |
| Flex Control & Service Creation | 9774 | 999 | 0 | 1917 | 0 | 2187 | 0 | 1944 | 0 | | 1215 | 0 | 1512 | 0 |
| Modifiable While In Operation | 984 | 0 | 0 | 216 | 0 | 72 | 0 | 240 | 0 | | 216 | 0 | 240 | 0 |
| Upgrades on Demand | 1056 | 0 | 0 | 216 | 0 | 144 | 0 | 240 | 0 | | 216 | 0 | 240 | 0 |
| No System-wide Shutdown | 6720 | 1302 | 0 | 1260 | 0 | 84 | 0 | 1869 | 0 | | 1554 | 0 | 651 | 0 |
| Works On Different Phy. Networks | 1566 | 198 | 0 | 450 | 0 | 72 | 0 | 396 | 0 | | 270 | 0 | 180 | 0 |
| Comp. Service Establishment Rate | 612 | 12 | 0 | 48 | 0 | 36 | 0 | 360 | 0 | | 144 | 0 | 12 | 0 |
| Works Over Mixed Domains | 6195 | 945 | 0 | 2289 | 0 | 189 | 0 | 1197 | 0 | | 945 | 0 | 630 | 0 |
| Flexible Resource Accounting | 4845 | 495 | 0 | 810 | 0 | 1125 | 0 | 1290 | 0 | | 630 | 0 | 495 | 0 |
| Track by Participating Device | 2772 | 576 | 0 | 864 | 0 | 144 | 0 | 720 | 0 | | 252 | 0 | 216 | 0 |
| Resource Consumption By Domain | 3270 | 465 | 0 | 675 | 0 | 450 | 0 | 930 | 0 | | 420 | 0 | 330 | 0 |
| Report QoS In Relation To SLA | 1179 | 171 | 0 | 315 | 0 | 108 | 0 | 333 | 0 | | 135 | 0 | 117 | 0 |
| Consumption Proration By Session | 1584 | 108 | 0 | 120 | 0 | 468 | 0 | 408 | 0 | | 300 | 0 | 180 | 0 |
| Non-participating Devices On Net Edge | 1605 | 285 | 0 | 225 | 0 | 135 | 0 | 465 | 0 | | 240 | 0 | 255 | 0 |
| Frame Based Edge-networks | 645 | 165 | 0 | 135 | 0 | 0 | 0 | 105 | 0 | | 60 | 0 | 180 | 0 |
| Span Non-participating Switches | 2568 | 648 | 0 | 624 | 0 | 24 | 0 | 504 | 0 | | 480 | 0 | 288 | 0 |
| Support Graceful Srvc. Degradation | 5248 | 972 | 0 | 1152 | 0 | 156 | 0 | 1464 | 0 | | 916 | 0 | 588 | 0 |
| No Single Point of Failure | 11148 | 2448 | 0 | 2922 | 0 | 216 | 0 | 2682 | 0 | | 1854 | 0 | 1026 | 0 |
| Fault Isolation & Adaptive Avoidance | 9840 | 2205 | 0 | 2715 | 0 | 135 | 0 | 2250 | 0 | | 1635 | 0 | 900 | 0 |

FIG. 22B

| | Total Design Score | Peer Control | | Domain Services | | Service Definition | | Core ATM Transmission | | Edge Domains | | Term. Device | |
|---|---|---|---|---|---|---|---|---|---|---|---|---|---|
| | | In Chnl. | Out Chnl. | 2-Tier | Hier-archy | Com-ponent | Dis-creet | Part. Only | Inc. Non-Part | ATM Only | ATM/ Frame | Part. Only | Inc. Non-Part |
| | 146404 | 3801 | 0 | 4263 | 0 | 525 | 0 | 3381 | 0 | 2821 | 0 | 1617 | 0 |
| Dynamic Network Reconfiguration | 16408 | | | | | | | | | | | | |
| Scalable From Work Group To Global | 13680 | 2355 | 0 | 3165 | 0 | 735 | 0 | 3660 | 0 | 2400 | 0 | 1365 | 0 |
| Resolves Dynam. Reconfig Issues | 10470 | 2340 | 0 | 3360 | 0 | 315 | 0 | 2055 | 0 | 1410 | 0 | 990 | 0 |
| Support Alternative Implementations | 5310 | 915 | 0 | 1605 | 0 | 240 | 0 | 1050 | 0 | 645 | 0 | 855 | 0 |
| Selective Use Of Transmission Paths | 7902 | 1656 | 0 | 1728 | 0 | 162 | 0 | 2160 | 0 | 1476 | 0 | 720 | 0 |
| QoS Decisions From User Interface | 4976 | 864 | 0 | 792 | 0 | 552 | 0 | 1224 | 0 | 992 | 0 | 552 | 0 |
| Design Alternative A Decisions | | 1 | 0 | 1 | 0 | 1 | 0 | 1 | 0 | 1 | 0 | 1 | 0 |

FIG. 22C

| | Total Design Score | Peer Control | | Domain Services | | Service Definition | | Core ATM Transmission | | Edge Domains | | Term. Device | |
|---|---|---|---|---|---|---|---|---|---|---|---|---|---|
| | | In Chnl. | Out Chnl. | Hier-archy | 2-Tier | Com-ponent | Dis-creet | Part. Only | Inc. Non-Part | ATM Only | ATM/Frame | Part. Only | Inc. Non-Part |
| Total Design Score | 107437 | | | | | | | | | | | | |
| Orthogonal Control | 7362 | 1080 | 0 | 0 | 2214 | 2025 | 0 | 0 | 1080 | 0 | 810 | 0 | 153 |
| User Service Definition | 4023 | 540 | 0 | 0 | 837 | 1647 | 0 | 0 | 495 | 0 | 450 | 0 | 54 |
| Service Libraries | 1008 | 0 | 0 | 0 | 216 | 792 | 0 | 0 | 0 | 0 | 0 | 0 | 0 |
| Flex Control & Service Creation | 7173 | 999 | 0 | 0 | 1917 | 2187 | 0 | 0 | 1008 | 0 | 945 | 0 | 117 |
| Modifiable While In Operation | 376 | 0 | 0 | 0 | 216 | 72 | 0 | 0 | 8 | 0 | 72 | 0 | 8 |
| Upgrades on Demand | 448 | 0 | 0 | 0 | 216 | 144 | 0 | 0 | 8 | 0 | 72 | 0 | 8 |
| No System-wide Shutdown | 4529 | 1302 | 0 | 0 | 1260 | 84 | 0 | 0 | 1008 | 0 | 686 | 0 | 189 |
| Works On Different Phy. Networks | 1134 | 198 | 0 | 0 | 450 | 72 | 0 | 0 | 252 | 0 | 126 | 0 | 36 |
| Comp. Service Establishment Rate | 220 | 12 | 0 | 0 | 48 | 36 | 0 | 0 | 72 | 0 | 48 | 0 | 4 |
| Works Over Mixed Domains | 5082 | 945 | 0 | 0 | 2289 | 189 | 0 | 0 | 966 | 0 | 567 | 0 | 126 |
| Flexible Resource Accounting | 3595 | 495 | 0 | 0 | 810 | 1125 | 0 | 0 | 675 | 0 | 390 | 0 | 100 |
| Track by Participating Device | 2112 | 576 | 0 | 0 | 864 | 144 | 0 | 0 | 408 | 0 | 84 | 0 | 36 |
| Resource Consumption By Domain | 2345 | 465 | 0 | 0 | 675 | 450 | 0 | 0 | 465 | 0 | 200 | 0 | 90 |
| Report QoS In Relation To SLA | 831 | 171 | 0 | 0 | 315 | 108 | 0 | 0 | 147 | 0 | 63 | 0 | 27 |
| Consumption Proration By Session | 1180 | 108 | 0 | 0 | 120 | 468 | 0 | 0 | 196 | 0 | 268 | 0 | 20 |
| Non-participating Devices On Net Edge | 1520 | 285 | 0 | 0 | 225 | 135 | 0 | 0 | 125 | 0 | 575 | 0 | 175 |
| Frame Based Edge-networks | 940 | 165 | 0 | 0 | 135 | 0 | 0 | 0 | 65 | 0 | 425 | 0 | 150 |
| Span Non-participating Switches | 2048 | 648 | 0 | 0 | 624 | 24 | 0 | 0 | 224 | 0 | 464 | 0 | 64 |
| Support Graceful Srvc. Degradation | 3444 | 972 | 0 | 0 | 1152 | 156 | 0 | 0 | 504 | 0 | 556 | 0 | 104 |
| No Single Point of Failure | 8220 | 2448 | 0 | 0 | 2922 | 216 | 0 | 0 | 1386 | 0 | 990 | 0 | 258 |
| Fault Isolation & Adaptive Avoidance | 7310 | 2205 | 0 | 0 | 2715 | 135 | 0 | 0 | 1125 | 0 | 905 | 0 | 225 |
| Dynamic Network Reconfiguration | 12145 | 3801 | 0 | 0 | 4263 | 525 | 0 | 0 | 1729 | 0 | 1477 | 0 | 350 |
| Scalable From Work Group To Global | 9410 | 2355 | 0 | 0 | 3165 | 735 | 0 | 0 | 1650 | 0 | 1170 | 0 | 335 |

FIG. 22D

| Total Design Score | Peer Control | | Domain Services | | Service Definition | | Core ATM Transmission | | | Edge Domains | | Term. Device | |
|---|---|---|---|---|---|---|---|---|---|---|---|---|---|
| | In Chnl. | Out Chnl. | 2-Tier | Hier-archy | Com-ponent | Dis-creet | Part. Only | Inc. Non-Part | | ATM Only | ATM/ Frame | Part. Only | Inc. Non-Part |
| 107437 | | | | | | | | | | | | | |
| 8230 | 2340 | 0 | 3360 | 0 | 315 | 0 | 0 | 1170 | | 0 | 840 | 0 | 205 |
| 3770 | 915 | 0 | 1605 | 0 | 240 | 0 | 0 | 350 | | 0 | 560 | 0 | 100 |
| 5574 | 1656 | 0 | 1728 | 0 | 162 | 0 | 0 | 1242 | | 0 | 612 | 0 | 174 |
| 3408 | 864 | 0 | 792 | 0 | 552 | 0 | 0 | 496 | | 0 | 592 | 0 | 112 |
| | 1 | 0 | 1 | 0 | 1 | 0 | 0 | 1 | | 0 | 1 | 0 | 1 |

Resolves Dynam. Reconfig Issues
Support Alternative Implementations
Selective Use Of Transmission Paths
QoS Decisions From User Interface
Design Alternative B Decisions

FIG. 23

| Functional Class | Workstation | Server | Switch | Comm Links |
|---|---|---|---|---|
| Peer Control | X | X | X | |
| Service Creation | X | X | X | X |
| Local Device Control | X | X | X | |
| Communications Controller | X | X | X | |
| Stream Processing | X | X | X | X |
| QoS Monitoring | X | X | X | X |
| Protocols | X | X | X | X |
| Local Domain Services | X | X | X | |
| Inter-Domain Services | X | X | X | |
| Gateway | | X | X | X |
| Non-Participating Device Accommodation | | X | X | |

FIG. 24A

| Realization Mechanisms | Peer Control | Service Creation | Local Device Control | Communications Controller | Stream Processing | QoS Monitoring | Protocols |
|---|---|---|---|---|---|---|---|
| Template Based Service Definitions | x | x | | | | | |
| Distributed Planning Among Multiple Agents | x | x | | | | | x |
| Active Network Architecture | x | | x | x | x | x | x |
| Roles For Agents Spanning Expectations | x | x | | | | | x |
| Software Trellis | x | x | x | x | x | x | |
| Layers Of Activity (Behavior, Local & Coop Plan) | x | x | | | | | x |
| Agent Behaviors Composed Of Primitives | x | x | | | | | x |
| Two Tier Network Control Architecture | x | | | | | | x |
| Use Of PNNI For Routing & UNI Signaling | x | x | | | | | x |
| Algorithmic Assignment Of Site / Node Ids | x | x | | | | | x |
| Coordination Mechanism | x | x | x | | | | |
| Coordination Language | x | x | x | | | | |
| Hybrid Time- / Event-Triggered Architecture | x | x | x | x | x | x | x |
| Scripting Language | x | x | x | | | | |
| Hybrid Deposit Model Protocol | | x | x | x | x | x | |
| Cell-In-Frame Protocol | | x | | | x | x | |
| Distributed Adaptive Link-Level Scheduling | x | | | x | | x | x |
| Differential Priorities For Network Traffic | x | | x | x | x | x | x |
| Statistical Reservation Of Virtual Channels | x | | | x | | x | x |
| Path-Based Logical Network Overlay | x | | | | | | |
| Peer Cntl Msg in Data | x | | x | x | x | x | x |
| Common Comm Bus | x | x | x | x | x | x | x |

Functional Classes

FIG. 24B

| Realization Mechanisms (Cont'd.) | Peer Control | Service Creation | Local Device Control | Communications Controller | Stream Processing | QoS Monitoring | Protocols |
|---|---|---|---|---|---|---|---|
| Dynamic Client Membership (S) | X | X | | | X | | X |
| Client Level Binding (S) | X | X | | | | | X |
| Multicast (S) | | X | | X | | X | X |
| QoS Establishment At Call Setup | X | X | X | X | X | X | X |
| Joint Receiver QoS Signaling And Call Setup QoS | X | X | X | X | X | X | X |
| Resource Management Framework | X | X | | | X | X | X |
| Open Distributed Processing | | X | | | | | |
| Use Of Design Patterns | | X | X | | | | |
| Object Partitioning For Max Hdwr/Sftwr Interchange | X | X | | | | | |
| SLCFSM | X | | | X | X | | |
| TCFSM | | | | X | X | | |
| Object Request Broker With Mobile Objects | X | X | | | | | X |
| Inter-Language Unification System | X | | | | | | |
| Distributed Intelligent & Adaptive Agents | X | X | | | | | X |

Functional Classes

FIG. 24C

| Functional Classes (Cont'd.) | Local Domain Services | Inter-Domain Services | Gateway | Non-Participating Device Accommodation |
|---|:---:|:---:|:---:|:---:|
| Realization Mechanisms | | | | |
| Common Comm Bus | X | X | X | X |
| Peer Cntrl Msg In Data | X | X | X | X |
| Path-Based Logical Network Overlay | X | X | X | X |
| Statistical Reservation Of Virtual Channels | X | X | X | X |
| Differential Priorities For Network Traffic | X | X | X | X |
| Distributed Adaptive Link-Level Scheduling | X | X | X | X |
| Cell-In-Frame Protocol |  |  | X | X |
| Hybrid Deposit Model Protocol |  |  | X | X |
| Scripting Language | X | X | X |  |
| Hybrid Time- / Event- Triggered Architecture | X | X | X | X |
| Coordination Language | X | X | X | X |
| Coordination Mechanism | X | X | X | X |
| Algorithmic Assignment Of Site / Node Ids | X | X | X | X |
| Use Of PNNI For Routing & UNI Signaling |  |  | X | X |
| Two Tier Network Control Architecture | X | X |  | X |
| Agent Behaviors Composed Of Primitives | X | X |  |  |
| Layers Of Activity (Behavior, Local & Coop Plan) | X | X | X |  |
| Software Trellis | X | X | X |  |
| Roles For Agents Spanning Expectations | X | X |  |  |
| Active Network Architecture | X | X | X | X |
| Distributed Planning Among Multiple Agents | X | X |  |  |
| Template Based Service Definitions | X | X | X | X |

FIG. 24D

| | Local Domain Services | Inter-Domain Services | Gateway | Non-Participating Device Accommodation |
|---|---|---|---|---|
| Functional Classes (Cont'd.) | | | | |
| Dynamic Client Membership (S) | X | X | X | |
| Client Level Binding (S) | | X | | |
| Multicast (S) | | X | X | |
| QoS Establishment At Call Setup | | | X | X |
| Joint Receiver QoS Signaling And Call Setup QoS | | | X | X |
| Realization Mechanisms (Cont'd.) | | | | |
| Resource Management Framework | X | X | X | |
| Open Distributed Processing | X | X | | |
| Use Of Design Patterns | X | X | | |
| Object Partitioning For Max Hdwr/Sftwr Interchange | X | X | X | |
| SLCFSM | X | X | X | |
| TCFSM | X | X | | |
| Object Request Broker With Mobile Objects | X | X | | |
| InterLanguage Unification System | | | | |
| Distributed Intelligent & Adaptive Agents | X | X | | |

FIG. 26A

| Data Series | Functional Class | Functional Coverage Indicator ||||||||
| | | Cumulative Allocation of Technical Impact to Functional Classes |||||||
| | | 1 | 2 | 3 | 4 | 5 | 6 | 7 |
|---|---|---|---|---|---|---|---|---|
| 1 | Peer Control | 110.20 | 167.70 | 218.80 | 295.80 | 344.80 | 418.00 | 462.75 |
| 2 | Local Device Control | 110.20 | 167.70 | 218.80 | 295.80 | 295.80 | 369.00 | 369.00 |
| 3 | Communications Controller | 0.00 | 57.50 | 108.60 | 108.60 | 157.60 | 157.60 | 157.60 |
| 4 | Stream Processing | 0.00 | 57.50 | 108.60 | 108.60 | 108.60 | 108.60 | 153.35 |
| 5 | Service Creation | 0.00 | 0.00 | 0.00 | 0.00 | 0.00 | 0.00 | 44.75 |
| 6 | QoS Monitoring | 0.00 | 57.50 | 108.60 | 108.60 | 157.60 | 157.60 | 202.35 |
| 7 | Protocols | 110.20 | 167.70 | 218.80 | 295.80 | 344.80 | 418.00 | 462.75 |
| 8 | Gateway | 110.20 | 167.70 | 218.80 | 218.80 | 267.80 | 267.80 | 312.55 |
| 9 | Non-Participating Device Accommodation | 110.20 | 167.70 | 218.80 | 218.80 | 267.80 | 267.80 | 267.80 |
| 10 | Local Domain Services | 0.00 | 57.50 | 108.60 | 185.60 | 234.60 | 307.80 | 352.55 |
| 11 | Inter-Domain Services | 0.00 | 57.50 | 108.60 | 185.60 | 234.60 | 307.80 | 352.55 |
| | Total Cumulative Coverage | 551.00 | 1126.00 | 1637.00 | 2022.00 | 2414.00 | 2780.00 | 3138.00 |

FIG. 26B

| Data Series | Functional Class | Functional Coverage Indicator | | | | | | | |
|---|---|---|---|---|---|---|---|---|---|
| | | Cumulative Allocation of Technical Impact to Functional Classes | | | | | | | |
| | | 8 | 9 | 10 | 11 | 12 | 13 | 14 | 15 |
| 1 | Peer Control | 500.42 | 538.53 | 538.53 | 584.53 | 635.19 | 666.86 | 728.46 | 775.26 |
| 2 | Local Device Control | 406.67 | 444.78 | 501.44 | 547.44 | 598.11 | 629.78 | 691.38 | 691.38 |
| 3 | Communications Controller | 195.27 | 233.38 | 233.38 | 233.38 | 233.38 | 265.04 | 265.04 | 265.04 |
| 4 | Stream Processing | 191.02 | 229.13 | 229.13 | 229.13 | 229.13 | 260.79 | 260.79 | 260.79 |
| 5 | Service Creation | 82.42 | 120.53 | 177.19 | 177.19 | 227.86 | 227.86 | 227.86 | 227.86 |
| 6 | QoS Monitoring | 240.02 | 278.13 | 278.13 | 278.13 | 278.13 | 309.79 | 309.79 | 309.79 |
| 7 | Protocols | 500.42 | 538.53 | 538.53 | 584.53 | 584.53 | 616.19 | 677.79 | 724.59 |
| 8 | Gateway | 350.22 | 388.33 | 444.99 | 490.99 | 541.66 | 573.33 | 573.33 | 573.33 |
| 9 | Non-Participating Device Accommodation | 305.47 | 343.58 | 400.24 | 446.24 | 446.24 | 446.24 | 446.24 | 493.04 |
| 10 | Local Domain Services | 352.55 | 352.55 | 409.22 | 455.22 | 505.88 | 537.55 | 599.15 | 645.95 |
| 11 | Inter-Domain Services | 352.55 | 352.55 | 409.22 | 455.22 | 505.88 | 537.55 | 599.15 | 645.95 |
| | Total Cumulative Coverage | 3477.03 | 3820.02 | 4160.00 | 4482.00 | 4785.99 | 5070.98 | 5378.98 | 5612.98 |

FIG. 26C

| Data Series | Functional Class | Functional Coverage Indicator ||||||||
| | | Cumulative Allocation of Technical Impact to Functional Classes ||||||||
| | | 16 | 17 | 18 | 19 | 20 | 21 | 22 | 23 |
|---|---|---|---|---|---|---|---|---|---|
| 1 | Peer Control | 792.35 | 814.69 | 835.26 | 860.06 | 860.06 | 879.46 | 879.46 | 879.46 |
| 2 | Local Device Control | 708.47 | 730.80 | 730.80 | 755.60 | 799.27 | 818.67 | 818.67 | 818.67 |
| 3 | Communications Controller | 282.14 | 282.14 | 282.14 | 282.14 | 282.14 | 282.14 | 282.14 | 306.14 |
| 4 | Stream Processing | 277.89 | 277.89 | 277.89 | 277.89 | 277.89 | 277.89 | 277.89 | 301.89 |
| 5 | Service Creation | 244.95 | 244.95 | 265.52 | 265.52 | 265.52 | 265.52 | 286.52 | 286.52 |
| 6 | QoS Monitoring | 326.89 | 326.89 | 347.46 | 347.46 | 347.46 | 347.46 | 368.46 | 368.46 |
| 7 | Protocols | 741.69 | 764.02 | 784.59 | 809.39 | 809.39 | 809.39 | 830.39 | 830.39 |
| 8 | Gateway | 590.42 | 612.75 | 633.32 | 633.32 | 633.32 | 652.72 | 673.72 | 673.72 |
| 9 | Non-Participating Device Accommodation | 510.14 | 510.14 | 510.14 | 510.14 | 510.14 | 510.14 | 531.14 | 531.14 |
| 10 | Local Domain Services | 663.04 | 685.37 | 705.95 | 730.75 | 774.41 | 793.81 | 793.81 | 817.81 |
| 11 | Inter-Domain Services | 663.04 | 685.37 | 705.95 | 730.75 | 774.41 | 793.81 | 793.81 | 817.81 |
| | Total Cumulative Coverage | 5801.02 | 5935.01 | 6079.02 | 6203.02 | 6334.01 | 6431.01 | 6536.01 | 6632.01 |

FIG. 26D

| | | Functional Coverage Indicator | | | | | | | |
|---|---|---|---|---|---|---|---|---|---|
| | | Cumulative Allocation of Technical Impact to Functional Classes | | | | | | | |
| Data Series | Functional Class | 24 | 25 | 26 | 27 | 28 | 29 | 30 | 31 |
| 1 | Peer Control | 889.06 | 912.81 | 923.81 | 931.93 | 994.93 | 994.93 | 1002.50 | 1010.07 |
| 2 | Local Device Control | 828.27 | 828.27 | 828.27 | 828.27 | 828.27 | 828.27 | 835.84 | 843.41 |
| 3 | Communications Controller | 315.74 | 315.74 | 326.74 | 334.86 | 334.86 | 346.06 | 346.06 | 346.06 |
| 4 | Stream Processing | 311.49 | 311.49 | 322.49 | 322.49 | 322.49 | 322.49 | 322.49 | 322.49 |
| 5 | Service Creation | 286.52 | 310.27 | 310.27 | 310.27 | 310.27 | 321.47 | 329.04 | 336.62 |
| 6 | QoS Monitoring | 378.06 | 378.06 | 378.06 | 386.18 | 386.18 | 397.38 | 397.38 | 397.38 |
| 7 | Protocols | 839.99 | 863.74 | 863.74 | 871.87 | 871.87 | 883.07 | 883.07 | 883.07 |
| 8 | Gateway | 683.32 | 707.07 | 718.07 | 726.20 | 726.20 | 737.40 | 744.97 | 752.54 |
| 9 | Non-Participating Device Accommodation | 540.74 | 540.74 | 540.74 | 548.86 | 548.86 | 548.86 | 556.43 | 564.00 |
| 10 | Local Domain Services | 827.41 | 827.41 | 838.41 | 846.54 | 846.54 | 846.54 | 854.11 | 861.68 |
| 11 | Inter-Domain Services | 827.41 | 827.41 | 838.41 | 846.54 | 846.54 | 846.54 | 854.11 | 861.68 |
| | Total Cumulative Coverage | 6728.01 | 6823.01 | 6889.01 | 6954.01 | 7017.01 | 7073.01 | 7126.00 | 7179.00 |

FIG. 26E

| Data Series | Functional Class | Functional Coverage Indicator | | | | |
|---|---|---|---|---|---|---|
| | | Cumulative Allocation of Technical Impact to Functional Classes | | | | |
| | | 32 | 33 | 34 | 35 | 36 |
| 1 | Peer Control | 1010.07 | 1019.27 | 1022.91 | 1028.91 | 1028.91 |
| 2 | Local Device Control | 849.41 | 849.41 | 853.05 | 859.05 | 861.05 |
| 3 | Communications Controller | 352.06 | 352.06 | 355.70 | 355.70 | 355.70 |
| 4 | Stream Processing | 328.49 | 328.49 | 332.12 | 332.12 | 332.12 |
| 5 | Service Creation | 342.62 | 342.62 | 346.25 | 346.25 | 348.25 |
| 6 | QoS Monitoring | 403.38 | 403.38 | 407.02 | 407.02 | 407.02 |
| 7 | Protocols | 889.07 | 889.07 | 892.70 | 898.70 | 898.70 |
| 8 | Gateway | 758.54 | 767.74 | 771.38 | 771.38 | 771.38 |
| 9 | Non-Participating Device Accommodation | 570.00 | 579.20 | 582.84 | 582.84 | 582.84 |
| 10 | Local Domain Services | 861.68 | 870.88 | 874.52 | 880.52 | 882.52 |
| 11 | Inter-Domain Services | 861.68 | 870.88 | 874.52 | 880.52 | 882.52 |
| | Total Cumulative Coverage | 7227.00 | 7273.00 | 7313.01 | 7343.01 | 7351.01 |

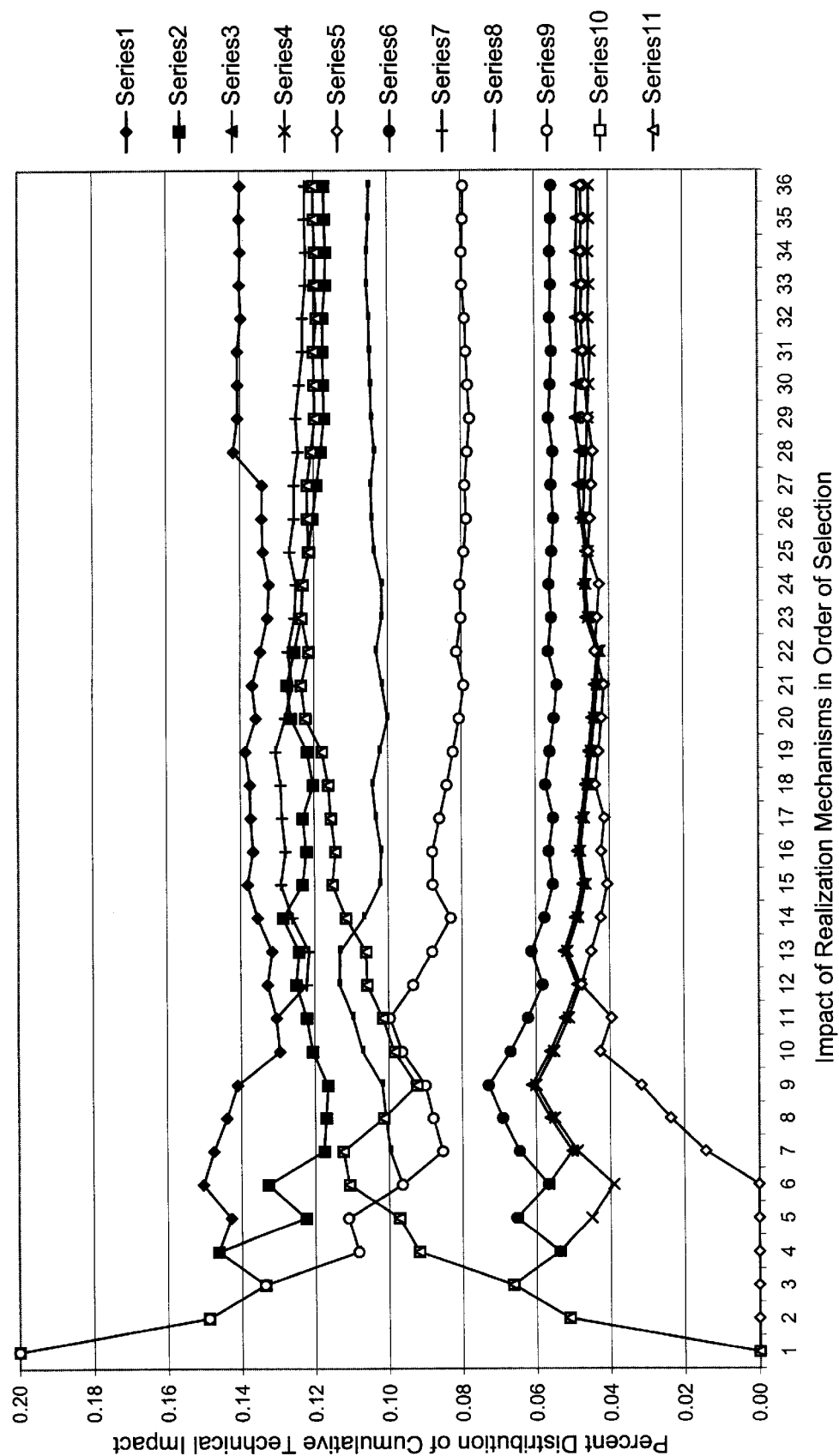

FIG. 28A

| Data Series | Functional Class | Common Size Functional Coverage Indicator ||||||||
| --- | --- | --- | --- | --- | --- | --- | --- | --- |
| | | | Distribution of Cumulative Technical Impact to System Functional Classes |||||||
| | | 1 | 2 | 3 | 4 | 5 | 6 | 7 |
| 1 | Peer Control | 0.20 | 0.15 | 0.13 | 0.15 | 0.14 | 0.15 | 0.15 |
| 2 | Local Device Control | 0.20 | 0.15 | 0.13 | 0.15 | 0.12 | 0.13 | 0.12 |
| 3 | Communications Controller | 0.00 | 0.05 | 0.07 | 0.05 | 0.07 | 0.06 | 0.05 |
| 4 | Stream Processing | 0.00 | 0.05 | 0.07 | 0.05 | 0.04 | 0.04 | 0.05 |
| 5 | Service Creation | 0.00 | 0.00 | 0.00 | 0.00 | 0.00 | 0.00 | 0.01 |
| 6 | QoS Monitoring | 0.00 | 0.05 | 0.07 | 0.05 | 0.07 | 0.06 | 0.06 |
| 7 | Protocols | 0.20 | 0.15 | 0.13 | 0.15 | 0.14 | 0.15 | 0.15 |
| 8 | Gateway | 0.20 | 0.15 | 0.13 | 0.11 | 0.11 | 0.10 | 0.10 |
| 9 | Non-Participating Device Accommodation | 0.00 | 0.05 | 0.07 | 0.09 | 0.10 | 0.10 | 0.09 |
| 10 | Local Domain Services | 0.00 | 0.05 | 0.07 | 0.09 | 0.11 | 0.11 | 0.11 |
| 11 | Inter-Domain Services | 0.00 | 0.05 | 0.07 | 0.09 | 0.10 | 0.11 | 0.11 |

FIG. 28B

| Data Series | Functional Class | Common Size Functional Coverage Indicator Distribution of Cumulative Technical Impact to System Functional Classes | | | | | | | |
|---|---|---|---|---|---|---|---|---|---|
| | | 8 | 9 | 10 | 11 | 12 | 13 | 14 | 15 |
| 1 | Peer Control | 0.14 | 0.14 | 0.13 | 0.13 | 0.13 | 0.13 | 0.14 | 0.14 |
| 2 | Local Device Control | 0.12 | 0.12 | 0.12 | 0.12 | 0.12 | 0.12 | 0.13 | 0.12 |
| 3 | Communications Controller | 0.06 | 0.06 | 0.06 | 0.05 | 0.05 | 0.05 | 0.05 | 0.05 |
| 4 | Stream Processing | 0.05 | 0.06 | 0.06 | 0.05 | 0.05 | 0.05 | 0.05 | 0.05 |
| 5 | Service Creation | 0.02 | 0.03 | 0.04 | 0.04 | 0.05 | 0.04 | 0.04 | 0.04 |
| 6 | QoS Monitoring | 0.07 | 0.07 | 0.07 | 0.06 | 0.06 | 0.06 | 0.06 | 0.06 |
| 7 | Protocols | 0.14 | 0.14 | 0.13 | 0.13 | 0.12 | 0.12 | 0.13 | 0.13 |
| 8 | Gateway | 0.10 | 0.10 | 0.11 | 0.11 | 0.11 | 0.11 | 0.11 | 0.10 |
| 9 | Non-Participating Device Accommodation | 0.09 | 0.09 | 0.10 | 0.10 | 0.09 | 0.09 | 0.08 | 0.09 |
| 10 | Local Domain Services | 0.10 | 0.09 | 0.10 | 0.10 | 0.11 | 0.11 | 0.11 | 0.12 |
| 11 | Inter-Domain Services | 0.10 | 0.09 | 0.10 | 0.10 | 0.11 | 0.11 | 0.11 | 0.12 |

FIG. 28C

| Data Series | Functional Class | Common Size Functional Coverage Indicator Distribution of Cumulative Technical Impact to System Functional Classes | | | | | | | |
|---|---|---|---|---|---|---|---|---|---|
| | | 16 | 17 | 18 | 19 | 20 | 21 | 22 | 23 |
| 1 | Peer Control | 0.14 | 0.14 | 0.14 | 0.14 | 0.14 | 0.14 | 0.13 | 0.13 |
| 2 | Local Device Control | 0.12 | 0.12 | 0.12 | 0.12 | 0.13 | 0.13 | 0.13 | 0.12 |
| 3 | Communications Controller | 0.05 | 0.05 | 0.05 | 0.05 | 0.04 | 0.04 | 0.04 | 0.05 |
| 4 | Stream Processing | 0.05 | 0.05 | 0.05 | 0.04 | 0.04 | 0.04 | 0.04 | 0.05 |
| 5 | Service Creation | 0.04 | 0.04 | 0.04 | 0.04 | 0.04 | 0.04 | 0.04 | 0.04 |
| 6 | QoS Monitoring | 0.06 | 0.06 | 0.06 | 0.06 | 0.05 | 0.05 | 0.06 | 0.06 |
| 7 | Protocols | 0.13 | 0.13 | 0.13 | 0.13 | 0.13 | 0.13 | 0.13 | 0.13 |
| 8 | Gateway | 0.10 | 0.10 | 0.10 | 0.10 | 0.10 | 0.10 | 0.10 | 0.10 |
| 9 | Non-Participating Device Accommodation | 0.09 | 0.09 | 0.08 | 0.08 | 0.08 | 0.08 | 0.08 | 0.08 |
| 10 | Local Domain Services | 0.11 | 0.12 | 0.12 | 0.12 | 0.12 | 0.12 | 0.12 | 0.12 |
| 11 | Inter-Domain Services | 0.11 | 0.12 | 0.12 | 0.12 | 0.12 | 0.12 | 0.12 | 0.12 |

FIG. 28D

| Data Series | Functional Class | Common Size Functional Coverage Indicator — Distribution of Cumulative Technical Impact to System Functional Classes | | | | | | | |
|---|---|---|---|---|---|---|---|---|---|
| | | 24 | 25 | 26 | 27 | 28 | 29 | 30 | 31 |
| 1 | Peer Control | 0.13 | 0.13 | 0.13 | 0.13 | 0.14 | 0.14 | 0.14 | 0.14 |
| 2 | Local Device Control | 0.12 | 0.12 | 0.12 | 0.12 | 0.12 | 0.12 | 0.12 | 0.12 |
| 3 | Communications Controller | 0.05 | 0.05 | 0.05 | 0.05 | 0.05 | 0.05 | 0.05 | 0.05 |
| 4 | Stream Processing | 0.05 | 0.05 | 0.05 | 0.05 | 0.05 | 0.05 | 0.05 | 0.04 |
| 5 | Service Creation | 0.04 | 0.05 | 0.05 | 0.04 | 0.04 | 0.05 | 0.05 | 0.05 |
| 6 | QoS Monitoring | 0.06 | 0.06 | 0.05 | 0.06 | 0.06 | 0.06 | 0.06 | 0.06 |
| 7 | Protocols | 0.12 | 0.13 | 0.13 | 0.13 | 0.12 | 0.12 | 0.12 | 0.12 |
| 8 | Gateway | 0.10 | 0.10 | 0.10 | 0.10 | 0.10 | 0.10 | 0.10 | 0.10 |
| 9 | Non-Participating Device Accommodation | 0.08 | 0.08 | 0.08 | 0.08 | 0.08 | 0.08 | 0.08 | 0.08 |
| 10 | Local Domain Services | 0.12 | 0.12 | 0.12 | 0.12 | 0.12 | 0.12 | 0.12 | 0.12 |
| 11 | Inter-Domain Services | 0.12 | 0.12 | 0.12 | 0.12 | 0.12 | 0.12 | 0.12 | 0.12 |

FIG. 28E

Common Size Functional Coverage Indicator
Distribution of Cumulative Technical Impact to System Functional Classes

| Data Series | Functional Class | 32 | 33 | 34 | 35 | 36 |
|---|---|---|---|---|---|---|
| 1 | Peer Control | 0.14 | 0.14 | 0.14 | 0.14 | 0.14 |
| 2 | Local Device Control | 0.12 | 0.12 | 0.12 | 0.12 | 0.12 |
| 3 | Communications Controller | 0.05 | 0.05 | 0.05 | 0.05 | 0.05 |
| 4 | Stream Processing | 0.05 | 0.05 | 0.05 | 0.05 | 0.05 |
| 5 | Service Creation | 0.05 | 0.05 | 0.05 | 0.05 | 0.05 |
| 6 | QoS Monitoring | 0.06 | 0.06 | 0.06 | 0.06 | 0.06 |
| 7 | Protocols | 0.12 | 0.12 | 0.12 | 0.12 | 0.12 |
| 8 | Gateway | 0.10 | 0.11 | 0.11 | 0.11 | 0.10 |
| 9 | Non-Participating Device Accommodation | 0.08 | 0.08 | 0.08 | 0.08 | 0.08 |
| 10 | Local Domain Services | 0.12 | 0.12 | 0.12 | 0.12 | 0.12 |
| 11 | Inter-Domain Services | 0.12 | 0.12 | 0.12 | 0.12 | 0.12 |

FIG. 30A

| Reconciliation Issue | Peer-Control Resolution Approach |
|---|---|
| Higher-layer protocols such as TCP/IP provide the end-to-end transport service in most cases. If ATM is not used end-to-end, the QoS measures used in the ATM domain often have their effects masked by the effects of the traffic distortion created from the remainder of the end-to-end path in which they do not reside. | Peer-control active agents can reduce the level of complexity that surrounds the interactions of the ATM QoS delivery mechanisms with higher-layer protocols and applications by providing an intelligent bridge that is aware of the characteristics of both layers of control. |
| Queuing and buffering introduced into the network by routers and non-ATM-attached hosts skew the accuracy with which the lower-layer ATM services calculated delay and delay variation. | The use of peer-control agents in all participating domains and surrogate peer-control agents, representing intervening non-participating domains, ensures consistent treatment, QoS reporting and resource accounting reporting across all involved domains. |
| It has been suggested that most traffic on ATM networks would be primarily UBR or ABR connections, because higher-layer protocols and applications cannot request specific ATM QoS service classes and therefore cannot fully exploit the QoS capabilities of the VBR service categories. | Peer-control agents, in conjunction with the orthogonal service creation mechanism, can make advanced ATM QoS available to applications by determining the application load characteristics from the service template definition and by monitoring ongoing QoS and intervening when necessary to ensure the QoS level is maintained. |
| Because there is no limit to the duration of connections, and the ATM network can make decisions based only on the information available to it at the time the connection is established, the actual QoS may vary over the duration of the connection's lifetime. | Active peer-control agents can provide monitoring and induce changes in the network's performance throughout the duration of the connection, thereby minimizing the amount of variation that is likely to be experienced. |
| Differentiated Classes of Service provide the key to quality of service. Before you can provide a higher quality of service to any particular customer, application, or protocol, you must classify the traffic into classes and then determine the way in which to handle the various traffic classes as traffic moves through the network. | The orthogonal control mechanism and use of service template provides the basic mechanism by which the peer-control infrastructure can classify traffic. Furthermore, the local peer-control agent can provide active policing to make sure that traffic conforms to its defined class. The use of orthogonal control and service template can allow this policing to occur all the way up to the application level of the protocol stack. |

FIG. 30B

| Reconciliation Issue | Peer-Control Resolution Approach |
|---|---|
| The major strengths of any networking technology are simplicity and consistency. Simplicity yields scalable implementations that can readily interoperate. Consistency results in a set of capabilities that are complementary. The list of ATM functions may look like a grab bag of fashionable tools for traffic management without much regard for simplicity or consistency across the set of functions. It is left to the network operator to take a subset of these capabilities and create a stable set of network services. | The peer-oriented control infrastructure provides a method of introducing a filter, through the application of peer-control, which can introduce consistency that can span participating domains and non-invasively bridge non-participating ATM domains in order to deliver a stable set of network services. |

SYSTEM AND METHOD FOR PROVIDING PEER-ORIENTED CONTROL OF TELECOMMUNICATIONS SERVICES

REFERENCE TO PROVISIONAL APPLICATION

This non-provisional patent application claims the benefit of provisional patent application No. 60/081,710 filed on Apr. 14, 1998 and entitled "Peer-Oriented Control and Service Creation in a Internetworking Environment", which is incorporated by reference herein.

FIELD OF THE INVENTION

This invention relates to telecommunications and, more particularly, to a system and method for providing peer-oriented control of telecommunications services through the use of an application level or "logical level" control mechanism.

BACKGROUND

The deregulation of telephone companies, or Telcos, has lead to increased competition. In many cases, Telcos and other carriers, are freed by statute to offer to any other competitor with carrier status, substantial discounts designed to level the competitive playing field for the network access or bandwidth delivery portion of the access market. Then more bandwidth is available at a cheaper price than was previously possible. However, bandwidth and services are often bundled together and sold. Thus, many of the savings and benefits of the cheaper bandwidth are not realized by the user.

Thus, there is a need for an application level or logical level control mechanism for communication services used in support of various peer-oriented types of applications. There is also a need for a control mechanism that is orthogonal to the underlying native control mechanisms of the network being used. In other words, the control mechanism would function regardless of the intervening control mechanisms of the network. This capability allows application developers to use network services as components of their applications with minimal concern for the implementation of those services. Thus, the cheaper bandwidth may be purchased from telcos, without the added costs of attached services.

These needs will become apparent from the following text. For a number of years now, telecommunications and networking have been assuming increasingly strategic roles supporting the fundamental structure and operation of companies. One milepost that may be noted on this evolutionary path comes from an article in Business Week magazine published in the issue of Feb. 8, 1993. This article entitled "The Virtual Corporation" popularized the discussion of management concepts and practices that had been discussed in organizational management literature and practiced to varying degrees by organizationally sophisticated companies for some time. The introductory comments on the topic printed on the magazine's cover provided the framework for considering the topic:

Big, complex companies usually can't react fast enough. Small, nimble ones may not have the muscle. What's the answer? A new model that uses technology to link people, assets, and ideas in a temporary organization. After the business is done, it disbands. It's called the virtual corporation. Just another management fad—or a vision of the future?

Although the seeds of recent telecom and networking phenomenon are present within these introductory words, the current explosion of technologies, products, and variations for their strategic and tactical use was not fully foreseen or understood or at least was not expressed at this point in time.

In today's business environment, there is not so much of a revolution as there is a super accelerated evolution in the economic and information fabric in which business operates. Information accessibility and electronic connectivity combine to provide the equalizer on the frontier of global business and economic opportunity. As communication and networking technology developers seek to keep up with the escalating demand for more dynamic and easier communication capabilities, there is a shift in their market orientation. This shift in technology providers' approach to their market may be viewed as an indication of underlying environmental forces which will favor significant architectural changes in the structure of networks and the mode of creation for network services supporting collaborative applications.

In looking at the primary market approach, two fundamental orientations can be identified: the technology push and the application pull. The technology push orientation says "tell us what your network-related problems are and we will show how to solve them using a set of products." The application pull says "here are application level solutions to problems that your business currently has or is likely to have based on the evolution of the business environment and this solution is currently implemented using a set of products." The technology push is traditionally associated with manufacturers and generic networking resellers and integrators, whereas the application pull is normally associated with the true vertical market specialists.

Projecting the technology push and application pull orientation into the solution mindset of target market potential customers highlights the two corresponding dominant customer orientations: network centric (associated with the technology push orientation) and application centric (associated with the application pull orientation). Telcos and Competitive Access Providers (CAPS) can be used to illustrate these points for network resource providers, but it is important to realize that similar distinctions exist within end-user organizations where the network support organization generally holds network centric views, whereas the operating business units generally hold application centric views.

The network supplier market as represented by Telcos and CAPS, especially in the U.S., provides an interesting example with which to illustrate significant aspects of these differing orientations to the potential customer solution evaluation process. Since the start of deregulation and the opening of network access to competitive pressures, there has been an evolutionary force, i.e. competition, at work on the structure and basic business positioning of Telcos and businesses that would compete against them. Prior to the start of open competition for the network access market, the Telcos, as well as their limited competitors the CAPS, can be characterized as holding primarily what has been called network centric views of solutions. Characteristic of this view is the bundling of service and feature differentiators with combinations of "raw" bandwidth delivery infrastructures to create "products" which would be sold in a manner consistent with the technology push orientation. A case can be made that much the same situation currently exists within the network support groups that currently support the network infrastructures upon which the applications of large, medium and increasingly small companies are deployed.

With the coming of open competition in the network access markets, however, pressures of the new business environment have caused a fundamental shift in the structure and the business approach of such organizations. Specifically, what had been the service and non-connectivity related features of the "product" (aggregately identified as the "product differentiators") are rapidly being separated from the bandwidth delivery infrastructure and moved into non-regulated business units that function at the retail level and which compete with resellers, network integrators, and vertical market specialists. This evolution has been caused largely by new regulatory statutes that force the Telcos, or any other carrier, to offer to any other competitor with carrier status, substantial discounts designed to level the competitive playing field for the network access or bandwidth delivery portion of the access market.

This business environment situation has started an irreversible shift in the value creation chain for telecommunication services in which the biggest "added value" link will shift from the "wires" business associated with bandwidth transmission and delivery to the "product differentiator" services and features. The monolithic product set once associated with the telecommunications industry has been split into an interoperable bandwidth transport and delivery access infrastructure commodity and a separate service/feature creation opportunity that has significant potential for differentiation and value creation. This evolutionary transformation, which is now underway, has significant implication for the marketing channel mix of networking product vendors as the relative importance of technology push versus application pull orientations seek a new equilibrium in the new business environment.

One of the bandwidth transmission mediums is the asynchronous transfer mode, or ATM, transmission medium. The current service creation and network control architectures fail to adequately harness the potential flexibility of the ATM transport mechanism. The potential to carry any type of traffic, along with the ability to link terminating points over a mixture of public and private network resources in an on-demand fashion, opens up a whole new realm of technological challenges and economic potential, the ramifications of which are only beginning to be grasped.

However, despite the available bandwidth, there is still a need for the ability of individual end-users, or peers, to have the ability to set up and control services that have been typically set up and controlled by the telcos.

There are at least three potential reasons which might help to explain why this need has not already been met. First, a reliable, distributed, peer-oriented service creation facility is more difficult to develop as compared with currently existing telecommunications service creation mechanisms. Existing mechanisms may be viewed as utilizing a client-server model in the sense that a session requests a certain service capability from the network and the network control function responds by determining if the resources are available and then signaling to switches to establish the service. Part of the added complexity for a peer-oriented mechanism comes from the use of active peer-agents negotiating to set up and maintain a requested service. Some of the factors involved which contribute to this additional complexity include problems of managing distributed threads of control, including problems of process synchronization, as well as the greater risk of message loss or corruption introduced through the increased use of communication links connecting the collaborating processes which greatly increases the need for additional fault detection mechanisms.

The second reason which may contribute to the lack of such a solution concerns the evolution and current state of the public telecommunications networks. Metropolitan and wide-area networks are generally established utilizing the physical facilities of public telecommunications carriers. The networks that these carriers have deployed have evolved from networks which were originally established to handle analog voice traffic through switched circuit technology. A case can be made that much of the current architecture for service creation has come to be as the result of incremental response to evolutionary trends in service needs and resource capabilities as well as the cost structures that were associated with possible development path options. The development and introduction of ATM has provided the first standards-based transport mechanism that is designed to support all types of traffic. When combined with the User Network Interface (UNI) Staff ATM Forum (1995) and the Private Network to Network Interface Staff ATM Forum (1995) developed by the ATM Forum, a case can be made that the basis for an alternative user-controlled network service creation and control paradigm has been created. So, the second reason such work has not been performed is that there was no compelling reason to undertake what is a much more difficult architecture to design and implement as long as the network was predominantly a circuit-switched infrastructure.

The third reason concerns the growth of capabilities in the areas of both hardware and software. In order to develop a service creation process which utilizes a distributed architecture functioning in a real-time collaborative mode, great demands are placed on the hardware and software system components. An observation might be made that the rapidly dropping cost of processing power, along with the advances in methodologies, CASE tools and the development of middleware platforms are enabling factors that needed to be available before distributed systems approaches to communications infrastructure could go forward on a commercial scale. Therefore, the third factor which might be considered as hindering similar research in the past is the potentially diminished interest due to the inadequacy of the commercial tools and techniques then available.

Thus, there is a need for an application level or logical level control mechanism for communication services used in support of various peer-oriented types of applications. There is also a need for a control mechanism that is orthogonal to the underlying native control mechanisms of the network being used. In other words, the control mechanism would function regardless of the intervening control mechanisms of the network. This capability allows application developers to use network services as components of their applications with minimal concern for the implementation of those services.

SUMMARY

The present invention meets the above-described needs by extending the core networking technology more directly into the world of the application, thereby providing a network-aligned infrastructure that is capable of better supporting the development and deployment of collaborative applications. Embodiments of the present invention allow an end-user to control creation of telecommunications services from the edge of the telecommunications network. Previously, telecommunications services have been created within the network, such as by the carriers or telcos.

In one aspect, the present invention is a method, in a telecommunications network environment including non-participating elements and participating elements, for providing a telecommunications service between a first peer element connected to the telecommunications network environment and a second peer element connected to the telecommunications network. At a first peer element, an indication of the type of telecommunications service to be provided between the first peer element and the second peer element is received. A telecommunications service template in association with the indicated telecommunications service is determined, the telecommunications service template including instructions for configuring the non-participating elements of the telecommunications network environment to provide the indicated telecommunications service and instructions for configuring the participating elements of the telecommunications network environment. The telecommunications service template may further comprise routing instructions for the non-participating elements of the telecommunications network environment and routing instructions for the participating elements of the telecommunications network environment. The instructions to configure the participating elements and non-participating elements of the telecommunications network environment are executed to provide the telecommunications service. Data between the first peer element and the second peer element is transmitted via a predefined transmission protocol indicated by the telecommunications service template, the data including the routing instructions for the non-participating elements of the telecommunications network environment in a header portion of the predefined transmission protocol and the routing instructions for the participating elements of the telecommunications network environment in a payload portion of the predefined transmission protocol.

In one aspect, the present invention allows a user to set up a telecommunications service at the edge of a network. Thus, bandwidth may be purchased at a discount and the bandwidth may be allocated to the services defined by the user. These services are created by the user rather than being created by the carrier and sold in a bundle with the bandwidth. The present invention may function with both participating and non-participating networks. The participating networks include active elements that route the data based upon instructions including in the payload and/or control portion of ATM. Non-participating networks route the ATM cells without disturbing the present invention. Thus, the present invention is not limited by participating networks. The present invention is also useful as an encoding or encrypting mechanism because the data is transmitted from one peer element and then decoded by a second peer element. Thus, encoding and encrypting is an inexpensive and useful feature of the present invention. The present invention also includes active participating network elements that include such useful features as self-healing and communication with each other.

BRIEF DESCRIPTION OF THE DRAWINGS

FIGS. 2A–2C are respective N-square charts for the workstations, servers, and participating ATM switches of an embodiment of the present invention.

FIG. 3 is an illustration of the participating and non-participating boundaries of the infrastructure of an embodiment of the present invention.

FIGS. 4A–4C are illustrations of high-level use cases for the infrastructure of an embodiment of the present invention.

FIG. 5 is a description of the use case actors.

FIG. 6 is a summary of the participation of the actors in the various use cases.

FIGS. 7A, 7B, 8A, 8B, 8C, 9A, 9B, 9C, and 9D are respective illustrations of establish service account, config-ure domain, establish domain usage policies, establish/maintain user profile, create a service, use a service, report on usage & configuration, render invoice for usage, and make payment for service usage use cases involving an embodiment of the present invention.

FIG. 10 is an illustration of system function classification categories.

FIGS. 11A–11C, 12A–12B and 13A–13C are illustrations of the functions respectively associated with the workstations, participating switches and domain services server of an embodiment of the present invention.

FIGS. 14A–14B are an illustration of the Zachman framework for the peer-oriented infrastructure of an embodiment of the present invention.

FIGS. 15 and 16A–16B are illustrations respectively describing control, and safety and reliability architectural patterns.

FIG. 17 is an illustration of the self-organizing peer collaboration control architecture pattern of an embodiment of the present invention.

FIGS. 18A–18H are lists of realization mechanisms.

FIGS. 19A–19G are a Quality Function Deployment Process diagram.

FIGS. 20A–20L are a QFD spreadsheet for peer-controlled infrastructure.

FIGS. 21A–21L are a QDS spreadsheet for peer-controlled infrastructure.

FIGS. 22A–22B and 22C–22D are illustrations of the raw application scoring for the respective alternatives listed at the bottom of FIG. 21.

FIG. 23 is an illustration summarizing the applicability of major functional classifications to the major architectural components of the infrastructure.

FIGS. 24A–24D are an illustration of the impact of realization mechanisms on the functional classes.

FIGS. 25 and 26A–26E are illustrations of the buildup of cumulative technical impact associated with the successive selection of available realization mechanisms.

FIGS. 27 and 28A–28E are illustrations of the successive redistribution of technical impact among the function system areas as each successive choice of realization mechanisms is added to the architectural framework.

FIGS. 30A–30B are an illustration of the peer-control approach to reconciling networking perspectives.

DETAILED DESCRIPTION

Figure 1:
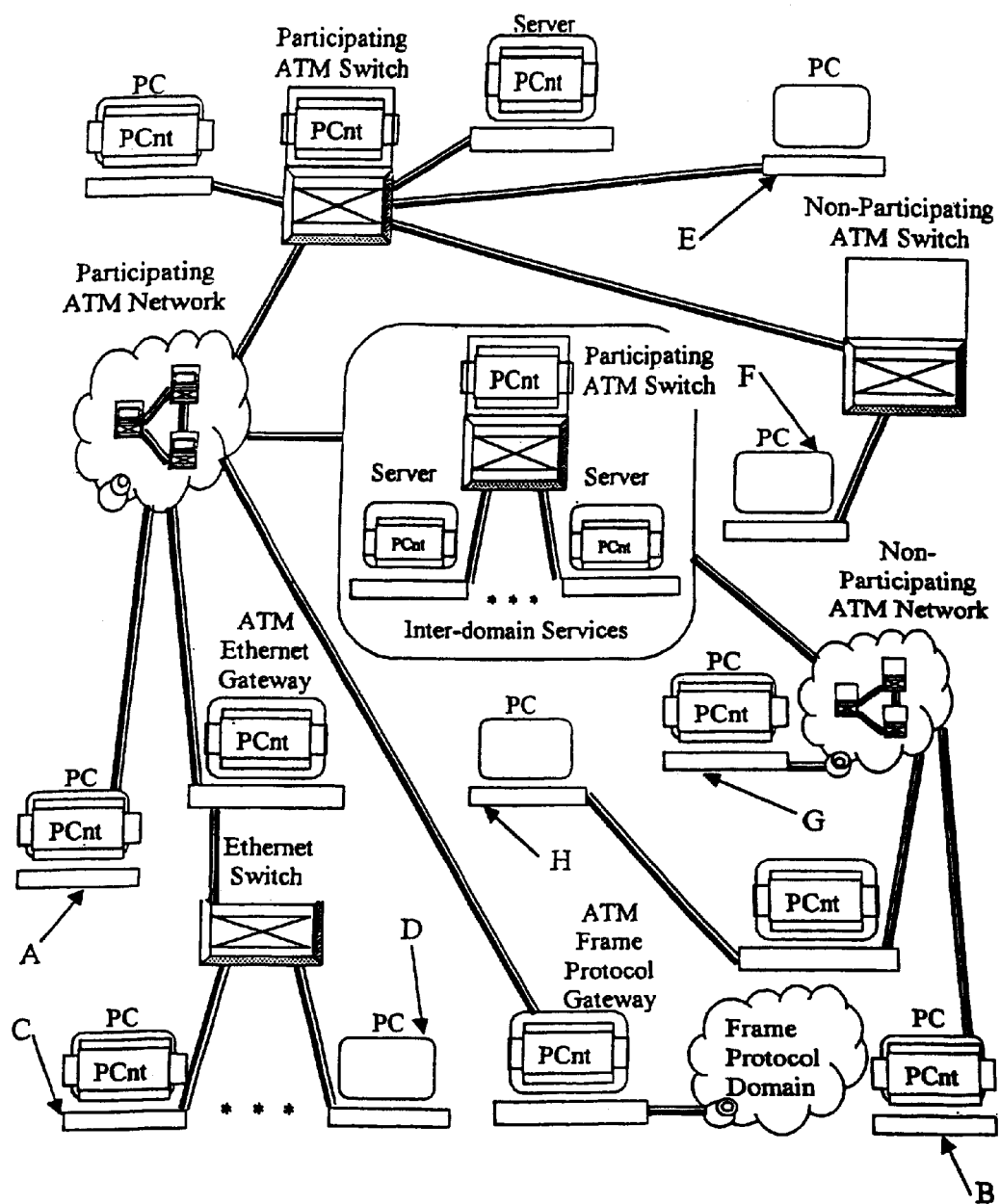
FIG. 1 is a high-level illustration of an embodiment of the present invention.

In one aspect, the present invention is a method for providing peer-oriented control of a telecommunications and data networking-based collaborative service. The present invention is concerned with the structure of an application level or "logical level" control mechanism for communication services used in support of various peer-oriented types of applications. The present invention is orthogonal to the underlying native control mechanisms of the network being used. This capability allows application developers to use network services as components of their applications with minimal concern for the implementation of those services.

The target platform for this infrastructure is based on cell and packet based networks utilizing a virtual circuit type implementation mechanism, although implementation over a datagram type implementation mechanism or other mechanisms is possible. The present invention focuses on the Asynchronous Transfer Mode (ATM) communications platform although it may be extended to other cell and packet based communication infrastructures.

The physical characteristics of the ATM communications environment, along with the nature of a peer-oriented service creation process, lead to the need for a solution domain based on distributed, cooperative processing. The peer-oriented service creation process is viewed as a collaborative goal-seeking activity among network resource elements which may continue only up to the point that the service is created (this would parallel the current service creation model used in telecommunications networks) or preferably would continue functioning in a collaborative goal-seeking fashion throughout the duration of the session utilizing the service.

There are a whole range of issues associated with a distributed processing solution. The following issue areas are indicative but not exhaustive of issues that are significant in considering a peer-oriented service creation paradigm:

Scalability of solution approach

Impact of competing architecture and mechanism design approaches

The need for infrastructure to precede applications

Impact of end-user versus resource owner issues in cross-domain problems

Economic feasibility of design approaches given the large installed base of equipment.

Before addressing the foregoing issues and proceeding with a more detailed description of the present invention, some important terms used herein are defined below.

Definitions of Terms

Orthogonal Control

This is a concept being developed by the present invention. The basic notion behind orthogonal control mechanisms is to make the network resources transparent to the collaborative application environment. Going beyond the notions of a simplifying API generally provided by middleware, the present invention defines orthogonal control as infrastructure architectural mechanisms that transparently translate or map control notions related to collaborative efforts directly into supporting control mechanisms for the network.

Quality of Service (QOS)

Quality of service is a term which refers to the set of ATM performance parameters that characterize the traffic over a given virtual connection (VC). These parameters include the CLR (cell loss ratio), CER (cell error rate), CMR (cell misinsertion rate), CDV (cell delay variation), CTD (cell transfer delay), and the average cell transfer delay. Five service classes have been defined by the ATM Forum in terms of QoS parameters. There is a correlation between these classes and the ATM Adaption Layers defined later. The QoS service classes are:

Class 0—best efforts service

Class 1—specifies the parameters for circuit emulation—associated with AAL1

Class 2—specifies the parameters for VBR audio & video—associated with AAL2

Class 3—specifies the parameters for connection-oriented services—associated with AAL3/4 and AAL5

Class 4—specifies the parameters for connectionless data transfer—associated with AAL3/4 and AAL5

ATM Adaption Layer (AAL)

The ATM adaption layer is a collection of standardized protocols that provide services to higher layers by adapting user traffic to a cell format. The AAL is divided into the convergence sublayer (CS) and the segmentation and reassemble (SAR) sublayer. The four AAL types currently defined are:

AAL1—a protocol standard used for the transport of constant bit rate (CBR) traffic (i.e., audio and video) and for emulating TDM-based circuits (i.e., DS 1, El, etc.).

AAL2—a protocol standard for supporting time-dependent variable bit rate (VBRRT) connection-oriented traffic (i.e., packetized video and audio).

AAL3/4—AAL type 3 and 4 provide a protocol standard for supporting both connectionless and connection-oriented variable bitrate (VBR) traffic. This AAL is also used to support SMDS (switched multimegabit digital service).

AAL5—a protocol standard for supporting the transport of lightweight variable bit rate (VBR) traffic and signaling messages. This AAL is also used to support frame relay services.

Service Creation

A service in the telephony and data networking world is generally taken to mean a defined action which creates a facility (i.e., a telephone call) or performs a function (i.e., forwards a call) performed by network control elements in response to a request by a subscriber or user. Service creation may be defined as the complete process of IN (intelligent network) service creation, including design, specification, development, and verification. Within this application, however, a slightly different notion will be used. That is, service creation will be used to mean the act or functioning of control elements and network resources together in order to establish the facility or perform the function requested by the subscriber or user.

Peer

As used herein, peers are any two or more end units that want to collaborate together in a service. Peers, unless they are on a LAN, must communicate with one another through some public facility. A common way is TCP/IP Internet protocols.

Peer-oriented Service Creation

This application builds on the previous definition for service creation with the following definition for peer-oriented service creation. The term "peer-oriented service creation" is defined as a control paradigm that is based on separating some amount of control or use interpretation from the network and assigning that control to participating workstations which are being used to support the user interface for a collaborative infrastructure. Applying this notion, participating workstations are used to request bandwidth with a specified quality of service to connect participants but the workstation, in collaboration with one another, also supply a collaborative control environment and the additional information resources necessary to establish the facility or perform the function (i.e., provide the service) that is desired.

Active Networks

Active networks are a novel approach to network architecture in which the switches of the network perform customized computations on the messages flowing through them. This approach is motivated by both lead user applications, which perform user-driven computation at nodes within the network today, and the emergence of mobile code technologies that make dynamic network service innovation attainable. With regard to the present invention, the notion just expressed is explicitly enlarged to include similar behavior at the network interface level (network interface card—NIC) of workstations and servers attached to, and functioning as part of, the larger notion of network which is an infrastructure connecting collaborators. In an active network, elements, such as switches, obtain information about the status of the network and circulate this information throughout the network for self-healing, controlling traffic flow, etc.

Edge Networks

The approach adopted in this application focuses on the use of ATM as the foundation of the network used to support the collaborative environment. As various LAN technologies such as Ethernet and Token Ring are currently the dominant network platform for supporting collaborative efforts, there must be a method of interfacing these technologies to the ATM infrastructure. Viewing ATM networks as the core of a new infrastructure places other networking technologies at the "edge" of the network. It is at the boundary between the ATM core network and the other networking technologies at the edge that issues of protocol and control translation become significant.

ATM Forum Network Reference Model

The Network Reference Model of the ATM Forum extends the model developed by the ITU-T by taking care to distinguish between the private and public parts of an ATM network. The model serves to identify the following key interfaces described below:

User-Network Interface (UNI)—User network interface. The interface defined as a set of protocols and traffic characteristics (i.e., cell structure) between the CPE (user) and the ATM network (ATM switch). The ATM Forum specifications refer to two standards being developed, one between a user and a public ATM network, called public UNI, and one between a user and a private ATM network, called P-UNI.

Private [Network-Node or Network-Network] Interface (PNNI)—PNNI is a switch-to-switch protocol developed within the ATM Forum to support efficient, dynamic, and scalable routing of SVC (switched virtual circuit) requests in a multivendor private ATM environment.

Broadband Inter-Carrier Interface (B-ICI)—The broadband intercarrier interface is a specification that enables two adjacent public ATM networks to interconnect and provide a set of end-to-end services.

Cells In Frames

Cells In Frames (CIF) is ATM with variable length packets on the lines and trunks. The CIF Alliance has specified a protocol which allows ATM to be embedded into various frame based legacy protocols (Ethernet and Token Ring), using only one ATM header for up to 31 cells from the same virtual circuit in a packet. The specification of CIF over PPP and Sonet is underway. A significant feature of CIF is that ATM can be transported to workstations without changing the legacy NIC (network interface controller) card because the necessary processing is done in simple downloaded software "SHIM" on the workstation.

LAN Emulation (LANE)

LAN Emulation is a technique that specifies the interfaces and protocols needed for providing LAN-supported functionality and connectivity in an ATM environment, so that legacy protocols can be interoperable with the ATM protocols, interfaces, and devices.

In legacy LANS, the membership of an individual station to a LAN segment is dictated by the physical connection of the station to the physical shared medium. Membership of a station to an ATM LAN segment is identified by logical connections to the multicast ATM virtual connection. Hence, membership of an ATM LAN segment is defined logically rather than physically; the membership information is stored in some management database. This capability of ATM LANs offers terminal portability and mobility. LANE does not provide transparent support for LAN-based application since it functions at layer 2, like a bridge. Effectively it is a converting-bridge technology between the connectionless Ethernet/Token Ring environment and the connection-oriented ATM environment. It also supports ATM-enabled devices to communicate with LAN Emulated devices.

LAN Emulation does not allow users to leverage the end-to-end class of service functionality which ATM provides in end-systems; however, it will provide for a higher bandwidth and a more stable network infrastructure for large building and campus backbones.

Multiprotocol Over ATM (MPOA)

MPOA is a set of standards designed to support distributed routing protocols other than IP. The functionality is developed on top of LANE and NHRP (Next HOP Resolution Protocol, a protocol proposed for ATM address resolution based on classical IP). MPOA can be viewed as solving the problems of establishing connections between pairs of hosts that cross administrative domains, and enabling applications to make use of a network's ability to provide guaranteed quality of service. Provided below is a summary comparison of LANE and MPOA, including advantages of MPOA and benefits of MPOA:

MPOA versus LANE

MPOA is an evolution of the LAN Emulation model. MPOA will make use of the LAN Emulation services.

LAN Emulation operates at OSI layer 2, hence, it's bridging.

MPOA operates at both OSI layer 2 and layer 3, hence, it is both bridging and routing.

LAN Emulation hides ATM/QoS, MPOA exposes both.

Advantages of MPOA

Clients can establish direct connections to remote servers without using routers Lower latency in establishing connections between devices Reduced amount of broadcast traffic Flexibility in selection of Maximum Transfer Unit size to optimize performance Benefits of MPOA It provides the connectivity of a fully routed environment It takes advantage of ATM, direct interdomain connection, and QoS It separates switching from routing It provides a unified approach to layer 3 protocols over ATM Multiprotocol Transport Networking (MPTN)

MPTN has its roots in a multivendor, multiprotocol networking model developed by IBM in 1992 called the Networking Blueprint. Presenting a somewhat different view than that of the OSI reference model which describes a single way to implement networking technologies, the Networking Blueprint described a way for a number of unlike networking technologies to coexist. In 1994 the Networking Blueprint was expanded (also renamed the Open Blueprint), by opening up the application section turning it into a model for networking as well as a structure for a distributed systems environment in which distributed applications can run.

The Open Blueprint can be separated into four areas (Applications, Application Enabling Support, Distributed System Services, and Network Services). Although this research can draw from all sections of the model, there is particular interest in Common Transport Semantics (CTS) which separates Distributed Services from the transport network layer of Network Services. CTS is an important section in the Open Blueprint because it provides the place where the multiprotocol transport architecture can be implemented. It provides a place where a set of transport semantics common to all transport network protocols are provided. This means that the applications in the top section, using their respective APIs and communication programming styles, can select and work with any transport network, regardless of the communications protocol the transport network implements. CTS, therefore, provides a way to separate the APIs from their original transport networks, allowing them to run on top of other types of transport networks. When the protocols do not match, CTS becomes the glue between them. CTS bridges the gap between the needs of the user of the transport network and the services provided by the underlying transport network itself.

Virtual LAN

Two slightly different views have been presented of a virtual LAN. One view focuses on the virtual LAN as a networking environment where users on physically independent LANs are interconnected in such a way that it appears as if they are on the same LAN workgroup. A second view focuses on the concept of a virtual LAN being a partitioning of one physical network into several logical networks. The reconciliation of these views comes from the observation that a network, as used by the first view may be composed of multiple physical LANs which is the beginning of the second view. Even though these are somewhat different views, aggregation and partitioning can be reconciled and are, in fact, talking about the same thing. There may, however, be greater utility in using one mode of viewing the problem over the other in certain situations.

The following observations regarding the two primary orientations (Port-centric and Device-centric) of virtual LAN models may be useful in later deliberations:

The port-centric model defines a virtual LAN as a collection of physical ports either associated with LAN or ATM switch interfaces. Clients are manually assigned to a virtual LAN, and the ports that make up the virtual LAN are kept in a database. This model operates as a MAC layer bridge transporting messages between members of the virtual LAN.

In the device-centric model, hosts are identified by either their MAC address or their Network Layer address. In the device-centric model network, the administrator assigns clients to a virtual LAN group using their address as an identifier. Both the location of clients and the transport of data between clients are managed by the network and are based on the client's address.

Virtual Network

Virtual networks are somewhat less clearly defined than virtual LANS. The use of the term virtual network seems to be more closely aligned with various telephone service providers. In this context, the term is used to describe a logically defined network overlaying the physical network belonging to the carrier. The notions in this description are analogous to the second view relating to virtual LANS. In this research, however, notions more in line with the first view of virtual LANs will be used. From this perspective, our major interest is in dynamically connecting and disconnecting network domains that may or may not belong to the same organization. The process of dynamically connecting and disconnecting then merging and separating logical networks is the process referred to in this work as creating/destroying virtual networks, and the connected state is referred to as a virtual network.

QoS Guarantees

The significance of time with regard to the present invention is that it correlates with the need for quality of service, or QoS, guarantees from the network connecting the collaborators. The closer to real-time interaction that the collaborative activity requires, the greater the need for QoS guarantees from the network. Even collaborative content such as voice or video, when they can be delivered at a later time (e.g., voice mail messages and archived video segments), does not require QoS guarantees from the network. The fact that they can be shipped to the corresponding collaborator for use at a later time essentially removes the need for QoS. Sometimes the nature of the collaborative content (e.g., large graphics files) is more effectively handled by higher bandwidth network links, but this is still not the same as requiring QoS guarantees from the network.

Service Template

A service template is used herein to describe the set of characteristics that is needed to set up a particular telecommunications service. A service template may be predefined and may be accessed by agents within the participating network to determine the attributes and parameters needed to set up and execute a particular telecommunications service. For example, the user may use a whiteboard template to set up a whiteboard.

Control Architecture and Mechanisms

Having described some definitions used herein, a description of control architectures and mechanisms is presented below. With regard to control architectures and mechanisms, the taxonomy of distributed systems serves as a useful starting point. The following four dimensions of classification for categorizing systems may be used:

Hierarchical and Peer-to-Peer

Hot and Cool

Tight and Loose

Non-Redundant versus Replicated

Drawing on these dimensions, a taxonomy may be developed which provides some insights into the relatedness of various kinds of distributed systems and into the formation of the four primary categories used for discussion purposes (i.e., Message Passing, Client/Server, Distributed Database, and Distributed Transaction Processing).

Literature Considered

Prior to the present invention others have attempted to develop systems that would extend core networking more directly into the world of applications. In order to help organize and filter the literature that has been reviewed, a simple system of 10 categories within four general areas of interest was created. The general areas (Environment, Services, Networks and Implementation) seemed to provide an adequate characterization of the very broad range of topics that are intertwined with the question of orthogonal control of network resources.

Overview

The actual categories used for review are grouped within these four broad areas in the following manner:

Environment
1) Distributed Computing
2) Real-time Systems
3) Dynamic Programming Services
4) Service Creation
5) Quality of Service Networks
6) Network Control
7) Network Architecture Implementation
8) Agent Based Software
9) Hardware Accelerators
10) Protocols The research interests characterized by these categories are summarized in the following sections which attempt to clarify the intent of the category as well as indicate some of the topical issues identified by the literature review process.

Distributed Computing

Implicit in the research problem is a series of questions and issues as to what constitutes distributed computing in a collaborative peer-oriented environment as well as what are the best ways to implement such facilities. Systems with such characteristics are actually a specialized subset of distributed computing systems. In this inquiry, there is interest in both application frameworks and the supporting infrastructure constructs for such distributed environments.

Arnold, Bond and Chilvers (1997) provided a useful introduction to the topic of distributed-processing environments with the presentation of their framework Hector. Starting with a discussion of the international standard for such environments known as the "Reference Model for Open Distributed Processing" (RM-ODP), they compared several prominent frameworks (APM's ANSAware, OSF's DCE, the OMG's CORBA, and Microsoft's DCOM) with RM-ODP. Their examination pointed out that not only do these prominent frameworks offer varying levels of the functionality specified by RM-ODP but they are also unable to interoperate among themselves. These researchers stated that the work on Hector was designed to provide "a framework that sits above other distributed environments, providing open negotiation and interoperability of communication protocols, high-level description of component services and their requirements, a rich set of support services for objects, and an interaction framework that allows the description of workflow-like interactions between autonomous objects." The very nature of the objectives of this research provided valuable insights into the problems and issues of distributed-processing environments. From a more pragmatic perspective, however, the majority of literature covering research specifically targeted at aspects of distributed network infrastructure used the CORBA framework [Vinoski (1997), Schmidt, Gokhale, Harrison, and Parulkar (1997), Crane and Dulay (1997)].

There are several supporting constructs or mechanisms that are significant in considering the implementation of infrastructures for distributed computing. Genereaux (1997) described the InterLanguage Unification System (ILU) as a system "designed at Xerox PARC with the purpose of providing a coherent model for distributing applications and components across machine and network boundaries." According to Genereaux, ILU was mainly concerned with defining interfaces between collections of program units called modules which "can be written in different application languages, can exist on separate machines, or can be distributed systems implemented by many program instances on many machines." Other useful mechanisms included the configurable event service for distributed systems described by Mansouri-Samani and Sloman (1996) and the private access channel security mechanism for shared distributed objects described by Dollimore and Xu (1993). Shatz (1984) provided a survey of communication mechanisms for programming distributed systems which was also useful as an introduction to the basic mechanisms and techniques supporting distributed computing.

Beyond the questions involved with distributed application frameworks and specific mechanisms, there remains the foundation issues associated with the basic paradigm used in developing the distributed environment. Because of the distributed nature of the communication infrastructure environment, message passing will necessarily become part of the solution at some level of implementation. Initially, however, the message-passing model is set aside in favor of the Linda type model for providing the framework for the solution being sought through this research. The Linda model may be described as a coordination mechanism which is orthogonal to a base language according to Carriero and Gelernter (1989). Even though Linda is a very distant second to message-passing models in terms of total research effort, as gauged by the frequency of its occurrence in the literature, it has a number of properties that recommend it for the problem at hand.

The desired attributes of loose coupling and decentralized peer-oriented control can be expressed quite easily in Linda-type constructs. According to Gelernter (1985), Linda is fully distributed in space and fully distributed in time. Linda programs are collections of ordered tuples which may contain either executable code or passive data values. "The abstract computation environment called 'tuple space' is the basis of Linda's model of communication. An executing Linda program is regarded as occupying an environment called tuple space or TS. However many concurrent processes make up a distributed program, all are encompassed within one TS."

The communication used by Linda-type programs is based on generative communication which has the characteristic of communication orthogonality in which the creating and consuming processes have no knowledge of one another. Gelernter stated that "communication orthogonality has two important consequences: space-uncoupling (also referred to as 'distributed naming') and time-uncoupling. A third property, distributed sharing, is a consequence of the first two." Space-uncoupling referred to the fact that a tuple in TS may be input by any number of disjoint address-space processes. Time-uncoupling referred to the situation that a tuple added to TS remains until it is specifically removed. Finally, distributed sharing allowed disjoint address-space processes to share some variable by depositing it in TS.

The notion of a single logical tuple space creates implementation issues when the logical single tuple space is in actuality composed of multiple disjoint tuple spaces that must be explicitly synchronized to form the logically unified tuple space. Some of the issues involved are addressed in research into this topic by Kambhatla (1991) in his Masters Thesis dealing with replication issues for distributed and highly available Linda spaces. Though not developed in conjunction with the Linda model, Thekkath (1994) in his Ph.D. dissertation, regarding system support for efficient network communication, supplied considerable insight into new models of fast efficient communication that are particularly well suited to the ATM environment and provide basic mechanisms for the maintenance of shared global memory.

Returning to the suitability of the Linda model (assuming the presence of reliable distributed shared global memory), there were several Ph.D. dissertations and research reports which were available and could form the formal underpinnings of a solution based on the Linda model. This research, however, seeks to expand the possible range of solutions by considering the possibility of allowing the multiple tuple spaces that make up the single logical tuple space to only be loosely synchronized and to rely on smart agents at each of the separate nodes to detect and respond to perceived inconsistencies. This relaxed view of the nature of tuple space should simplify many of the complexities that accompany use of the Linda programming model in distributed applications. It does, however, mean that the programming model will only be Linda-like and not the Linda programming model as defined. There was a collection of useful papers dealing with Linda-like systems and their implementation that was assembled at the Edinburg Parallel Computing Centre. These papers described systems and implementations that alter the basic Linda model for various reasons. These papers contributed a number of useful insights into the possible use of only parts of the original Linda model [Bal, Kaashoek, and Tanenbaum (1991); Broadbery and Playford (1991); Butcher (1991); Callsen, Cheng, and Hagen (1991); Carriero and Gelernter (1991); Schoinas (1991), Schouten and van Nieuwkerk (1991); Thomas (1991); Wilson (1991); Zenith (1991)].

Real-time Systems

From the perspective of collaborative applications, Real-time is a somewhat subjective notion that refers to the ability of the supporting infrastructure to respond to the supported activities and applications at a pace that does not retard the natural time progression normally associated with the activities being supported. An introduction to the basic concepts and issues of real-time communication was provided by Verissimo (1993). Beyond the basic concepts and techniques of analysis, design, and implementation, this research had some specific interest in various mechanisms that would be suitable for use in the target network environment. Works such as that by Schmidt, Gokhale, Harrison, and Parulkar (1997) on an end system architecture for real-time CORBA were certainly of interest; however, there were even more fundamental questions that were raised by Kopets and Grunsteidt (1994) in their work on TTP, a protocol for fault-tolerant real-time systems.

Kopets outlined the two fundamentally different paradigms for the design of real-time systems (i.e., event-triggered architectures and time-triggered architectures). After discussing the advantages and disadvantages of each, he proceeded to describe his Time-Triggered Protocol (TTP). Even though this protocol was initially designed for automotive control applications, there were a number of features that were worthy of consideration for the coordinating control of distributed agents that might be used to implement the distributed service creation facility that is an objective of this research. This research area was of considerable importance in finding an implementation strategy that is operationally viable and scalable across private and public networks that range from small to global in size.

Dynamic Programming

The current interest in dynamic programming arises primarily from issues related to naming, data structures and binding. Helary and Raynal (1988) developed algorithms for assigning distinct identities to sites of an anonymous distributed system. This was an issue of considerable concern when constructing a dynamic distributed control and service creation facility that needs to scale to large networks and to encompass multiple and varying collections of domains associated with both public and private networks.

The proposed environment of the present invention is itself an application or set of applications. From this perspective, there was interest in the work of Warren and Sommerville (1996) which presented a model for dynamic configuration while preserving application integrity. There is, however, a heightened interest in works which address issues associated with dynamic linking and modification of software through on-the-fly software replacement.

The research basis for this interest stems from implications of the intended distributed control and service creation architecture. In the centralized or client/server model for control and service creation, there is a well defined and more manageable group of system elements that allow for scheduled downtime for maintenance. In a distributed peer-oriented model, the situation is somewhat different. Since control and service creation functionality would run on workstations as well as network devices, the systematic system wide maintenance and enhancement of control and service creation functionality is no longer a viable option. Furthermore, because of the dynamic membership of service creating groups, there is an increased risk of non-interoperability due to conflicts among versions. This problem would need to be addressed in a manner that could be used in large networks that possibly are owned by different entities.

One approach to solving this architectural problem could use the capability of automatically synchronizing version levels whenever necessary. Such a capability would most likely need the ability to perform some sort of on-line maintenance. One of the most relevant pieces of research came from Hauptmann and Wasel (1996) in which the researchers described specific techniques for accomplishing on-line maintenance by using on-the-fly replacement of software components. Cowan, Autrey, Krasic, Pu, and Walpole (1996) as well as Veitch and Hutchinson (1996) contributed valuable concepts with their works dealing with adaptive, extensible and configurable operating systems. Queichek's (1996) description of dynamic configuration management also provided a source of issues and ideas relevant to this problem area. Finally, Virtual Computer Corporation (nd) provided a useful overview of reconfigurable computing. Although their perspective was hardware oriented, some of the concepts appeared to be useful.

Service Creation

The issue of service creation is a central concern to this research which seeks methods and mechanisms to perform this function in a distributed and collaborative manner. In reviewing the literature associated with this research area, the following three categories will be used to help focus on aspects that are particularly important to this work:

Object-Oriented Approach to Services

Service Models and Mechanisms

Multi-party Interactive Multimedia

A distributed object-oriented approach to defining and implementing network based collaborative services holds great appeal from the standpoint of managing the inherent complexity associated with such functionality. A direct introduction to this approach was provided by Amouat, Brossard, Louvet, and Risser (1991) in their research into the application of the object-oriented paradigm to modeling telecommunication services. Further insight into specific techniques for dealing with services and service creation were provided by Takura and Ohta (1994) in their research dealing with the generation of telecommunication software from service specifications in state transition models. While this work was not explicitly object-oriented, the content can certainly be applied in such an approach. Schmidt (1995), however, used an explicit object-oriented approach in his work on design patterns for initializing network services. "The Acceptor and Connector patterns described in this article decouple the passive and active establishment of a connection, respectively, from the service performed once the connection is established." This work also addressed forces due to additions by using asynchrony to actively establish connections with a large number of peers efficiently.

There are many issues and topics that can be addressed under the heading of service models and mechanisms, but few can be ascribed the practical level of importance as the topic discussed by Crowcroft, Wang, Smith, and Adams (1995). This article provided a comparison of the Internet Engineering Task Force (IETF) and the ATM service models. Some of the pragmatic interest comes from the fact that these service models are aligned with the historically existing division of networks into two major categories: the Internet group which has provided a best effort datagram service and the digital telephone networks which have provided a reliable constant bit rate circuit service. Advances in networking and computing have advanced packet/cell switching to a point where it is appropriate for use in delivering a range of services. It is a logical next step, based upon economics, that these services should be provided at a single access point to all end systems. This evolution has set up an escalating confrontation between the Internet approach, proposed by the data networking group, and the ATM approach, proposed by the telephony networking group. ATM with its origins in telephony has a massive investment in developing standards for reliability, accountability and quality of service (QoS). The Internet group has been working to extend its model to accommodate more reliability and accountability. QoS has been approached by the Internet group by adding an optional resource reservation protocol called RSVP.

The issue over which approach will gain dominance is very significant to the research that is proposed. The ATM approach is inherent in the design of ATM, occurs at lower levels of the protocol stack, and is established during call setup. The RSVP approach is optional. It allows applications that have QoS needs to communicate them to the network while allowing applications that don't to function the same way that they always have. According to Crowcroft et al. (1995), "RSVP is not a call setup; it is based on the receiver's signaling of requirements, rather than an initiator for two reasons:

Multicast, or many-to-many communicating applications, can rendezvous with a signaling complexity order (constant), rather than order (n**2).

Receivers can signal different reception qualities, independent of the senders' selection of quality."

Lambert (1997), writing for an industry trade magazine, reported on the recent attempts at reconciliation between the two opposing approaches. According to Lambert, there were new proposals introduced in mid-1997 which addressed the QoS issue at the transport, network and media access layers as well as the application layer (layer 4). Lambert reported that ATM manufacturers considered mapping RSVP to the QoS mechanisms of ATM as the next natural step following the merging of the router and switch. From the IETF side, there is a working group called the Integrated Services Over Specific Lower Layers (ISSL) Group that is also taking up the challenge of integrating the Layer-4 RSVP mechanisms used within Ethernet networks to ATM QoS mechanisms used at Layers 2 and 3.

As significant as this issue of reconciliation between RSVP and ATM is, there are other topics that are of interest in the context of the proposed research. Bocking (1996) described a uniform application programming interface for basic-level communication services. Poo and Chew (1996) described the modeling of the XOM/XMP application programming interface (API) which gives access to the services of common management information service (CMIS) and the Simple Network Management Protocol (SNMP) XOM API provides a general-purpose data handling mechanism and XMP API provides service primitives to network management protocols, both of which are useful in the service creation effort. Other mechanism-related works that are of interest included Parris, Ventre, and Zhang (1993) who dealt with the graceful adaptation of guaranteed performance service connections and Ferrari, Gupta, and Ventre (1995) who discussed issues related to distributed advance reservation of real-time connections.

The final review category, multi-party interactive multimedia (MIM) addresses issues involved with supporting such capabilities which are the focus of research interest. Szypersld and Ventre (1993) proposed a solution to efficient group communication with guaranteed QoS based on an abstraction called the Half-Duplex Real-Time Channel. This abstraction, the researchers asserted, "reduces the complexity of the creation of network support for common MIM applications, and decreases the amount of resources to be reserved in the network." Effelsberg and Muller-Menrad (1993) and Moran and Gusella (1992) contributed ideas regarding dynamic multiparty support for applications. Gupta et al (1994) took a slightly different perspective in discussing a scalable resource reservation for multi-party real-time communication.

Quality of Service

A great many of the challenges and issues involved in service creation relate to the quality of service (QoS) and the methods of requesting and obtaining specific QOS guarantees from the network. The literature reviewed in this section has particularly close ties to work reviewed in the section on service creation as well as on the upcoming section on network architecture. In fact, much of this literature could be included in the reviews of these other sections. They are, however, reviewed here because of the overriding focus on QoS issues. In reviewing the literature, three categories (architecture, mechanisms, and performance issues) seem useful in organizing the material.

In the area of architecture, Lakshman and Yavatkar (1996) described AQUA which is an adaptive end-system QoS architecture. AQUA provides a framework for managing resources such as CPU, network interface, memory, and bus bandwidth. The researchers asserted that the "significant and novel contributions of AQUA include an adaptation framework, QoS specification, resource managers, and an application level QoS manager that performs application-based graceful adaptation when resource requirements change or the demand for resources exceeds available capacity." A further contribution was a CPU management algorithm called RAP (Rate-based Adjustable Priority Scheduling) that provides predictable service and dynamic QOS control.

Other useful pieces of research include Moghe (1996) who described a new paradigm called "Enhanced Call" for applications with dynamic client-membership and client-level binding in ATM networks. The approach sought to guarantee an upper bound on client-level degradation by statistically reserving virtual channel links for potential new client arrivals. Gopalakrishnan and Parulkar (1996) presented a framework for providing QoS guarantees within the end system for networked multimedia applications. The framework contained the following four components: QoS specification, QoS mapping, QoS enforcement, and protocol implementation. Also included in the framework was an application level protocol implementation model along with techniques to reduce the cost of data movement and context switching in such implementations.

Under the mechanism classification, the papers selected were either associated with protocols and client/network boundary issues or with aspects of flow control. Within the client/network category, there were three papers of particular interest. The first, by Campbell and Coulson (1997), described the implementation of an adaptive transport system that incorporates a QoS-oriented API and a range of QoS mechanisms that assist multimedia applications in adapting to fluctuations in the delivered network QoS. The second paper by Ferrari, Ramaekers and Ventre (1992) investigated the feasibility of providing an extended client interface that allows more flexibility in the client-network interactions. The researchers claimed that "the proposed model improves the utilization of network resources, and increases the network's capability to support multimedia traffic, while continuing to offer a guaranteed quality of service." The final paper by Lowery (1991) proposed a real-time delivery system composed of a new protocol for administration of real-time connections combined with modifications to the Internet Protocol (IP) to support such connections.

The flow control aspect was touched on by Ohnishi, Okada, and Kiyohiro (1988) who examined two mechanisms for providing performance and flow control management with respect to performance (QoS) control, introduction of delay, and loss sensitive service classes. Zhang and Keshav (1991) examined six new queue service disciplines (Virtual Clock, Fair Queueing, Delay-Earliest-Due-Date, Jitter-Earliest-Due-Date, Stop-and-Go, and Hierarchical Round Robin) in order to show why each discipline can or cannot provide bandwidth, delay and delay jitter guarantees.

In the literature specifically dealing with performance, there was a quantitative study by Tobagi and Dalgic (1996) which focused on the performance of ethernet and ATM networks carrying multimedia traffic, particularly audio and video traffic. Also, Moldeklev and Gunningberg (1995) studied deadlock situations that can occur when using TCP over ATM. This last issue is of great practical importance given the necessity to interoperate with the great installed base of TCP and IP based networks.

Network Control

As stated earlier, one embodiment of the present invention is concerned with the structure of an application level or "logical level" control mechanism for communication services used in support of various peer-oriented types of applications. The focus of research for the present invention centered on the identification of a suitable infrastructure for component-based control of communication services which is orthogonal to the underlying native control mechanisms of the network being used. The application domain is one axis (the source) of this proposed orthogonal mapping relationship, while the literature reviewed in this section on network control and the following section on network architecture represent aspects of the target axis, i.e. the underlying network.

When dealing with multimedia traffic QoS issues at the network level, one of the critical topics of interest involves congestion control. Because this research is specifically interested in ATM networks, the papers by Lu(nd) and Jain (1995) provided a good foundation for the issues and approaches that are associated with this topic. The paper by Jain is particularly useful in that it provided a survey of the congestion control mechanisms for ATM networks that were selected by the ATM Forum traffic management group. Furthermore, Jain described the reasons why the adopted methods were selected from the available approaches and this insight was valuable in considering the current capabilities and direction for evolution of congestion control capabilities.

With the focus on dynamic service creation and ATM networks in particular, it is consistent that there would be considerable interest in the Available Bit Rate (ABR) service that has been defined for ATM. ABR is the newest ATM service category and according to Bonomi and Fendick (1995) it was designed to "systematically and dynamically allocate available bandwidth to users by controlling the flow of traffic with feedback." This service class has characteristics that would recommend it as a fundamental building block for the environment that this research seeks to establish. Chen, Liu, and Samalam (1996) described objectives of the new service as well as its relationship to other established ATM services and the existing agreements on the traffic control mechanisms to support it. Siu and Tzeng (1994) and Walthall (1995) provided other insights into the rate-based control framework that was adopted by the ATM Forum. Saito et al. (1996) examined the performance issues associated with a public ABR service, the support of TCP-over-ABR, and suggested a method for maintaining the throughput of point-to-multipoint ABR when the number of destination nodes is increased. These are all issues of great interest and the technical analysis approach used by these researchers was useful in providing a basis for reasoning about the use of this service type in the proposed infrastructure. Fendick (1996) contributed with a discussion of the evolution of controls for the ABR service with respect to the algorithms for determining this feedback, an important topic since the details of how this is to be accomplished are largely outside the scope of the ATM standards and specifications. Finally, Kolarov and Ramamurthy (1995) discussed the performance implications of using the reactive rate adaptation mechanism associated with ABR in wide-area networks. In this paper, the researchers demonstrated that "the performance of virtual channels traversing large numbers of hops in WANs can be substantially improved by giving priority to network transit traffic over traffic entering the network."

Going beyond the broad topics of congestion control and the ABR service, there were several papers dealing with specific mechanisms and techniques that were useful as a starting point for considering mechanisms and approaches for the desired infrastructure. Perhaps the most encompassing paper was provided by Lin (1997) which discussed the operation, administration, and maintenance (OA&M) management for the Global System for Mobile Communications (GSM). Although GSM is a European wireless digital signaling network standard, it provides a common set of compatible services and capabilities that are worth considering when framing a context for establishing a collaborative communication environment such as the one in an embodiment of the present invention. The paper described how the telecommunication management network (TMN) concept is applied to the GSM OA&M.

Performance management, network traffic, and congestion control were topics investigated in the following three papers. Gaiti and Pujolle (1996) sought "to introduce performance monitoring aspects of asynchronous transfer mode (ATM) networks and then to focus on traffic and congestion control schemes." The researchers described a framework for defining a generic intelligent and integrated model for network management and went on to measure the performance of a new congestion control scheme which used the combination of the cell loss priority (CLP) bit, the explicit forward congestion indicator and the explicit backward congestion indicator. Gaiti and Boukhatem (1996) in another paper "proposed a new way of organizing the control system so that complexity is easier to manage. The multi-agent system approach, which provides the use of adaptive and intelligent agents, is investigated." According to the researchers, "this was a powerful way to introduce a degree of intelligence into an otherwise purely algorithmic approach." The researchers proposed two schemes. The first, TRAC (threshold based algorithm for control), performed actions to alleviate congestion independent of the nature of the traffic. The second enhanced scheme, PTRAC (predictive agents in a threshold based algorithm for control), performed corrective actions which were dependent on the QoS requirements and to the prediction of traffic made by the agents. This work is particularly significant to the proposed research focus on distributed control. Finally, Verma (nd) focused on developing a simple admission control criterion that can be used to reserve resources for bursty as well as smooth traffic with delay sensitive loss sensitivities. The scheme proposed used a well-defined traffic specification scheme which is easy to enforce and verify and is able to accommodate an arbitrary degree of burstiness.

Research that was very significant to finding distributed mechanisms for control was provided by Chen et al. (1996). Their paper described work on a framework for monitoring and controlling ATM networks based on the use of management cells. Specifically, they examined the use of a broad class of special cells that circulate around the network to perform a variety of useful functions for monitoring and optimizing the operation of the network. Although their work explored various and new uses of management cells as the basis for performance monitoring, traffic control, fault management, and network administration, there is sufficient basis for extending the concepts to include the coordination of distributed agents performing control functions on a cooperative peer-oriented basis that could utilize this distributed source of information as well as utilize the circulating mechanism as the basis for coordinating activities among themselves.

Tassiulas (1996) described a distributed adaptive link-level scheduling mechanism for providing end-to-end performance guarantees in a virtual circuit network with an arbitrary topology when the traffic is regulated. Within the context of this research, this work is significant because the policy used is distributed and each link adjusts service based only on observations of the traffic arriving at its originating node. Also of significance is the fact that the mechanism is adaptive since no information on the traffic characteristics is needed for the application of the policy. These are important characteristics that are useful for implementing a distributed control mechanism that would be needed in the collaborative control environment proposed by this research.

Ramaekers and Ventre (1992) addressed the issue of "how applications and, more generally, clients of real-time communication services can interact with the network in order to specify and negotiate the quality of service of a connection." This work presented "a model for the client-network interaction developed for the Tenet real-time protocol suite; the model included new mechanisms for the establishment and runtime management for real-time connections."

These last three works, when considered together, begin to identify some core concepts that could provide the basis for a control framework that might be used for supporting the distributed control environment sought by this research.

Network Architecture

Network architecture represents the target axis (i.e., the physical network within the conceptual framework of orthogonal control). The topical area of network architecture is very broad and there are many possible approaches to reviewing relevant literature associated with it. The principal work, however, was the survey of active network research provided by Tennenhouse et al. (1997). The view of peer-oriented service creation as a collaborative goal-seeking activity among network resource elements strongly recommends such an architectural approach. Within the context of an active network approach, the analysis of vendor strategies provided by Falcon (1995) gave some indication of possible evolutionary forces by introducing the "User Framework" for evaluating vendor strategies. This framework had two main components: the "User Perspective Model" and the "Service Definition." According to Falcon, "the User Perspective Model" places network, systems, and application technologies in the context of how they are used rather than how they are built. The Service Definition provides a context for discussing, creating, and evaluating components of distributed computing environments in terms of the services rather than the technology. Both perspectives were useful in considering the economic viability of a selected technological approach. A final paper by Iida, Nishigaya, and Murakami (1995) completed the foundation overview of this topical area by describing the agent-based personal communications network called Duet. The authors proposed this network architecture to provide access to resources on different networks in a manner that is transparent to the user. Aspects of the use of agents to manage resources on behalf of the user are of particular interest to the current research.

With a focus on ATM, the work by Jaeger and Technik (1996) dealing with performance management issues in ATM enterprise networks provided a good introduction to this lowest level of the architectural framework. Rosberg (1996), with his investigation into cell multiplexing in ATM networks, provided insight into a critical problem for the intended network infrastructure with his formulation and analysis of several connection multiplexing algorithms. With a stated objective of finding an algorithm that efficiently combats the cell delay variation introduced by the multiplexer, this work approached directly one of the key workstation level problem areas of the infrastructure. Ahuja, Keshav and Saran (1996) contributed to considerations of the transport function with the design, implementation, and performance measurement of a native-mode ATM transport layer that is capable of providing per-virtual-circuit customized transport services. The process of tying transport issues back to higher levels of the infrastructure framework is aided by work of Thekkath (1994) who, in his doctoral dissertation, considered, from a performance perspective, the relationship of the four layered components of a distributed system: Distributed Services, Distributed Programming Model, Network Access Model, and the Network Controller and Network.

Two other aspects that contribute to the foundation for this transport level topic area involve consideration of formal standards and the impact of resource pricing on network architecture. Anderson, Lamy, Hue, and LeBeller (1996) focused on standards for global ATM networks, an area of great significance for this research. There were several papers [Appeldorn, Kung, and Saracco (1993); Barr, Boyd, and Inoue (1993); and Lengdell, Pavon, Wakano, Chapman, and Kawanishi (1996)] which all dealt with aspects of the Telecommunications Information Networking Architecture (TINA), a standards or reference model software architecture for services provided on public and private networks.

Pricing issues influence network architecture from two separate perspectives: resource consumption as well as resource acquisition. As a service creation paradigm which needs to span network resources across multiple public and private domains, it is reasonable to assume the need for resource use accounting and billing frameworks. Parris and Ferrari (1992) and Parris, Keshav and Ferrari (1992) made a contribution to this area with their work on pricing in integrated and real-time packet switching networks.

The other perspective, that of resource acquisition, is even more intriguing in its potential for offering the type of potential economic benefits that are sufficient to warrant changes to network architecture. There are three papers which were particularly helpful in understanding this potential. The first by Kashper and Watanabe (1995) set the foundation of feasibility by discussing the issue of dynamic routing in multiple carrier international networks. The work by Gustafsson and Karlsson (1997) can be viewed as building on the basic capability of dynamic routing as they surveyed the literature on traffic dispersion, a technique in which "the traffic from a source is spread over multiple paths and transmitted in parallel through the network." The authors suggested that "traffic dispersion may help in utilizing network resources to their full potential, while providing quality-of-service guarantees." Shultz, Incollingo, and Uhrig (1997), however, opened up a whole new range of possibilities with their discussion of how to take advantage of differences in ATM services and differences in tariffs for different service types as well as for the same type of service from different carriers. Taken together, these three papers provide the conceptual framework for an infrastructure capability that allows for the economic optimization of network resources used in provisioning a service created by collaborating users. This capability would require some adjustments to existing network architectures to fully exploit the potential; however, the anticipated benefits appear significant enough to consider such changes.

An integral part of network architecture is concerned with network resource management capabilities. One of the most useful and comprehensive works on ATM network resource management was by Dziong (1997). Part of the usefulness of this work can be understood by examining the following three objectives that the author established for the work:

1) to present a framework for resource management synthesis and analysis which is driven by traffic source characteristics and requirements rather than by network transport technology;
2) to introduce an economic factor directly into the real-time resource control algorithms; and
3) to show how mathematical theories can lead to very practical algorithms. Complementary to this work was another by Pitts and Schormans (1996) which dealt with ATM design and performance issues by discussing performance evaluation from both an analytical and simulation approach. The authors also discussed key formulas describing traffic and queuing behavior and provided software models for solving these formulas.

Beyond these foundation works, there were several useful papers that dealt with more tightly focused issues. Ramaekers and Ventre (1992) discussed QoS negotiation in real-time communication networks. The authors "present a new mechanism for the establishment of real-time connections in a quality-of-service network developed for the Tenet real-time protocol suite." Farkouh (1996) covered some of the issues related to ATM virtual path connection (VPC) and virtual channel connection (VCC) performance, fault, and traffic management functions. Friesen, Harms, and Wong (1996) covered an approach to resource management by utilizing the virtual path constructs defined for ATM networks. Using the virtual path concept, the authors proposed organizing a logical overlay network. The authors pointed out that "if the VPCs are permanent or semi-permanent and have reserved capacity, establishing new VCCs requires simple connection admission decisions at the VPC terminators of existing VPCS." This work provided a survey of articles on resource management using the virtual paths in an ATM network.

Finally, there are some other papers that were useful that treat specific related topics. These were primarily divided into two categories. The first dealt with concepts related to channels and management of resources via channels [Mal (1993); Banerjea and Mah (1991); Gupta and Moran (1993); Ohta, Sato, and Tokizawa (1991)]. The second classification dealt with rate control and rate control mechanisms [Zhang and Ferrari (1992); Kalmanek, Kanakia, and Keshav (1990); Zhang and Ferrari (1994)].

Agent Based Software

Two concepts that are particularly important, if not essential, to the ability to implement a distributed and highly scalable collaboration infrastructure are the notions of object-orientation and active/intelligent agents. While the two concepts are very often found together in research efforts or implementations, the presence of one does not automatically necessitate the use of the other. These concepts are intermixed to varying degrees within the literature which was reviewed using the following three categories: frameworks, communication methods, and architectural mechanisms.

Finding a suitable framework for agent interaction is one of the primary objectives of the present invention. The structural characteristics of orthogonal control immediately suggest two natural orientations for approaching the framework design problem (i.e., the two axis representing the application perspective and the network perspective). Within the potential solution space defined by these boundaries, the paper by Lee, Mansfield and Sheth (1993) was most closely aligned with the application view. Their work concentrated on the development of a framework to support adaptive cooperation PO among multiple users involved in collaborative tasks such as conferencing. This objective is shared with the present invention and, therefore, the insights provided by this resource were very useful. The present invention, however, has a greater interest in the control of the supporting network and, therefore, has a greater and more broadly based interest in the structure of agent based frameworks than the view provided by Lee and his colleagues in their research.

Huhn and Wild (1991) explored an architectural framework called DIPLOMA which is an architecture for distributed planning among multiple agents. Within this architecture, the authors introduced the notion of "roles" for the various participating agents which span a horizon of expectations derived from prototypical expectations about the common environment. These roles utilized sets of behaviors composed of primitives, the performance of which led to higher-order goals as the autonomous multiple agents are coordinated and synchronized amongst each other and with their related objects by the process of communication and through the use of logical sensors. As an example problem space, the researchers utilized vehicle traffic environments which provided a good analogy to aspects of problems encountered within the targeted communications environment.

In his book dealing with the design of intelligent agents, Muller (1996) was more exhaustive in providing a formal basis for, and survey of, approaches to the design of intelligent agents. Of particular interest was his treatment of agent architecture in which he identified and described three layers of activity (Behavior-Based, Local Planning, and Cooperative Planning) along with a discussion of the overall control architecture. In particular, the discussion of generic control paths, of which the author identified five (reactive path, local planning path [idealized], cooperative path [idealized], local planning path [instance], and cooperative path [instance]) were particularly useful. These generic control paths provided a perspective for considering other implementation architectures such as the software trellis proposed by Factor and Gelernter (1991) and Factor (1990).

The software trellis is essentially a tree of functional logic elements (i.e., each element has one to many inputs but only a single output). Besides the ability to mathematically prove the correctness of logic implemented using such a structure, Factor and his colleague introduced other useful notions such as variable refresh rates for different levels of the logic trellis and forced recalculation of select lower-level logic elements if the recalculation of a higher-level element blocks because of a missing or outdated input value. The variable refresh rate allowed the whole logic structure to be as "real-time" as necessary by differentially allocating processor cycles between the lower-levels of the logic tree which need to run closer to machine time and the upper-levels of the logic structure which can run more in application or user time. The forced selective recalculation provided a data-flow type mechanism which can be used to implement a selective adaptation for each of the three logical levels (Behavior-Based, Local Planning, and Cooperative Planning) of agent behavior.

Beyond these more generic investigations into agent based frameworks, there were two papers which reflected aspects of frameworks closely aligned with the application and the network perspective. Gens (1995) gave an overview of the application perspective with his paper on the key trends and issues of the emerging component based desktop. From the network perspective, Feridun, Heusler, and Nielsen (1996) provided a pragmatic look at the problem of implementing agents to support the telecommunications management network (TMN) within an open systems interconnection (OSI) framework. Both of these works gave some insights regarding issues associated with these perspectives which will influence the establishment of a distributed infrastructure framework for collaborative applications.

Before moving from agent frameworks to architectural mechanisms that can be used to implement such frameworks, some consideration needs to be given to communication mechanisms and modes that can be used in coordinating agent activity. da Silva (1994) provided a model and discussion of interobject communication mechanisms based on a concurrent. object-oriented model that relies on the fundamental notions of active objects, passive objects (resources) and interobject communication mechanisms. Chang and Tseng (1993) took a somewhat lower-level view in their paper describing how to support distributed objects utilizing FIFO-Links on message-passing systems. A somewhat unique perspective came from Fenster, Kraus, and Rosenschein (1995) who examined the potential for coordination without communication with their experimental validation of focal point techniques. Their work has possible application within the proposed framework in situations where the connecting bandwidth is small in relation to the volume of coordinating messages required with other techniques.

With the interobject/agent communications issues covered, there are two remaining areas (i.e., states and coordination) that need to be addressed under the architectural mechanisms heading. The notion of states is essential to the object/agent model. Lecoeuche and Sourrouille (1993) as well as Sane and Campbell (1995) both dealt with the issues of introducing the notion of states into the object-oriented model. Allen and de Champeaux (1995), however, worked on extending the state chart formalism to deal with events when no applicable transition is available and to resolve conflicts relative to event scheduling and response, that can arise whenever multiple states can be active simultaneously.

With respect to the issue of coordination, Burkhardt, Eckert, Prinoth, and Raubold (1987) presented a model of cooperation and its specification with PETRI nets. The ability to revise coordinating plans based on local predictions for exceeding deadlines was addressed by Durfee and Lesser (1988). This work also introduced the notion of allowing inferior but acceptable solutions in situations where missed deadlines would occur if the original plan had been maintained. This general relaxation of solution quality may by extension be applied to more general situations of resource contention that would be useful in the intended research in providing a mechanism for graceful degradation of service under adverse conditions. Finally, Gelernter and Carriero (1992) discussed the significance of coordination languages based on the Linda model while Rem (1981) proposed a program notation called Associons which uses tuples instead of variables.

Hardware Accelerators

The topic of hardware accelerators is covered only superficially for two reasons. First, the use of hybrid systems made from reconfigurable hardware (mainly field programmable gate arrays FPGAS, which do not rely on the CPU as the programmable element) is a field of study that is far beyond the scope of this inquiry. The second reason is that, within the context of this application, all that is needed is an awareness of what such devices can do and where they might be useful as an extension of software components to accelerate tasks of processes which would be part of the distributed service creation infrastructure. Such an awareness should help in the identification of "objects" within the problem space of the distributed service creation infrastructure so that hardware based accelerators could be used within the object model as interchangeable hardware objects that could be substituted for software objects.

The limited introduction to this topical area all comes from the website of Virtual Computer Corporation. While such a limited review might at first seem a weak treatment, it should be adequate given the limited use and reliance that will be placed on this information. There were three items that were particularly useful. The first was a set of web pages titled "A Layman's View of Reconfigurable Computing" Virtual Computer Corporation (nd). This introduction briefly described and contrasted a standard microprocessor based computer (a fixed hardware system) with a reconfigurable hardware system based on a reconfigurable processing unit. The second work by Casselman (1993), titled "Virtual Computing and The Virtual Computer," provided a good introduction to the notion of virtual computers which are completely reconfigurable and capable of allowing algorithms to be implemented directly in the hardware. Finally, in an implementation case review of the use of reconfigurable logic to implement a fiber channel network card, Casselman (nd) illustrated the use of FPGAs to dynamically download the hardware to implement an extremely low latency semaphore passing network within a point-to-point system.

This last paper in particular provided appropriate solution insights to problems (once the concepts and potential use of FPGAs are understood) that are present within the problem space of the distributed service creation facility.

Protocols

The topic of protocols within the context of this research is, in one sense, a catchall in that protocols are of concern within various parts or areas of a distributed communications infrastructure. There are high or application-level protocols such as the contract net protocol described by Smith (1980) which was developed to specify problem-solving communication and control for nodes in a distributed problem solver.

There are also network-level protocols. One of the most important, considering this research's interest in economic viability, was the Cells-In-Frame protocol described by Dixon (1996). One of the viability issues associated with this inventory selection of the ATM protocol, as the foundation of the preferred infrastructure, is the cost and steep learning curve associated with ATM versus the simplicity, lower cost and increased capability (mostly due to the use of switching) of ethernet. This protocol provides an efficient mechanism for integrating both voice and data traffic on an existing campus network, that is currently supporting legacy LAN workstations, by exporting ATM services within standard LAN frames. The importance of this. protocol, therefore, is that it provides a viable approach to utilizing ATM which is being adopted for the public carrier networks in conjunction with ethernet (particularly switched ethernet) which is the predominant LAN technology (note: the Cells-In-Frame protocol is not limited to use with ethernet; however, that is the only LAN protocol of interest in this research). This protocol also provides a starting point for consideration, in future research, of other frame based transports, such as frame relay or gigabit ethernet, as an alternative to ATM.

Two additional references on network related protocols were the one dealing with flow synchronization by Escobar, Partridge, and Deutsch (1994) and the one by Lampson (1993) which dealt with reliable messages and connection establishment. The flow synchronization protocol established a mechanism for providing an adaptive and synchronized delivery of data to and from geographically distributed sites. Lampson's work provided a way to reliably deliver messages from a sender to a receiver over an unreliable network. Both of these issues are important in the creation of a distributed service creation infrastructure.

In addition to specific protocols, there were some other references relating to protocol mechanisms and techniques that are of particular interest to this research. One of the more interesting and potentially useful techniques was described by Osborne (1995). Osborne presented a "hybrid deposit" model for low overhead communication. In this technique, the destination address was a function of both sender and destination states and the sender directly deposited messages into the destination user-level memory. There are a couple of possible applications for such techniques within the envisioned distributed service creation infrastructure, both at the application and control levels.

Other mechanism or technique related papers included discussions of single-link and time communicating finite state machines by Peng (1994), construction of multiphase communication protocols by Singh and Sammeta (1994), and protocol parallelization by Touch (1995). In the first paper, Peng presented the single-communicating finite state machine (SLCFSM) as a variation on the more commonly known communicating finite state machine (CFSM) in which each SLCFSM machine has only one incoming FIFO link and incoming messages from different machines all come from this single link as opposed to the situation for CFSMs where there is a separate FIFO channel for each communicating machine. The SLCFSM model is much closer to the situation that will be needed for constructing agents within the distributed service creation infrastructure. Furthermore, Peng proposed an additional variation on the CFSM with the introduction of the time communicating finite state machine (TCFSM). The TCFM model included the classical CFSM model as a special case. TCFSMs associate two time quantities, which represent time constraints for the execution of the transition, with each transition. This approach made it feasible to model self-stabilizing delay sensitive communication protocols and distributed algorithms with greater ease.

Singh and Sammeta (1994) presented compositional techniques to design and verify protocols. The techniques that they present facilitated modular design and verification of protocols. Touch (1995) discussed issues related to the possible use of protocol parallelization to alleviate potential performance bottlenecks at higher communication rates. Although he concluded that conventional parallelization may not be applicable to protocols, he indicated some new types of parallelism that may be useful in approaching the problem. Both of these inquiries, when considered with the variations on the CFSM model proposed by Peng, provided a basis for considering the lower-level mechanisms that might be used to design the communication and coordination mechanisms for the distributed agents that would be used to establish the distributed communications infrastructure.

The research involved with respect to the present invention was a systems-level investigation into peer-oriented collaborative computing architectures. The research adopted as a starting position the assertion that peer-oriented, end user control of service creation is a desirable objective and the hypothesis that peer-oriented end-user controlled networks and internetworks are operationally feasible and scalable over a broad range of size and complexity. The research objective is supported by first asserting that the parameters relating to network QoS are well established and can be found in the literature as well as in standards set by the ATM Forum. The notion of bounding parameters is then introduced as being those parameters which are likely to cause a service to be viewed as unacceptable to general users when the tolerance limits of those parameters are exceeded. Some of the components within the proposed infrastructure will have attributes which represent these parameters along with their associated tolerance limits. The methodology described is designed to support the consideration of architectural constructs which can integrate such components into a more comprehensive infrastructure in a way that is capable of supporting the desired peer-oriented control and service creation capabilities.

Inquiry relating to the hypothesis is enabled by considering aspects of the Internet as a platform for supporting investigation and discourse relating to the establishment of peer-oriented control and service creation within an internetworking environment. There are issues with this use of the Internet architecture which relate mainly to differences in the use of IP internetworking protocol in the Internet and intended use of ATM protocol for the target infrastructure platform. Overall, the balance between issues and benefits regarding the investigative analogy to the Internet favors the benefits. The basis for this assertion is derived from the useful operational characteristics provided by the internetworking complexity and diversity of the Internet along with the practical need to resolve issues between IP and ATM, regardless of this intended use, in order to establish an operationally viable infrastructure, within the context of the current installed base of networked systems.

By utilizing the existence of the Internet as an example, it can be established that, at least in some configuration, large networks and internetworks based on distributed or decentralized control are feasible. The growth rate in the size of the Internet can be used as one indicator of the usefulness of such infrastructures and the growth in E-mail, conferencing and telephony over the Internet may be an indicator of the usefulness of such infrastructures as platforms for collaboration. With these foundation facts and assertions established for such a large scale infrastructure, it is possible to approach the applied or engineering problem of considering the relevant characteristics for such architectures when they are extended to support peer-oriented control and service creation. This search for canonical parameters, collaborative design elements and peer-oriented control and service creation mechanisms is the objective that the methodology of this research sought to support.

The research approach is primarily based on a system structural analysis that focuses on the establishment of a component based abstract model which represents the collaborative application and the associated networking environment which supports it. The components of this model will be based on a decomposition of the overall notion of peer-oriented network control and service creation into manageable architectural areas for which useful attributes can be ascribed, alternatives researched, and solutions developed.

The Zachman framework is described by Loosley and Douglas (1998). According to these authors, the Zachman framework "is now widely recognized as a simple but comprehensive formalism for organizing ideas about how we develop information systems. Rows in the framework correspond to the various stages of the application development process (planning, analysis, schematic design, technical design, construction, and deployment). Columns correspond to the distinct components of a business application (data, rules, process, location, time, and user role)." Loosley and Douglas point out that these column categories can alternatively be thought of as the what, why, how, where, when, and who questions, regarding the system under consideration.

Java and Java Beans language and support tools provide a significant analysis and design resource for conducting this research. From the earliest beginnings of this research, there was a desire to have a specific target language in mind as the analysis and design progressed, a position consistent with the engineering orientation adopted by this research. Languages initially considered included procedural languages such as C, functional languages such as Dylan and. Miranda and object-oriented languages such as C++, Eiffel, Python, and Java. After much thought about the various languages, as they related to the problems identified with the environment and development tasks that needed to be accomplished, Java, along with the component form Java Beans, was selected as the target research and implementation language. The fact that Java has, from its inception, always considered networking and distributed computing issues as being extremely important when it comes to language features and implementation issues has helped stimulate a great deal of Java-oriented literature dealing with these issues. In conducting this research, significant use has been made of this literature. There is also a great deal of literature available regarding performance, binding Java code to native C or C++ code, real-time garbage collection, tuning of the Java virtual machine, the development of native Java processors, and the use of Java in embedded systems that is of great significance when it comes to implementing an infrastructure, such as the one contemplated by this research. The volume of material available, however, is on a scale much greater than that required for the conceptual research stage. Fortunately, once convinced that if a framework utilizing Java-oriented concepts could be designed there would be a way to implement it, it is possible to set aside these important implementation issues and focus only on the concept analysis and design aspects of the problem.

The following block model of the problem domain (FIG. 1) utilizes first-class connectors, a notion that will be expanded upon as the investigation progresses. The notion of first-class connectors was introduced by Shaw and Garland (1996). According to these researchers, connectors require specifications, which are called protocols. Since protocols can be of many different kinds, languages should allow for flexible specifications. In particular, it is important to be able to characterize properties as diverse as the following:

- Guarantees about delivery of packets in a communication system
- Ordering restrictions on events, using traces or path expressions
- Incremental production/consumption rules about pipelines
- Distinguishing between the roles of clients and servers
- Parameter matching and binding rules for conventional procedure calls
- Restrictions on parameter types that can be used for remote procedure calls

EMBODIMENTS OF THE PRESENT INVENTION

The present invention has the ability to directly support collaborative application control paradigms that are orthogonal to the underlying network resources and control mechanisms used to support the collaborative application space. The basic notion behind orthogonal control mechanisms is to make the network resources transparent to the collaborative application environment. In a procedure analogous to translating a geometric figure oriented around one axis to an orientation around an independent axis perpendicular to the first (hence the use of orthogonal in the nomenclature), support for orthogonal control seeks infrastructure architectural mechanisms that transparently translate control notions related to collaborative efforts directly into supporting control mechanisms for the network. While there has been a great deal of work on various middleware concepts, such efforts generally have as an end result a set of application program interfaces (APIs) which help reduce the level of complexity needed to utilize a network infrastructure. However, these APIs still fall short of implementing a true orthogonal control mechanism that directly maps application oriented control notions into corresponding network control mechanisms.

The present invention includes the following capabilities:
1) the ability to coexist with existing network architectures;
2) the ability to gracefully degrade enhanced services under adverse circumstances and to be able to include non-enabled devices within the collaborative framework even if it would be at a lower level of capability; and
3) the ability to accommodate the various modes of messaging (i.e., Client/Server, Peer-to-Peer, Multicast, and Broadcast).

The present invention provides economic real-world solutions to the following two fundamental questions:
1) What are the issues and parameters of collaborative peer-oriented applications?
2) What type of infrastructure could support these requirements in a peer-oriented open systems orientation?

One aspect the present invention is concerned with is the structure of an application level or "logical level" control mechanism for communication services used in support of various peer-oriented types of applications. There is nothing expressed in the problem that immediately excludes alternative network technologies other than ATM. Because of the desire to map logical control into network control, however, there will be issues that are specific to the capabilities of the underlying ATM protocol.

ATM offers the following benefits:

1. ATM offers integral features such as quality of service and traffic loss prioritization. Its connection-oriented nature and guaranteed quality of service make it well suited to carry video and multimedia.

2. ATM's bandwidth scalability is capable of accommodating the expected growth in end-user bandwidth demand.

3. Desktop workstations have acquired the processing power to effectively handle application environments that utilize multimedia elements such as appended voice and video, which increase the demand for network capacity. ATM will be able to support these and similar applications more effectively than existing communication services.

4. ATM-based services are the best suited, compared to all other currently available alternatives, to support high-performance applications.

5. As bandwidth is increased, the laws of physics as they relate to transmission become an important factor. Throughput does not increase in proportion to bandwidth at speeds in the hundreds of megabits/second. Because of this, it is imperative not to further add switching delays. ATM technology is the best suited, compared to all other currently available alternatives, to support high-performance services because the switching delay is kept very small.

6. It is essential that bandwidth be allocated intelligently and efficiently. This feature cannot be added as an afterthought, but must be part of the original architecture. Such allocation is one of ATM's strongest features.

7. ATM makes it easier to carry out routine element layer management functions, permitting managers to focus upon higher layers. ATM's basic philosophy is scalability, hence technological longevity. In addition to commoditizing the physical layers, the much simplified infrastructure made possible by ATM's basic philosophy permits a longer productive life cycle for the cabling plant and networking hardware. The cost and inconvenience of performance upgrades are reduced.

8. ATM also strikes a serviceable balance between two related issues in network design: accommodation of traffic bursts and control of congestion caused by competition for resources among candidates for transmission.

9. Like any other technology operating at the Data Link Layer, ATM is independent of upper layer protocols. This means that ATM will carry any Protocol Data Unit (PDU) that is handed down to it through the ATM Service Access Point (SAP). The developers have designed appropriate ATM Adaptation Layers (AALs), which reside above the ATM Layer and below the Network Layer, to accommodate the internetworking function.

10. In ATM, the view of the network is nearly the same, whether it is a LAN or WAN, public or private.

Having selected ATM as the base network technology, there remains the issue of dealing with the fact that the majority of networked collaborative applications currently run on LAN technologies such as Ethernet or Token Ring with various wide-area links. There is a need to link the collaborative infrastructure to such established LAN technologies. Such a linkage will be considered but only for Ethernet. This is done for reasons of scope containment since, from a pragmatic standpoint, Ethernet is by far the dominant LAN technology. Ethernet is also the focus of most current interest in supporting such applications through the use of switched and fast Ethernet. A second reason for considering only Ethernet is that the new Cells In Frames Specification Version 1.0 (1996) for ATM was originally specified for Ethernet (although a specification could be developed for Token Ring or other frame based protocols).

A high-level illustration of an embodiment of the present invention is presented in FIG. 1. In order to set an adequate foundation for the discussion of operational objectives, it is useful to augment the high-level diagram in FIG. 1 with N-Square Charts for the three major components: Workstations, Servers, and Participating ATM Switches. FIGS. 2A–2C contain the charts for each of these components, respectively.

Referring to FIGS. 2A–2C, the N-Square Chart (Aapl) is a technique used by Bass, Clements, and Kazman (1998) to study the information flow relationships between functional modules in a system or sub-system. These researchers describe the use of these charts as follows: the boxes on the main diagonal represent the system partitions. Their inputs are found in the column in which the partition lies. The outputs from the partition are shown in the row in which the partition lies. Therefore, the full set of inputs to a partition is the union of all the cell contents of the partition's column. Conversely, the full set of outputs is the union of all the cell contents in the row in which the partition resides. The flow of data from one partition to another is to the right, then down, to the left, and then up.

FIGS. 1 and 2A–2C provide an adequate contextual framework for presenting and discussing the operational objectives of the present invention. Both FIG. 1, which represents the system-wide aspects of the infrastructure, and FIGS. 2A–2C, which represent the local component aspects of the infrastructure, are necessary to provide a complete view of the functional context of the infrastructure. The operational objectives are first identified and then briefly discussed. The initial operational objectives for the peer-oriented control and service creation infrastructure of the present invention are organized into the following five categories:

I. Control/Service Creation Architecture and Capabilities

Supports orthogonal control

Supports user service definition

Supports service libraries

Supports flexible control and service creation

Infrastructure is modifiable while in operation

Upgrades made on-demand and as required

No architectural need for a system-wide shutdown

Works over a variety of physical network infrastructures

Services are established at a rate comparable to competing technology

The control and service creation capability functions over mixed domains

Supports flexible resource accounting

Tracks resource utilization by participating device

Can aggregate resource consumption by domain

Can monitor and report on service QoS in relation to SLAs

Can provide proration profile by session

II. Interaction with Non-participating Infrastructure Elements

Supports non-participating devices at the infrastructure edge

Supports alternative frame based edge-networks

Spans non-participating switches

III. Robustness of the Infrastructure

Supports graceful degradation prior to failure where possible

Utilizes redundancy and no single point of failure principles

Supports fault isolation and adaptive avoidance

Supports dynamic network reconfiguration

IV. Scalability of the Infrastructure

Scalable from individual workgroup to global utility

Resolves scalability issues associated with dynamic reconfiguration

V. Architecture Value

Supports alternative implementations to maintain high value

Supports selective/elective use of alternative transmission paths

Supports QoS value decisions explicitly available from the user interface

The objectives category dealing with architecture and capabilities collects the objectives associated with what the infrastructure will do. One main theme in this category deals with end user-control over service creation in a manner that expresses requirements in terms of application domain services. For example, a multiparty conference might be established by: 1) selecting a multiparty conference service template from a library of services; 2) setting the attendees property to the names and organizations of the people that would be participating in the conference; 3) placing the service template icon on a graphical service control panel; and 4) pressing an "Establish Service" button on the control panel. The significant element of this scenario is that the end-user is marshaling and controlling network resources totally in terms of application domain elements. This is the essence of orthogonal control which is an aspect of the present invention.

Beyond the basic notion of orthogonal control, the architecture and capability category also includes the major theme of "componetization" of service. This "componetization" analytically decomposes a broad range of collaborative multimedia services into atomic service elements which can be implemented as a component. These service components may be linked together to create service templates which are capable of directing the creation of a specific user recognizable service. Service templates, in like manner, are component aggregates which can be treated as an atomic component for use in establishing a higher-order user recognizable service. For example, a phone call might be composed of an address resolution component, a dialing component, a bandwidth reservation component, a billing component, etc. In like manner, components for screen sharing, document sharing, video conference, and whiteboard could be defined.

It should be understood that service templates may have either a static or an active implementation. The minimum functionality requires that service templates contain the attributes of the services that they represent. Such attributes may contain items, among others, such as the amount of bandwidth the service requires, which adaptation layer should be used to segment that application data stream into packet payloads, whether a single composite virtual circuit with multiplexed services may be used or whether separate virtual circuits should be used when multiple services or capabilities are combined in a single composite service request (i.e., group videoconference with group whiteboard support and subgroup chat capabilities). Both approaches require support logic in order to make the composite services. Using the static approach, the local agent may have to supply all the logic which may require that the local agent be updated often. The active approach may use a component approach (such as Java beans) to help reduce the amount of change that would be needed to accommodate the agents. Also, a component model, such as Java beans, already has a viable mechanism for aggregating services by "wiring" components together.

These services could be treated as atomic components for use in defining a user recognizable high-order service such as a multiparty collaborative video conference with document sharing and common whiteboard support which, in turn, could be established as a single service template. The aggregation of atomic service components is available for end-user control so that the end-user can modify existing services or create new ones, thus providing the end-user with true custom service definition capability. The combined notions of orthogonal control and end-user service definition capability, in general, characterize the major feature benefit objectives of the peer-oriented control and service creation infrastructure. There are, however, other objectives that serve to establish the operational feasibility and economic viability of the infrastructure.

A key objective in this support area has to do with the ability of the infrastructure to support a flexible control structure that does not have to be shut down in order to have new services added, code revisions (maintenance) performed, or new versions of the base software installed. It is also an objective that the control mechanisms utilized to implement the infrastructure be able to function and establish a defined service within the timeframe required by competing technology. For example, an end-user in the United States has a general level of expectation as to how long it should take the telephone network to establish a local, long distance, or international call. It is an objective that, where such generally expected service establishment times exist within the target end-user community, they should be used as the performance objective of the infrastructure. In general, the system architecture issues associated with the flexible control objectives are best considered within the conceptual framework presented in the N-Square charts prepared for the workstation, server, and participating switch which are presented in FIGS. 2A–2C.

In addition to the objectives associated with flexible control, objectives associated with infrastructure operation across multiple domains are a very significant aspect contributing to the operational viability of the peer-oriented control and service creation infrastructure. For this application, a domain is loosely equated with a switch or group of switches (or routers) which provide dynamic transmission path connections between collaborating peer workstations as well as to various servers which may be supporting the collaborative communication service in which the peer workstations are engaged. Between any combination of collaborating workstations, or other end devices, there is at least one and possibly several domains which separate collaborating peers and supporting servers. Technically, there is also the degenerate case where two workstations could be directly wired together without switching capability.

Within the general notion of domains, there is the classifying notion of participating and non-participating domains. A participating domain is one in which the switching or routing device(s), which establish the definition of the domain, are capable of intercepting and operating on peer-control messages (as opposed to native network control messages) in order to adjust their behavior and performance as it relates to supporting services required to maintain the collaborative service which has been established through them. Non-participating domains are those in which the switching or routing devices do not have or do not publicly offer this capability. A primary source of non-participating domains arises when public network facilities are used to connect two participating domains. It is possible, however, to configure a cluster of domains, some of which are participating and others which are not, under the complete control of a single private entity. There are certain circumstances, which are not all that special or uncommon, for which such a configuration would provide a logical solution.

Along with the notion of multiple intervening domains, which may be owned or controlled by different entities, comes the problem of accountability for resource utilization. The final objectives within this first category address issues related to this aspect of the infrastructure. All of the objectives and issues relating to domains (which include issues related to edge networks) and resource accounting are best considered within the conceptual context provided by FIG. 1.

The second classification of objectives is concerned with how the infrastructure interacts with non-participating or alternative transport protocol devices. In referring to FIG. 1, there are eight cases, seven of which are of interest in regards to this issue. These cases are identified in FIG. 3, Infrastructure Participating/Non-participating Boundaries. The entries in this table are keyed to structural features presented in FIG. 1.

Referring to FIGS. 1 and 2A–2C, the following cases can be identified:

[B] A participating workstation connected to the peer-oriented infrastructure via a non-participating domain.

[C] A participating device utilizing an alternative protocol (Ethernet) connects to the infrastructure via a gateway. The peer-control information is passed through the gateway to the terminating device in some form of data and control stream analogous to the ATM transmission mode used for the infrastructure.

[D] A non-participating device utilizing an alternative protocol (Ethernet) connects to a participating ATM domain via a gateway server which also terminates the peer-oriented control information that the infrastructure is passing with the data stream.

[E] A non-participating device connects to the infrastructure via a participating gateway server which also terminates the peer-oriented control information that the infrastructure is passing with the data stream.

[F] A non-participating device connects through a non-participating domain which connects to the infrastructure via a participating gateway server.

[G] A participating device connects through a non-participating domain.

[H] A non-participating device connects to a gateway server which, in turn, connects to the infrastructure via a non-participating domain.

There are, in general, two main issues that characterize this group of objectives: 1) how are peer-control messages conveyed to the participating end device where that device is separated from the infrastructure by a non-participating domain or alternative frame protocol participating domain and 2) where is the gateway service for non-participating devices located in relation to other intervening domains? These basic questions pose various combinations of architectural issues and the objectives found in this category ensure that solutions are found and incorporated into the infrastructure.

The third category of objectives seeks to ensure that the peer-oriented control and service creation infrastructure will function in a robust manner. As this category of objectives focuses on adaptation under stress and recovery from failure, it tends to state objectives in terms of some form of dynamic reconfiguration or adaptation of the infrastructure elements. The characteristics which involve dynamic network reconfiguration, however, apply equally well to certain value-creating capabilities such as tariff rate based selection of transmission paths.

The category of objectives dealing with scalability is relatively straightforward. The need for the infrastructure architecture to be able to support a cost-effective configuration for a single workgroup as well as a configuration for supporting a global communications utility is a prime objective that needs to be met in order to establish the architecture as a viable communications platform. Meeting this objective can be complicated by the dynamic join-and-leave capability offered by the proposed infrastructure through temporary binding of domains belonging to different entities.

The fifth and last category of objectives seeks to assure the viability of the infrastructure within the economic dimension of the solution space. Systems architectures which seek to provide a common utility type infrastructure need to be concerned with the implied economic acceptability of the technology employed. One aspect of this acceptability involves the ability of the infrastructure to generate value for its intended user community. The objectives in this category focus on those issues which would contribute to this creation of value for the end-user.

The topical categories used to review literature were selected based on the preceding description of FIG. 1 and the operational objectives set for the peer-oriented control and service creation infrastructure. The four broad areas selected for the review of literature include environment, services, networks, and implementation.

The environment category was intended to collect ideas and concepts related to the software implementation solution domain. The primary themes of this domain include notions of distributed processing, adaptability and the ability to perform some tasks in real-time.

The services category focuses on the core objectives of the functionality that is desired. The notions as to what a service is and how it relates to the quality of service (QoS) offered by the network are central to the consideration of this desired functionality. If services represent the desired functionality of the application level, then the network represents the orthogonal notions associated with delivery mechanisms. The networks category is, therefore, concerned with issues of network architecture and control.

The previous categories provide a general sorting mechanism that identifies the objective functionality (services), the delivery platform (networks), and a general notion of the solution domain (environment). The fourth, and final, general category (implementation) isolates particular focused topics that are important to the investigative effort.

Taken together, these four general areas (Environment, Services, Networks, and Implementation) form the basic framework for organizing concepts for use in the present invention.

The Problem Domain

Figure 4A:
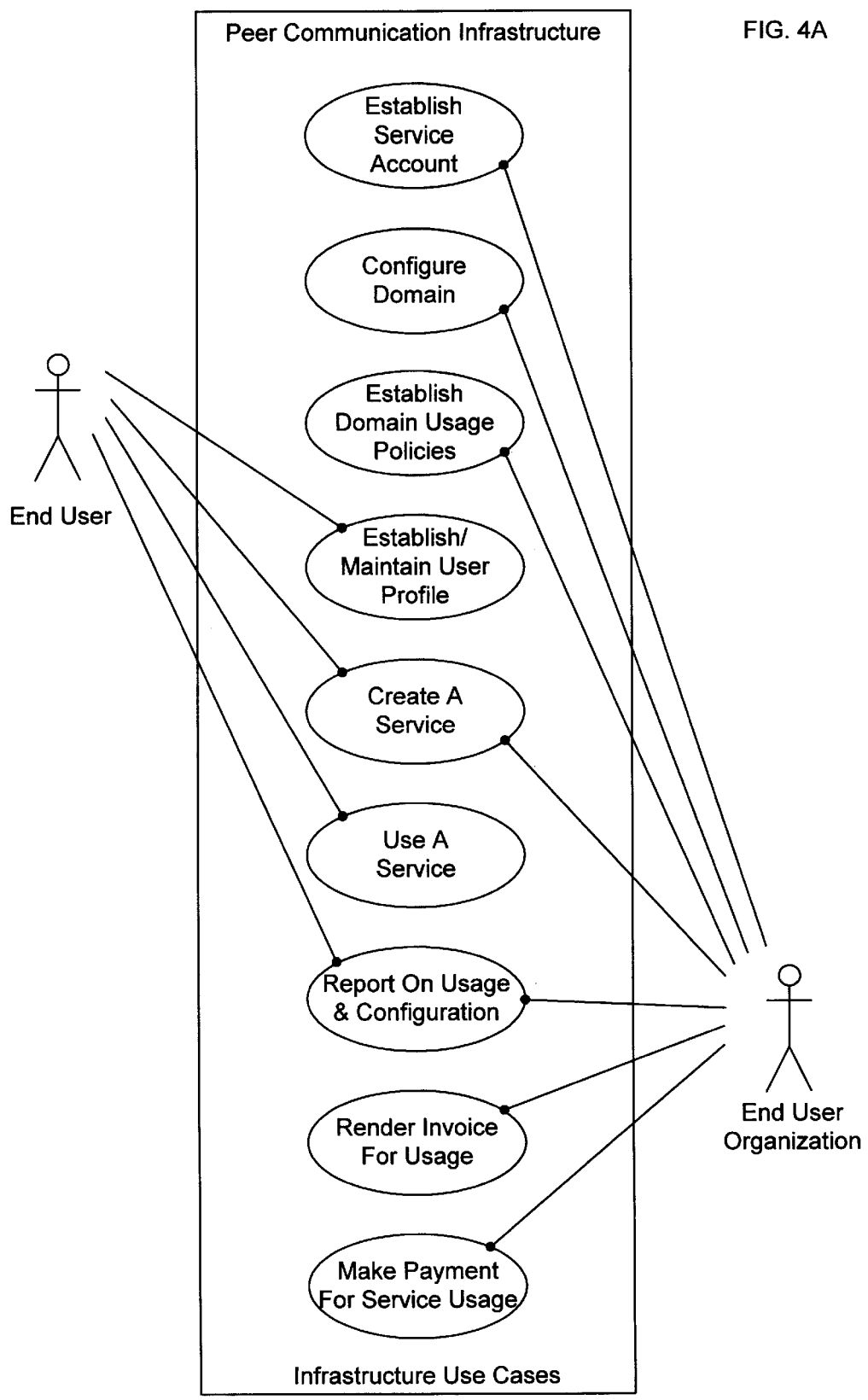
Figure 4C:
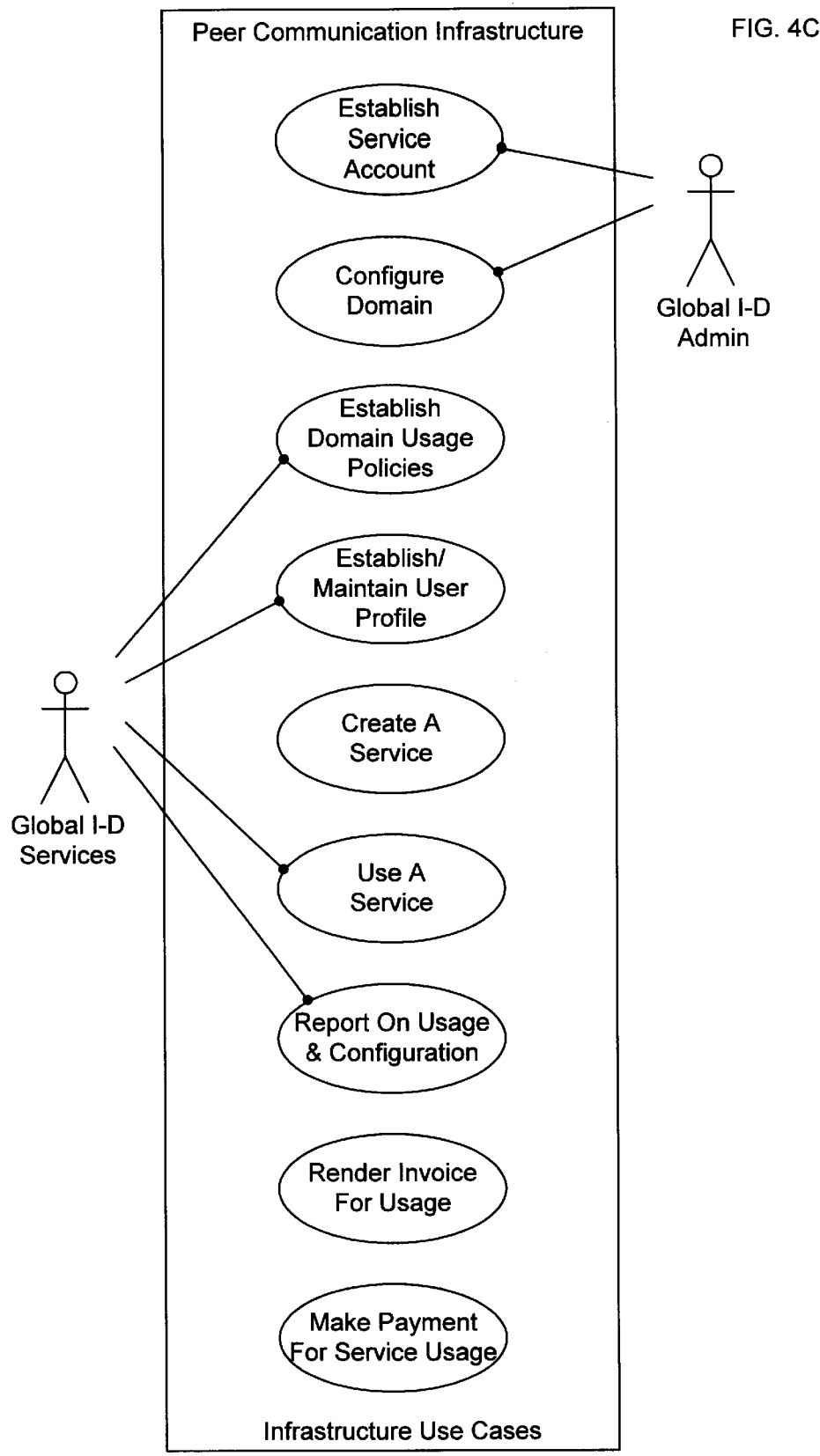
Figure 19A:
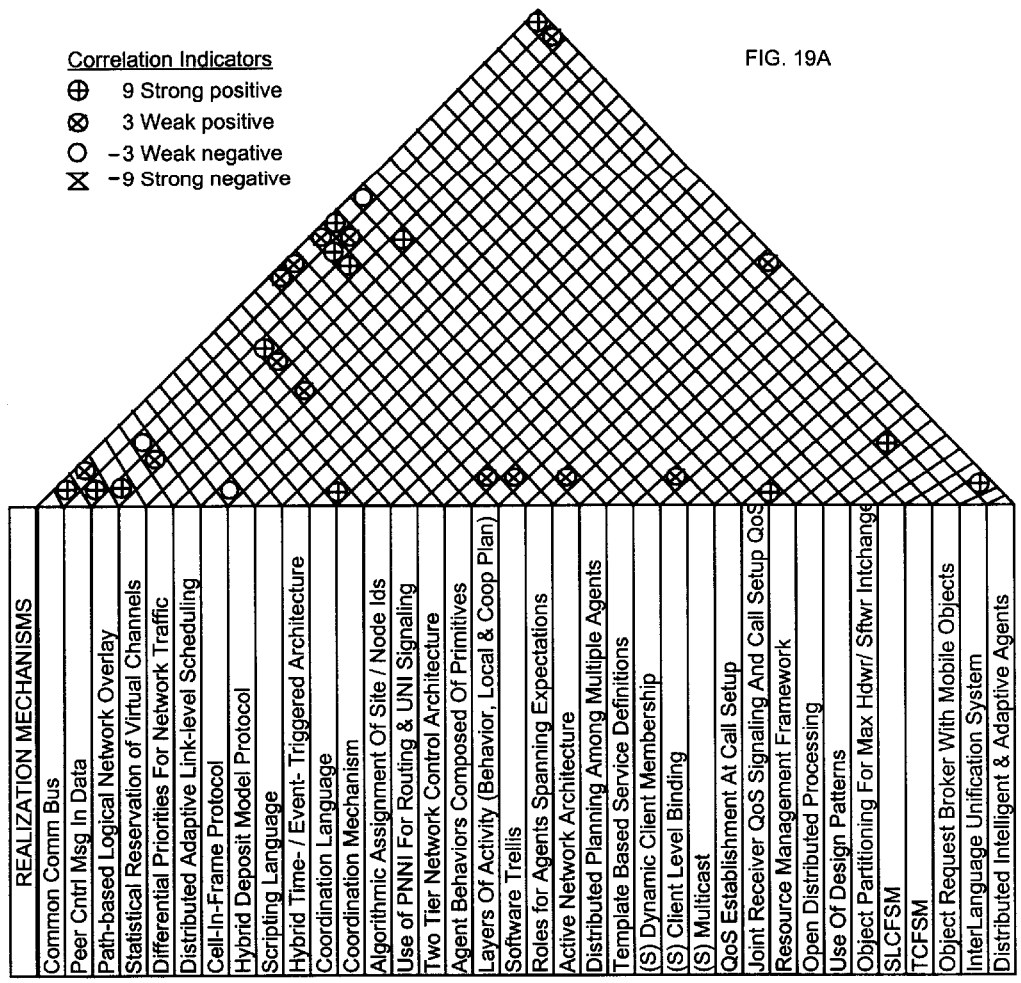

The generic high-level use case for the infrastructure is presented in FIGS. 4A–4C. In reviewing this use case, it can be noted that nine high-level use cases have been defined for the peer communications infrastructure application. Since these use cases all are associated with the peer communications infrastructure, it is correct use of UML notation to show them all within the system-boundary (rectangle surrounding the application name). For improved understanding, however, it is useful to realize that there is an inherent higher-level organization that may be applied to these use cases. This organization is as follows:

Establish Account

Establish Service Account

Maintain Domain

Configure Domain

Establish Domain Usage Policies

Normal Use

Establish/Maintain User Profile

Create A Service

Use A Service

Report On Usage & Configuration

Account Settlement

Render Invoice For Usage

Make Payment For Service Usage

Before proceeding to a presentation of the individual use cases, it would be useful to clarify the nature of the actors that have been identified (see FIG. 5).

Due to the complexity of the use case diagram, it is useful to recap the participation of the actors in the various use cases. This participation is summarized in FIGS. 6A–6B.

In reviewing the infrastructure use case diagram in FIGS. 4A–4C and the actor descriptions and use case participation presented in FIGS. 5 and 6, it is useful to point out some assumptions that have been introduced into the emerging architectural framework as the result of the influence of the objectives that were established for the infrastructure.

The first point of interest is the implied separation of users and providers. End User and End User Organization may be classed as user type actors, while Global and Local Interdomain Administrators as well as Global and Local Services may be classed as provider type actors. This separation is introduced to support the notion that some of the domains over which the infrastructure operates may be owned or controlled by organizations other than the one to which the End User belongs and that this situation is likely to require additional functionality to support "arms-length" transactions between these organizations. Were this not the case, it would be possible to define the system without the role of provider (Global/Local Administrator); however, the roles of actors representing the aggregate behavior of software providing the service capability (Global/Local Services) would still be needed.

A second point of interest is the separation of Global and Local actors for Administrators and Services. This notion is introduced for two primary reasons. The first is that the objectives for the infrastructure include the capability of the infrastructure to scale from support of an individual workgroup to being able to support the operation of a global utility. The second stems from knowledge about the implementation domain for telecommunication services (the telecommunications industry). Within the current structure of the industry, there is generally a separation between use of local access versus long distance interconnect. While the business roles of providing these services are becoming less distinct, there are still operational reasons for identifying them separately. Also, the notion of global utility service increases the likelihood that there will, in fact, be different organizations involved.

Finally, the third point to note is a consequence of the second set of issues. The separation of Global and Local on the provider side of the system introduces an interesting situation with respect to developing the use cases. Use cases are generally employed to capture the relationships between external actors and the system under investigation. In this case, we have user type actors and provider type actors as they interact in relation to the peer communications infrastructure. The focus in this case, however, is driven by the primary relationship of the user type actors to the infrastructure and only secondarily (i.e., only to the extent necessary to portray direct interaction necessary to support the description of the primary actors' involvement with the use case) to the provider type actors. This situation arises because additional use case scenarios between the Global and Local provider type actors are actually implementation issues when viewed from the perspective of the user type actors and more established notions regarding the external boundaries of a system.

In the move to agent based systems with multiple concentrations of aggregate behavior which are loosely coupled to form the "system," questions regarding boundaries begin to move into a more ambiguous area. In situations where the functional subdomains represented by focused aggregate behavior are associated with separate and distinct system or organizational entities, the aggregate behavior (of the system subdomain) may need to be considered a legitimate source of use case scenarios. This would be the case even though they are not necessarily completely outside the bound of the system as viewed by the ultimate end user of the system. The situation just described seems to be applicable to the relationship of the Global and Local Administrators as well as to the Global and Local Services actors. That is, there may be useful use case scenarios between these actors and the "system" that should be identified for architectural reasons but which would look to the ultimate end user as being within the bound of the system. For the present work, such considerations will be set aside utilizing the assumption that such potential use cases can be resolved as design or implementation issues without seriously impairing the architectural investigation that is the subject of the current research effort.

With these qualifying comments made, the use case descriptions can be presented. Larman (1998) describes both a high-level and extended use case format. The main difference is that the latter generally has a "Typical Course of Events" section which describes the associated step-by-step events. For the investigation at hand, the shorter format will be used since what is important at this level of investigation is gross functional elements or capabilities whereas the step-by-step use details would be of greater value during design level activities. Larman (1998) also uses one other categorization that is applicable to the high-level use case format (i.e., the classification of the use case as being primary, secondary, or optional). Primary use cases represent major common processes, whereas secondary use cases represent minor or rare processes. The optional use case represents processes which may not be provided when developing the system. Using these guidelines and a tabular format for visual clarity, the use cases are described in FIGS. 7A, 7B, 8A, 8B, 8C, 9A, 9B, 9C and 9D.

The development of these use cases, along with information presented in the "statement of infrastructure operational objectives" section, will be the basis for representing the interests of the intended user community of the present invention.

The functional analysis of the workstation and network portions of the infrastructure (C2 & C3) is performed using a collection framework proposed by Larman (1998). Larman used a table format for recording system functions that included a source reference and function category for each function described. The classification categories used by Larman are as illustrated in FIG. 10.

In developing the functions analysis, the reference entry will be made by constructing the reference IO to indicate whether the source of the functional requirement originates with a use case or from an entry in the infrastructure operational objectives. To indicate a source function requirement originating from a use case, the reference IO will be prepended by the letters "UC." For references with a source requirement originating from the infrastructure objectives, the letters "IO". will be prepended to the outline numbering of the entry to which the function applies. The general form of the function reference ID will be "XX.YYY.ZZ" where "XX" refers to the source type "UC" or "IO"; the "YYY" refers to the source item ( 1–9 for use cases and fully qualified item ID, such as ID2, for infrastructure objectives); and "ZZ" refers to a sequential numbering of functions that are associated with a particular source. The numbering for the infrastructure objective will follow the numbering of the original outline presented in the statement of infrastructure operational objectives (A2). The numbering for the use cases is as presented in the organizational outline following the use case diagram.

Three tables will be required, one for the workstation and two (participating switch and domain services server) for the network component. The domain services server is added to the network component since it represents the generalized repository for infrastructure state information as well as persistent operating rules and cumulative usage information without which the infrastructure could not function. The inclusion of the participating switch in the network component is straight forward as it provides the dynamic interconnection capability and serves as the basis for defining domains which are fundamental to the organization of the infrastructure framework. The functions associated with these three elements of the infrastructure are presented in the FIGS. 11A–11C, 12A–12B, and 13A–13C. These functional analysis frameworks serve as a transitional bridge between the "raw" infrastructure objectives and the initial partitioned functionality of the emerging structural elements of architectural solution space.

The Zachman framework analysis provided in FIGS. 14A–14C provides a convenient framework for organizing observations and additional considerations regarding the current state of problem analysis prior to beginning the architectural features analysis supported by the QDF and QDS charts. The Zachman framework is a formalism for organizing ideas about how to develop information systems that was discussed by Loosley and Douglas (1998). In this formalism the rows in the framework correspond to the various stages of the application development process (planning, analysis, schematic design, technical design, construction, and deployment). Columns correspond to the distinct components of a business application (data, rules, process, location, time, and user role). Loosely and Douglas point out that these columns can alternatively be thought of as the what, why, how, where, when, and who questions regarding the system under consideration. These Alternative headings will be included in the framework as a conceptual aid as illustrated in FIGS. 14A–14C. It may be noted that only the first three stages (Planning, Analysis, and Logical design) have entries. This situation is consistent with the fact that the intent is to work at the architectural level of investigation and, therefore, it is not expected that there would be issues associated with physical design and beyond. A small variation from this expectation is encountered when completing the work on the QFD which includes the identification of realization mechanisms. Although the progression to realization mechanism issues is a definite step towards physical design, the focus remains in a sufficiently transitional area of consideration and may be appropriately included in an architectural level investigation.

Even though the Zachman framework has not been completely filled out, its use at this stage still provides benefit in maintaining investigative focus on high-level architectural issues. By providing a condensed view of the project under investigation, which simultaneously presents all stages of the project and all component areas of the emerging system in an abbreviated format, the Zachman framework tends to reinforce the emergence of the fundamental characteristics of the system being analyzed. Such characteristics are likely to be highly aligned with consideration of architectural issues and the first three stages of the framework, representing planning, analysis, and logical design, are highly supportive of activities and issue resolution from an architectural perspective. The latter three stages represented in the framework, physical design, construction and deployment, can provide a good transitional mechanism for ensuring that the core architectural principles selected are accurately translated into the later design, development, and deployment phases of system development.

Before proceeding on to the discussion of the QDF analysis, it is useful to make a small diversion to consider the selection of an architecture control pattern (Cap2). The desirability of including this additional procedure came to light during the identification of realization mechanisms that is part of the preparation of the QDF framework. Although the analysis and investigation that is the focus of this section actually was done in parallel with work on the QDF, it is presented here as a separate topic preceding the QDF discussion for the purpose of providing clarity to the discussion of the topic.

During the literature review a number of references were cited that dealt with various aspects of using design patterns. The stage at which such patterns can logically be introduced into an investigation (i.e., Analysis, Architecture, Logical Design, or Physical Design) varies depending mainly on the level of abstraction and functional role that the pattern seeks to address.

A work by Douglass (1998), which became available subsequent to preparation of the literature review, is particularly relevant to the discussion of architectural level issues. The focus of the work by Douglass was on the use of UML in designing real-time embedded systems. In a chapter dealing with architectural design Douglass introduced the notion of design patterns for two areas of interest, the first is control and the second is safety and reliability. FIGS. 15 and 16A–16B condense the information presented by Douglass and serve as an introduction to his pattern definitions.

As work progressed with the identification of realization mechanisms for the QDF, it became apparent that there was a need for an alternative type of control pattern in order to accommodate the desired behaviors and emerging attributes of the architecture. This new control pattern will be called "Self-organizing Peer Collaboration." Using the same tabular format used to introduce the patterns defined by Douglass, FIG. 17 introduces this novel pattern.

Consideration of this alternative pattern in conjunction with the defined safety and reliability architectural patterns is useful in helping to formulate the list of realization mechanisms of FIGS. 18A–18H.

The Quantified Design Space (QDS), which includes the material on QFD and QDS, was developed by Asada, Swonger, Bounds and Duerig (1996) and presented in a section of the chapter on architectural design guidance in the work on software architecture by Shaw and Garland (1996). According to the developers, the "QFD is a quality assurance technique that helps translate customer needs into the technical requirements needed at each stage of product development from requirements analysis through design, implementation, and into manufacturing and support." The QFD process is supported by a specific graphical notation, an example of which (completed for the peer-control infrastructure) is presented in FIGS. 19A–19G. There is a well-defined process for translating requirements to realization mechanisms at each stage of product development. A summarization of the eight task steps described by the developers is as follows:

Customer needs are gathered and the scope of the project is established.

Realization mechanisms that will help meet customer requirements are identified.

Target values are established for each realization mechanism.

The relationship between each mechanism and each customer need is established.

Any positive or negative correlation between realization mechanisms is determined.

The difficulty of implementing each realization mechanism is assessed.

The technical importance rating is calculated by multiplying the customer importance factor for each requirement by the relationship factor for each realization mechanism.

After the relationships and correlations have been determined and analyzed, the realization mechanisms to be used in the product are selected.

According to the steps described above, the QFD process diagram was completed by utilizing a scale of 1–9 (9 being the most significant designation) for both the "Customer Importance" and "Organizational Difficulty" factors. Objective target values were selected for each of the realization mechanisms. Finally, the technical importance ratings were computed and the results for each customer requirement were summed to give the technical importance rating for the realization, mechanism.

A starting point for assessing the results of the QFD preparation process can be found in the examination of FIGS. 18A–18H. These two tables contain a recap of the information presented in the QFD diagram with the addition of the structural classification for each realization mechanism and the ordinal position of the realization mechanism within the QFD diagram for reference purposes.

FIGS. 18A–18D contain the information in the original order in which the realization mechanisms appeared in the QFD diagram. Since they were taken directly from the final selection list they are grouped by, structural classification. FIGS. 18E–18H contain the same information; however, it is now sorted by technical importance. The resequencing is a natural first step in the analytical work that will lead to the selection of realization mechanisms for use in the architecture of the peer-control infrastructure.

In reviewing the realization mechanisms ordered by decreasing technical importance, separation lines have been inserted to indicate boundaries of 100 points on the absolute importance rating. This provides a first step in looking for patterns of importance among the realization mechanisms.

Before proceeding on to the QDS analysis, there are a couple of other observations that can be made about the QFD analysis results. These observations relate primarily to the correlations among the realization mechanisms but also involve the interpretation of the realization mechanisms. First, it may be noted that there are no strong negative correlations and only three weak negative correlations. A probable explanation for this involves the manner in which the realization mechanisms were selected, starting with the use of the literature review as the initial source of possible realization mechanism candidates.

The framework for conducting the literature review was constructed in a manner that drove major incompatibilities (i.e., peer-oriented distributed system versus centralized system) from the possible solution space by mandating that the solution space would only focus on peer-oriented type solutions for structural reasons. This was possible because the narrowing of solution space alternatives was linked to the ultimate creation of desired benefits from the system being developed. This finding tends to confirm the value of early linkage between system architectural elements and the creation of the desired benefits for the new system as a method of reducing the complexity of alternatives analysis in later stages of system design effort.

A second observation involves the ability to reduce the amount of analysis by aggregating dissimilar or alternative mechanisms into a higher-order hybrid mechanism. Two fundamentally different paradigms for the design of real-time systems (event-triggered architectures and time-triggered architectures) were discussed by Kopets and Grunsteidt (1994). Although these are paradigm alternatives, there is no fundamental reason why both concepts can not be used in a single hybrid architecture. The choices then become time-triggered, event-triggered, and hybrid. Given that a hybrid architecture will have an added cost in implementation complexity (i.e., support for two base mechanisms instead of one) if a basic (i.e. structural) need for the hybrid can be established early on, the other two alternatives can be eliminated, thus simplifying the alternatives analysis process. For example, in investigating the realization mechanisms for the peer-control infrastructure, the use of an event-triggered architecture was a natural alternative for a user-driven, on-demand system. However, reliability of operation over various network domains indicated the need for a "heartbeat functionality" which structurally might be better-suited to a time-triggered architecture. By focusing on this issue early in the investigative process, at the structural level, the combinatorial factor for this architectural feature was reduced from three to one, thus reducing the number of solution space alternatives that needed to be investigated by the same factor. Again, we see an opportunity to work at the architectural level to clarify and simplify the work that will be needed during later stages of the design process.

These two observations will have an impact on the character and level of complexity of the QDS analysis in that the combinatorial explosion of alternative cases, due to a greater number realization of mechanisms alternatives, will be greatly diminished.

The work accomplished in the QFD provides a foundation upon which to develop a Quantified Design Space (QDS) (C6). According to the developers, Asada, Swonger, Bounds and Duerig (1996), the QDS "takes from the concept of design space the decomposition of a design into dimensions and alternatives, and the positive or negative correlation between design dimensions. The translation of requirements to realization mechanisms, the analysis of relationships between mechanisms and requirements, and the determination of correlations between mechanisms come from QFD. The implementation of the design space on the QFD framework is called the quantified design space." The QDS utilizes a spreadsheet model that can work in conjunction with a spreadsheet model which is the functional equivalent of the QFD diagram, but which is easier to work with for evaluating the resulting impact of alternative choices on the technical importance rating. An example of this spreadsheet, completed for peer infrastructure, is presented in FIGS. 20A–20L in order to demonstrate the equivalence to the QFD diagram and facilitate the computation of the QDS.

The QDF process (whether expressed in the diagram or spreadsheet model) "captures design knowledge in the relationships between realization mechanisms and customer needs, and in the correlation factors among the mechanisms themselves," according to Asada, Swonger, Bounds and Duerig (1996). The design knowledge captured by the QFD chart can serve as a framework for the dimensions and alternatives of the design space. The upper half of the QFD spreadsheet (FIGS. 20A–20L) is equivalent to the Customer Requirements/Realization Mechanism matrix of the QFD process diagram presented in FIGS. 4A–4C. The, realization mechanisms are still in the same order in which they appeared in the QFD diagram; however, the labels have been changed (for space reasons) and a higher organizational group name has been added. This group name is equivalent to what the developers of QFD/QDS analysis refer to as functional dimensions. The lower half of the QDF spreadsheet gives the extended matrix relationship value by user requirement which is used again in the computations for the QDS.

The QDS spreadsheet for the peer infrastructure is presented in FIGS. 21A–21L. In reviewing the axes of the QDS spreadsheets, it may be noticed that the functional dimensions that had appeared horizontally across the top of the QFD spreadsheet have been moved to the vertical axis in the QDS spreadsheet. The functional categories have been retained. In the presentation of the developers, the realization mechanisms grouped within a functional category are identified as alternatives (this is a point that will be discussed further in the interpretation of results). The new horizontal axis consists of high-level structural elements which, for this example, were derived from an examination of the preliminary domain model and its associated descriptions, provided in section A of this chapter. Underneath these elements are alternative architectural mechanisms that might be used in developing the system. At this high level of analysis, the alternatives are mutually exclusive which is an architectural assumption of the QFD/QDF analysis mechanism as described by its developers.

This notion of mutual exclusivity seems to trace back to the developers' discussion of design space where they state "the design space organizes the choices available for a particular design into a hierarchy of dimensions and alternatives. The result of a QFD process represents a particular set of these choices, one from each dimension of the design space. By explicitly including all alternatives of each dimension in the QFD framework, each alternative can be analyzed for its ability to meet the need for the customer and for its correlation to alternatives in other dimensions" (Asada, Swonger, Bounds and Duerig 1996).

In examining the QFD process diagram (FIGS. 19A–19G) there is nothing that indicates that the realization mechanisms are or need to be mutually exclusive alternatives, with the possible exception of guidance that may be gained from examining the correlation indicators. Even using this correlation indicator mechanism, there is nothing in the diagram which serves to indicate the clustering of alternatives within a functional dimension; yet, when the developers move from their QFD diagram to the QFD spreadsheet, the notion of functional dimensions with mutually-exclusive alternatives emerge and are carried forward into the evaluation of the QDS.

In working with what can be considered actual project information (i.e., realization mechanisms proposed for use in constructing a peer-oriented control and service creation infrastructure), the experientially-based process (i.e., surveying what mechanisms have been described and used in other situations that may be useful for the problem at hand) that was used for discovering or deducing design space options did not produce alternatives consistent with mutually-exclusive alternatives for dimensions within a design space.

In developing the QFD/QDS analysis framework, the developers adopted the basic notions of design space from Lane (1996), who also contributed to the same chapter in which QFD/QDS is discussed. In this subchapter in the work on software architecture by Shaw and Garland (1996), Lane developed the concepts associated with the notion of design space that he had first established in his Ph.D. dissertation which dealt with the development of an AI tool designed to assist in the design of user-interface architectures. The QFD/QDS spreadsheet analysis tool was constructed as a project by a group of graduate students in software engineering. The first step in implementing this tool was to introduce the spreadsheet model of the QFD diagram. In this implementation of the QFD model, however, the developers introduced a notion of mutually-exclusive functional alternatives that is not part of the QFD diagram and quality assurance process.

In the current research, the basic approach of using the QFD diagram as the basis for establishing some parameters regarding a design space, for the peer control and service creation infrastructure that was under investigation, offered many compelling advantages.

Also, the possibility of an evaluation framework, within which complex architectural alternatives could be evaluated in terms of user requirements, appeared to be a desirable objective. The obstacle to realizing these objectives appeared to be the mutually-exclusive alternatives at the functional level. Even a system problem domain as broad and complex as a communications infrastructure has mutually-exclusive options at the highest architectural levels. The problem is that at the functional level, Lane had a more focused application domain environment that was amenable to a delineation of mutually-exclusive choices along defined dimensions. For large complex application domains, such as a communications infrastructure, the functional options expand into relevant design spaces in which such rigidly defined dimensions and mutually-exclusive alternatives are unrealistic. A solution to this problem was to relax the mutual-exclusivity requirement at the functional level. This approach gained the desired benefits of linking the user requirements to the architectural alternatives.

In order to achieve this relaxation from a computational perspective, a modification was made to the QDS spreadsheet. A summarization spreadsheet was introduced that allowed all of the realization mechanisms to be active and included in a summarized manner. Since there were no mutually-exclusive alternatives among the realization mechanisms, it was sufficient to simply select them all for use in the computation. It is quite possible that an exclusivity mask, composed of "1" s and "0" s, might be used in conjunction with this computation as a third element of the factor multiplication to correctly introduce selective exclusivity without requiring the introduction of the more rigid dimensions and required mutually-exclusive alternatives that do not fit the character of the more complex design space.

In performing the computations of the modified QDS, there were some additional results that were interesting. FIGS. 22A–22D present the raw application scoring for the alternatives listed at the bottom of the QDS in FIGS. 21A–21L. The alternative selections associated with design decision A are consistent with the normal use of the QDS analysis process. That is, for each set of design alternatives the highest scoring alternative is selected for inclusion in the design approach. In design decision B, the last three sets of structural elements used alternative selections of less that were less than the highest value.

Given the user requirements as stated, a persuasive case can be made that the design alternatives included in design decision A would be the most effective way to construct the proposed infrastructure. However, the notion of economic viability was introduced at the start of this investigation as an additional factor that needed to be considered in deciding on system strategic architectural and design issues. The three architectural areas, in which lower valued alternatives were chosen in design decision B, represent value impact are as where technical superiority and elegance of the "technically better" solution have to be weighed against the end-user value considerations. If design decision A were selected, the end-user would have to consider the value impact of either forced obsolescence or non-interoperability with other installed systems and equipment.

There may be ways to systematically alter the evaluation structure such that market-related considerations could automatically be included in the design selection criteria. Due to the variability of factors that could be involved, however, it is better to leave such considerations for other investigative efforts. For the purposes of this research leaving the final review of alternative architectures as a last step, separate and apart from the rest of the analysis framework, is an acceptable method of dealing with the complexities that can be associated with end-user value considerations. In addition, separating this step provides the opportunity to focus on the differences in architecture approaches in relation to the perceived added end-user value that would be created by the selected approach.

Suitability Review of Existing Concepts and Methods (D)

The process of associating concepts and techniques from the literature with model components (DI) is essentially an extension of the work performed in selecting the realization mechanisms. The realization mechanisms used in the QFD were extracted from the full collection of mechanisms that were cited in the literature review in a systematic but somewhat generalized manner.

FIG. 23 summarizes the applicability of major functional elements to the major architectural components of the infrastructure. In reviewing this functional class applicability matrix, two points are worth noting. First is the fact that communication links have been given first class status in the infrastructure along with workstations, servers, and participating switches. The second point is that most of the functional classes apply to each of the three computing/switching elements: workstations, servers, and participating switches. This last point is not particularly surprising since these components are part of a peer-oriented infrastructure.

Since there is so much overlap in the functional classes across the components, the analysis of realization mechanisms will be carried out in terms of these functional classes and the linkage to the architectural components can then be made via the entries in FIG. 23. This approach is considered adequate given, that at this level of investigation, the fact that although the functional class implementation within each of the architectural components may be somewhat different, the need or usefulness of a realization mechanism is likely to be equally significant for each of the architectural components for which the functional class is applicable. FIGS. 24A–24D show the impact of realization mechanisms on the functional classes.

Taken together, FIGS. 23 and 24A–24D can help ensure adequate consideration of the relationships between realization mechanisms, classes of functionality, and architectural components. Considering such relationships, as well as the web of interaction that they can promote, provides a good vantage point from which to consider the potential implications of choices that need to be made as the characteristics of the architectural design approach are established.

The process of identifying the potential usefulness or impact of the various potential realization mechanisms is a good time to again review the use of realization mechanisms in order to identify incompatibilities among concepts and techniques (D2). The first iteration of this task was accomplished with the preparation of the QFD during the process of determining correlation indicators for the realization mechanisms. At this early stage, the evaluations regarding correlation are made without the benefit of the functional impact, or interaction matrix, which provides a more specific context within which to consider possible incompatibilities between realization mechanisms. At the current stage, therefore, one condition that should be looked for is whether any of the negative correlations found in preparing the QFD diagram are in error. That is, if current functional impact assessment indicates that that intended use does not necessarily force two or more realization mechanisms to be mutually exclusive within the context of the global architecture. Such a condition may occur because the realization mechanisms' relationships to the functional classifications are such that their potential for conflict has been effectively removed by the fact that their use is proposed in functional areas that are unrelated or at least don't conflict.

A hypothetical example might be if the Cells-In-Frame and Hybrid Deposit Model protocols had initially been marked as having a negative correlation and an evaluation was made that they would probably need to be mutually exclusive choices within the design space. Initially, this assessment may have been made because the Hybrid model required state knowledge of the sender and receiver whereas the Cells-In-Frame did not. In the second review, associated with analyzing the impact of realization mechanisms on functional classes, the different impact assessment for the two protocols, regarding the stream processing function, may have prompted the realization that the Cells-In-Frame protocol could encapsulate the Hybrid Deposit Model protocol. Such a realization would mean that use of the two protocols need not be considered as mutually exclusive. The consideration of the two protocols arose for different reasons (i.e., reduction of latency versus delivery across non-ATM network domains) and the possibility for protocol encapsulation was recognized at an early stage; therefore, these realization mechanisms were not identified as having a negative correlation. Had this not been the case, however, this review within the context of functions may very well have corrected an initial assessment that was incorrect.

An alternative condition that should be looked for is the emergence of a previously unseen potential for conflict, such as between "Dynamic Adaptive Link-Level Scheduling" and "Multicast" as they relate to the functional class of "Non-Participating Device Accommodation."

The issue in this case, as well as in the previous case, is that the added contextual information provides a checkpoint in the development of the architecture to challenge early evaluations regarding the ability of the realization mechanisms to coexist.

Within the framework of this investigation, the assessment remains as it was at the QFD stage. That is there is no conflict among the realization mechanisms that would preclude the use of any of the other identified mechanisms. Again, this finding may be related to the process of selecting ft realization mechanisms from a population initially gathered as the result of a structured literature search as was mentioned previously.

Selection of Solution Approach (E)

The relaxation of the QFD spreadsheet requirement that functional mechanisms must be mutually exclusive introduces the need to establish a general constraint analysis framework (E1) in order to have an alternative realization mechanism selection framework that is compatible with the notion that mechanisms need not be mutually exclusive and can, therefore, be used in conjunction with one another. The starting point for establishing such a constraint framework is the notion that each choice of a realization mechanism, to be added to the architecture, has a non-uniform impact on the development of functionality required by the system. That is, as each new realization mechanism is added as an element of the emerging system architecture, different areas of functionality receive the benefit from the use of the selected mechanism and all functional areas are subjected to the possible introduction of additional constraints imposed as the result of utilizing the mechanism that has just been included. Such added constraints may limit the subsequent selection of other remaining realization mechanisms or necessitate that their use be limited or modified in some way. This basic notion, of incrementally added technical value introducing additional incremental constraints on subsequent choices, is a core concept in the constraint analysis framework that was developed to help manage the problem of making choices from a domain of realization mechanisms that was not constrained by the mutually exclusive characteristic.

Figure 25:
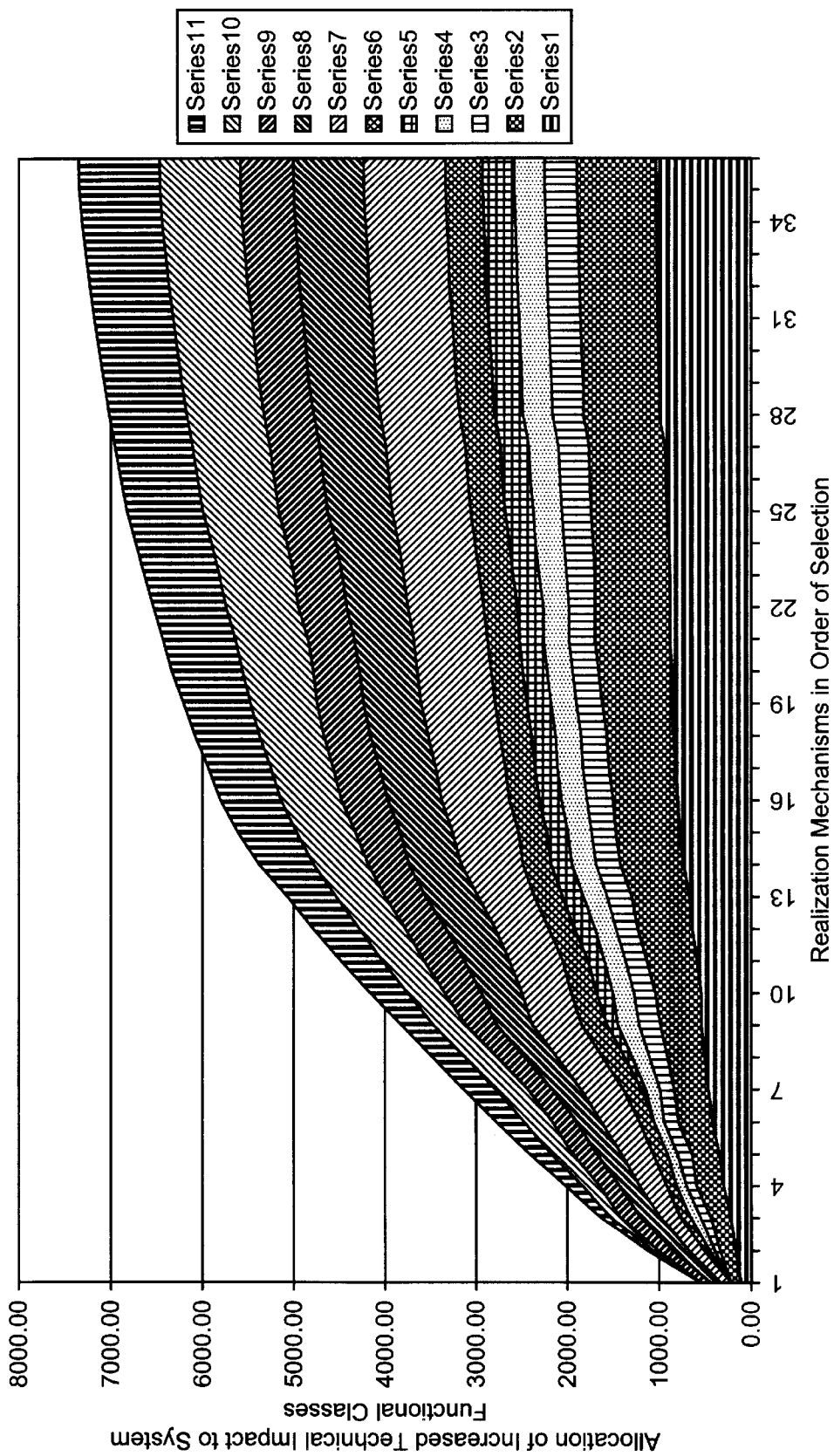
Figure 29A:
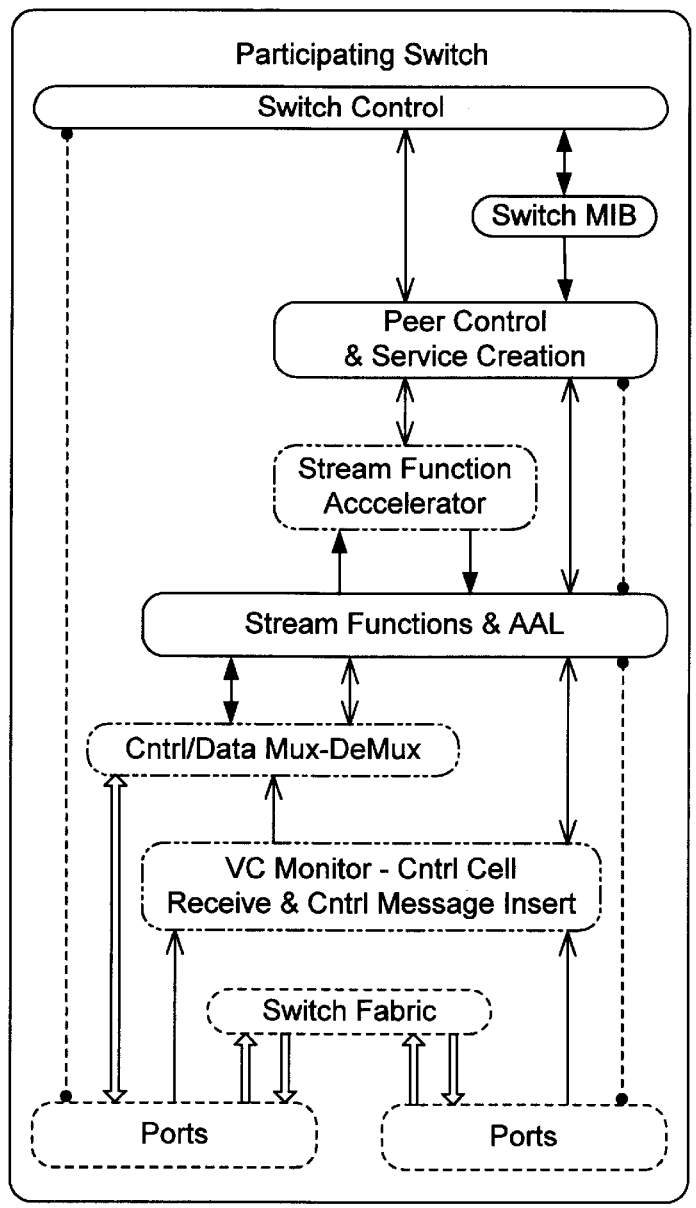
FIGS. 29A–29D are a deployment model for the peer-oriented infrastructure of an embodiment of the present invention.
Figure 29B:
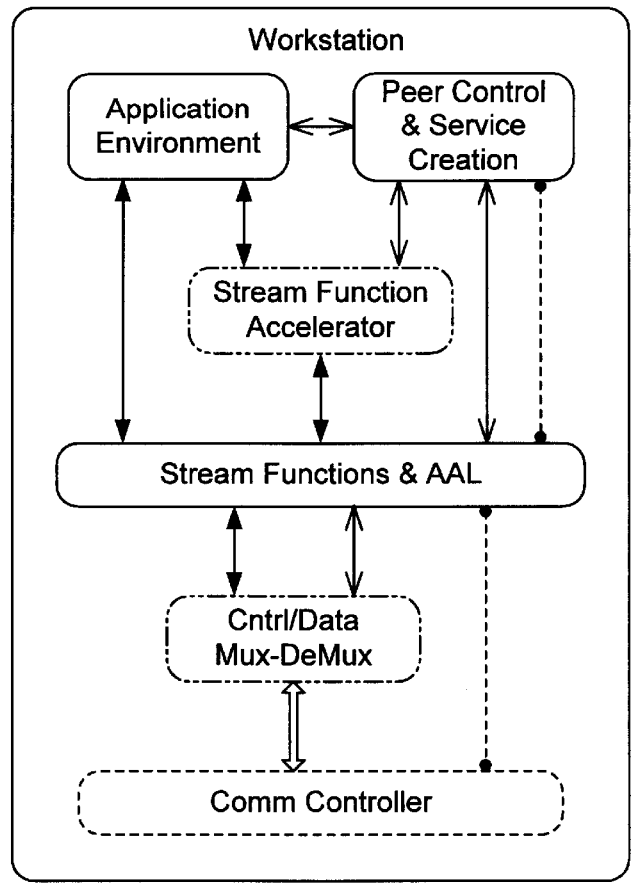
Figure 29C:
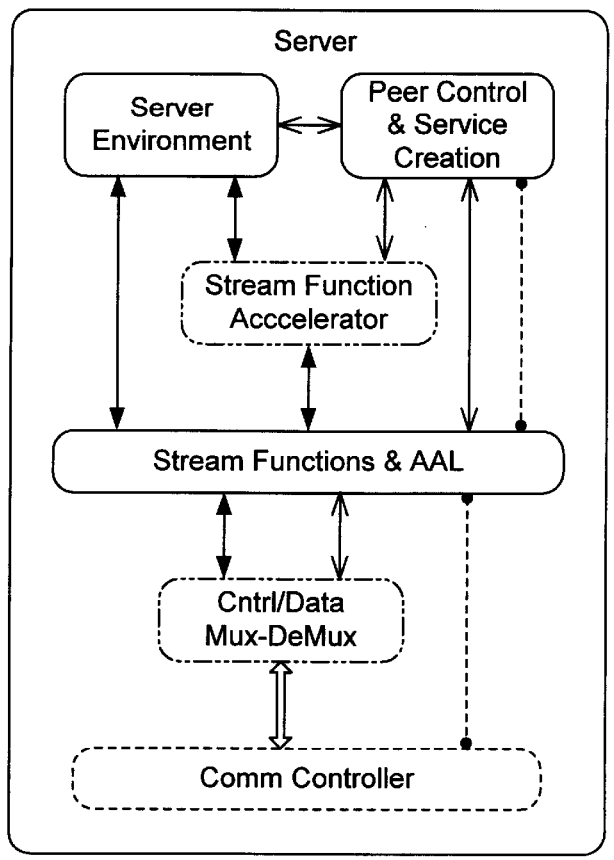
Figure 29D:
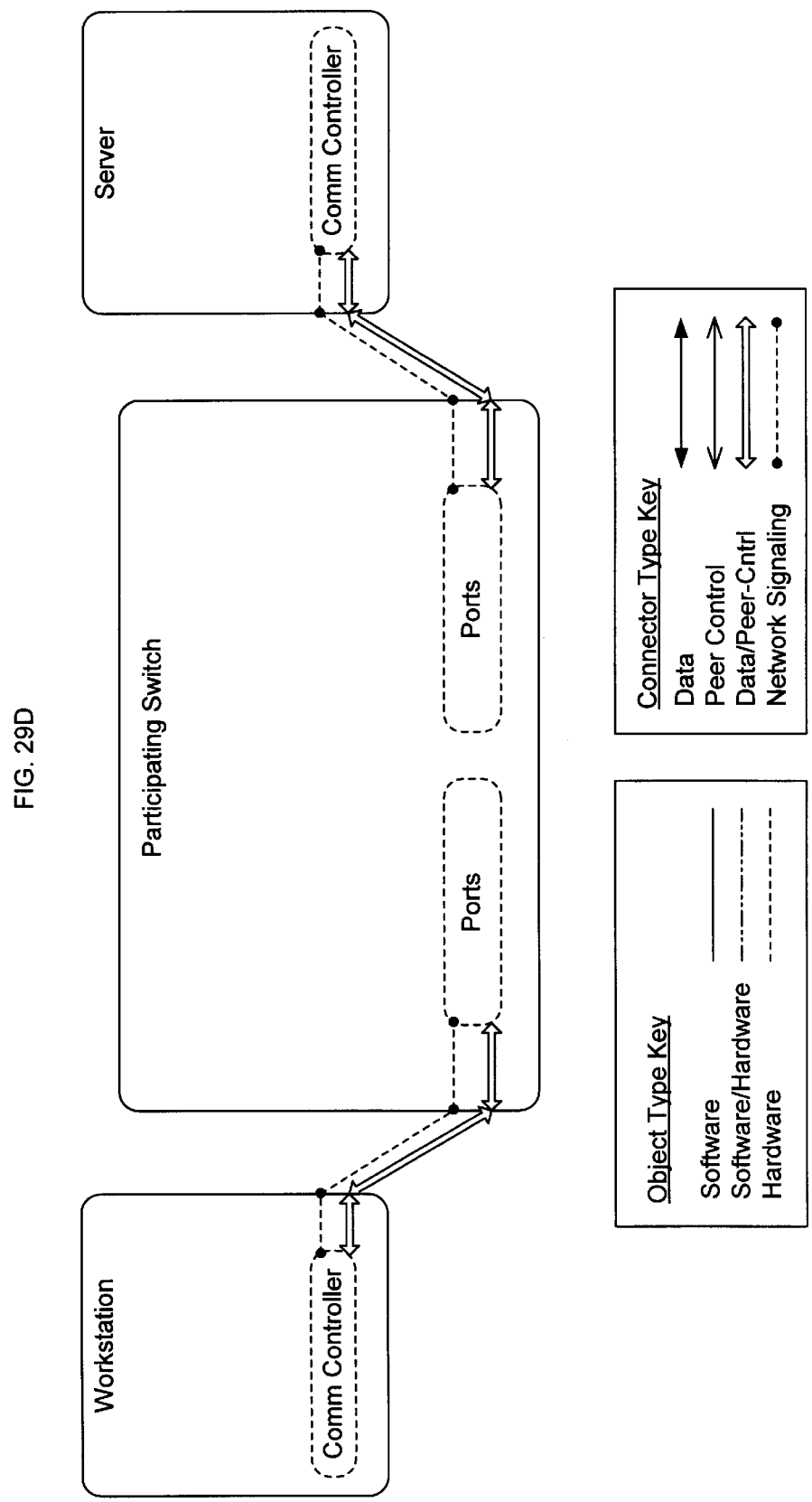

FIG. 25, and its associated supporting data of FIGS. 26A–26E, illustrates the buildup of cumulative technical impact associated with the successive selection of available realization mechanisms. FIG. 27, and its associated supporting data of FIGS. 28A–28E, illustrates the successive redistribution of technical impact among the function system areas as each successive choice of realization mechanisms is added to the emerging architectural framework. The data tables FIGS. 26A–26E and 28A–28E, which support the graphs are a summarization of the results of the constraint framework evaluation after each of the 36 realization mechanisms was chosen.

The constraint framework was built by using the map of realization mechanism's impact on functional classes, presented in FIGS. 24A–24D, as a pattern to reallocate the technical impact of a realization mechanism, established in the QFD diagram (FIGS. 18A–18H) to the functional areas or classes of the system. This was accomplished by evaluating each realization mechanism individually and then summing the results by functional area.

The reallocation was accomplished by using a binary impact mask that was created by translating the associated impact analysis (from FIGS. 24A–24D) and assigning a "1" if there was an indicated impact and a "0" if there was no indicated impact. The number of 1's in the mask was determined and used to divide the technical impact value (obtained from the QFD analysis) for the realization mechanism being evaluated to determine a function class weighting. The fact that the number of 1's in the impact mask was used to divide the technical impact value of the realization mechanism ensures that the full technical value of the mechanism will be reflected in the process of mapping to functional areas. Finally, there is a binary selected mask that is set to "1" if the selection ranking is greater than "0" (i.e., the realization mechanism has been selected for inclusion in the architecture); otherwise, it is set to "0". The function of this "selected" mask is to prevent the realization impact from being included in the combined result if the mechanism has not yet been selected.

The output of this analysis is useful in helping to identify and analyze the impact of design questions ion the functional partitioning (E2) of the system. Beyond observing the result of the process of technical impact accumulation across the functional areas and the relative realignment of significance between functional areas, examination of the clustering of functional areas within the final rankings is useful. Based on the data that appears in the final column of FIG. 26E, the relative ranking of functional areas is:

| | |
|---|---|
| Peer Control | 1028.91 |
| Protocols | 898.70 |
| Local Domain Services | 882.52 |
| Inter-Domain Services | 882.52 |
| Local Device Control | 861.05 |
| Gateway | 771.38 |
| Non-Participating Device | 582.84 |
| QoS Monitoring | 407.02 |
| Communications Controller | 355.70 |
| Service Creation | 348.25 |
| Stream Processing | 332.12 |

In reviewing this ranking, the observation may be made that the elements at the top of the list are more indicative of prominent architectural features of the system whereas those nearer the bottom are more indicative of architectural artifacts (i.e., features that are architecturally significant but which are not as useful in characterizing the main theme(s)

of the architecture). The review of the rankings also provides an opportunity to challenge the reasonableness of the functional classes that emerge to characterize the architecture and to decide if a repartitioning of the functionality in the architectural domain might be in order. Such review is important because, in progressing towards an initial design approach, first consideration would generally be given to those areas which characterize the architecture. This preference would, therefore, cause the remaining areas of functionality to be utilized in a manner which accommodated the constraints introduced by the mechanisms selected to support the functionality which most defines the character of the system.

Another mode of review that may be performed with the benefit of this constraint framework is the search for redundant or marginally effective realization mechanisms. In the proposed system being investigated, there were no conflicts which would cause mutual exclusion of other identified realization mechanisms. In the analysis so far, since all of the realization mechanisms could be used, all were scheduled for inclusion in the architecture.

The observation that various mechanisms can be used together without introducing conflict does not necessarily mean that they should be used together. Each additional realization mechanism that is introduced into an architecture will cause an additional cost in terms of implementation effort, testing, and ongoing system maintenance after the system. is initially developed. It is useful, therefore, if redundant or marginally effective realization mechanisms can be identified and removed early in the development of the architecture rather than wait until the design phase to make such determinations. The emerging pattern of technical impact within function areas provides an indicator of areas and realization mechanisms which should be critically reviewed for possible redundancy or marginal functional contribution.

During the analysis performed using the constraint framework, a review was conducted in order to determine if such redundant or marginal realization mechanisms had been included. Identification of such mechanisms would necessitate a procedure to revise the QFD and QDS as required to reflect any refinements to the design approach (E3). In the review process, four review items were observed. These review items along with the associated realization mechanisms are:

Possible Redundancy
Layers of Activity (Behavior, Local, Coop Plan)
Roles for Agents Spanning Expectations
Distributed Planning Among Multiple Agents
Distributed Intelligent & Adaptive Agents
Possible Redundancy
QoS Establishment at Call Setup
Joint Receiver QoS Signaling and Call Setup QoS
Possible Redundancy
Open Distributed Processing
InterLanguage Unification System
Possible Marginal Effectiveness
Hybrid Deposit Model The realization mechanisms associated with the first review item all deal with the notion of agent based software. Each of these four realization mechanisms, however, emphasized different aspects that do not have to occur together in the same architecture. Since by definition this architecture is to be peer-oriented, it is likely that the concept and design requirements of agent based technology are likely to play a very prominent role in the emerging architecture Therefore, these realization mechanisms will be considered as non-redundant at this stage and will be left intact.

The realization mechanisms associated with the second review item appear to be redundant because the second one seems to include the first. Since a starting assumption of this investigation was that ATM was going to be used as the core networking technology, for all of the reasons noted in the introduction to this to search, the realization mechanism dealing with QoS establishment at call setup is essential since this is the mechanism by which ATM networks accept requests for QoS. The second realization mechanism, however, is associated with the mapping of receiver oriented signaling (i.e., such as that used by RSVP) of QoS requests onto the ATM QoS mechanism. These two mechanisms are, therefore, truly different and will remain as independent realization mechanisms.

The realization mechanisms associated with the third review item are similar but definitely not the same. While in some senses they may be considered as alternatives, there is nothing preventing their coexistence. Therefore, while these may be the best candidates for elimination because of redundancy of intent, they will be left in place for later consideration. The point being that at this early stage it is not sufficiently clear which might offer the best alternative and so this decision will properly be postponed until later stages of investigation.

The fourth and final review item considers the possibility that the Hybrid Deposit Model protocol might be of marginal usefulness. Part of the reason for selecting this mechanism for review was its relatively low technical importance rating and relatively high organizational difficulty rating (see FIGS. 19). Reviewing the structure and associated implementation framework used by this protocol, however, there is more than sufficient justification for tentatively retaining this realization mechanism at least until much later in the design phase.

Having reviewed the items that were candidates for early exclusion and found that none should be excluded at this stage of the investigation, it is appropriate to select an initial design approach and review the major elements (E4) that it contains. FIGS. 29A–29D show a deployment model for the proposed new peer-oriented infrastructure. While not identical to the infrastructure, which has a high software functional content not reflected on this diagram, it does contain the distinguishable physical elements that have been added in support of desired infrastructure capabilities. Therefore, it provides a good organizational structure around which to discuss the more comprehensive, and sometimes more abstract, infrastructure platform as a whole.

The deployment model is organized around the four primary physical architectural components identified in FIG. 23 workstation, server, participating switch, and communication links. In reviewing this diagram, there are several feature areas that merit special comment due to their role in supporting the proposed peer-oriented control and service creation infrastructure. For purposes of discussion, these features are identified on the diagram presented in FIGS. 29A–29D and labeled in order to facilitate discussion.

Orthogonal Control represented by the bi-directional "Peer Control" arrow between either the "Application Environment" or "Server Environment" and the "Peer Control & Service Creation" functional elements depending on whether it is a workstation or server that is being discussed.

B1) "Peer Control & Service Creation" (workstation/server)—functional element residing in both the workstation and server components that handles peer control issues.

B2) "Peer Control & Service Creation" (participating switch)—functional element residing in a participating switch that handles peer control issues.

C) "Stream Functions & AAL" and "Stream Function Accelerator"—these two functional elements are treated as a functional package and reside in all three device components: workstation, server, and participating switch. The reason for this is that the "Stream Function Accelerator" is an optional element which, when removed, causes the stream functions to be fully processed by the "Stream Functions & AAL" element. The "Stream Functions & AAL" element is responsible for service and peer-control related stream transformations (in conjunction with the "Stream Function Accelerator" when present) and the performance of the ATM Adaptation Layer functions as they relate to the information stream content and peer-control messages. These processing tasks may be implemented as stand-alone (i.e., a full ATM protocol stack implementation) or as an augmented capability of a full ATM protocol stack.

D) "Cntrl/Data Mux-DeMux" this functional element is responsible for the multiplexing and demultiplexing of data and peer-control ATM cells into or from a single virtual circuit. This functionality exists within each of the three device components: workstation, server, and participating switch.

E) "VC Monitor—Cntrl Cell Receive & Cntrl Message Insert"—this functionality exists only for participating switching (or routing) devices. This functionality implements passive listening and active peer-control message insertion. with respect to virtual circuits carrying combined Data/Peer-Control content. This pass-through type processing of control messages is only required of intervening network devices (i.e., participating switches and routers) which are implicitly involved in' support of the communication service (see table 23—Self-Organizing Peer Collaboration Control Architecture Pattern). Workstations and servers are explicitly collaborating peers and need to be able to process and respond to the combined stream of data/peer-control information in the virtual circuit but they do not have to pass it on (via switching or routing) to other intervening network devices or ultimate end devices which support collaborating peers. Finally, the diagrammed relationship between the "VC Monitor Cntrl Cell Receive & Cntrl Message Insert" and the "Ports", "Cntrl/Data MuxDeMux" may change depending upon implementation (see footnote I table 3 Participating Switch N-Square Chart).

F) "Comm Controller"—this functionality represents the physical network connection for the workstation and server.

G) "Ports" and "Switch Fabric"—this functionality represents the physical network connection and switching functionality of the participating switch.

H) Connectors—in the diagram there are four types of connectors shown: Data, Peer Control, Data/Peer-Cntrl, and Network Signaling. There would be additional variations on the Data/Peer-Cntrl type of connection when non-ATM transmission facilities are used as part of the infrastructure.

In reviewing the initial design approach, it is useful to highlight some of the issue areas that exist in the problem and implementation space domains and, therefore, should be addressed by the architectural model as it evolves within the defined solution space domain. The majority of these issue areas have to do with the delivery of QoS in light of the character and predominant telecommunications and data networking structures that exist within the existing global communications infrastructure. One of the most comprehensive and pragmatic treatments of this topical area comes from a book titled "Quality of Service" by Ferguson and Huston (1998). This is a new title that became available after the literature review for this research had been completed. Although the work has a decided Internet oriented perspective (both authors are active members of the Internet Engineering Task Force), it does introduce the major issues associated with delivering QoS and specifically identifies the issues associated with the use of link-level transport (of which ATM is an example). QoS mechanisms when used with higher-level transport protocols such as TCP/IP.

The topical area covered is broad and the issues too numerous for anything more than a high-level characterization within the scope of this work. To set the framework for a discussion of this topic, and its relevance to the proposed architecture, it is useful to begin with the following quote:

> What is possible in the realm of QoS can be considered as a set of compromises, some of which are economic and some technical. All, however, are related in the larger scheme of things . . . bandwidth on a global scale is not as cheap or readily available as we would like. This presents a delicate balance among network engineering, network architectural design, and scales of economy, some of which are still not well understood in the telecommunications industry. The brokering of transcontinental bandwidth is a complex and convoluted game. The players are global telecommunications industry giants who have been playing the game without consideration of the traffic content, whether-it be voice or data, but only within the realm of capacity . . . The industry geared itself to an artificial constraint of supply to ensure stability of pricing, which in turn was intended to ensure that the return on investment remained high . . . Now that recent data demands are changing the demand model of capacity requirement, the balances are changing. Historically, well understood forward capacity plans are being scrapped as the data networks ravenously chew through all available inventory. (Ferguson and Huston 1998)

If indeed the economic roots of the current situation regarding QoS are present within this assessment of historical industry evolution, there remains the need to consider the influence of technical considerations and, more specifically, the impact of philosophical differences regarding technical architecture that have traditionally been held by the telecommunication and data networking communities. Some key aspects regarding the distinct perspectives can be seen in the following comments by Ferguson and Huston (1998) regarding IP (data networking view) and ATM (telecommunications view) design:

> The prevailing fundamental design philosophy for the Internet is to offer coherent end-to-end data delivery services that are not reliant on any particular transport technology and indeed can function across a path that uses a diverse collection of transport technologies. To achieve this functionality, the basic TCP/IP signaling mechanism uses two very basic parameters for end-to-end characterization: a dynamic estimate of end-to-end Round Trip Time (RTT) and packet loss. If the network exhibits a behavior in which congestion occurs within a window of the RTT, the end-to-end signaling can accurately detect and adjust to the dynamic behavior of the network.

ATM, like many other data-link layer transport technologies, uses a far richer set of signaling mechanisms. The intention here is to support a wider set of data-transport applications, including a wide variety of real-time applications and traditional non-real-time applications. This richer signaling capability is available because of the homogeneous nature of the ATM network, and the signaling capability can be used to support a wide variety of traffic-shaping profiles that are available in ATM switches. However, this richer signaling environment, together with the use of a profile adapted toward real-time traffic with very low jitter tolerance, can create a somewhat different congestion paradigm.

The authors continue on to describe the issues involved with reconciling these views and associated design approaches. The more prominent point of divergence between these two positions is whether the network infrastructure should be homogeneous or heterogeneous in nature. The data networking position (from which the Internet and TCP/IP emerged) obviously favors the heterogeneous environment and is willing to sacrifice some level of control in order to achieve satisfactory operation over such environments. The telecommunications perspective (from which ATM had its origins) prefers the additional control and greater ability to provide predictive, proactive, and real-time services, such as dynamic network resource allocation, resource guarantees, virtual circuit routing, and virtual circuit path. establishment to accommodate subscriber QoS requests and, to achieve this, they are willing to require support for a complex homogeneous control structure at the link level.

Each of these positions has its merits as well as its place in the current global networking infrastructure. FIGS. 30A–30B present some of the issues identified by Ferguson and Huston (1998) that currently exist in reconciling these different approaches along with the peer-control infrastructure's approach to reducing the impact of the identified issues.

Having completed this introduction to the initial architectural design approach for the peer-control and service creation infrastructure, it is useful to try and apply this architecture to an application area in order to more fully understand the implications and potential for the architecture that has been developed.

The architecture for the peer-oriented control and service creation infrastructure, developed herein, exhibits the following six architectural design attributes, among others,:

1) Provides an alternative, end-user oriented, network control paradigm that can coexist with existing network control structures and which can offer an implementation mechanism for operationalizing the notion of first-class communication links as components of distributed applications.

2) Provides an architectural filter, through the application of peer-control, that can span participating domains and non-invasively bridge non-participating ATM domains in order to deliver a stable and consistent set of network services from the large, complex, and at times inconsistent set of functions offered by ATM.

3) Introduces a new level of dynamic network control behavior, available to and in support of applications, that persists throughout the duration of a call session as opposed to exhibiting dynamic behavior capabilities only through the call setup stage of a session.

4) Introduces an agent-based virtual network control paradigm, through the notion of local domain services and inter-domain services, that is peer-oriented and -capable of interacting with actual network control structures of domains currently aggregated within the framework of the peer-control and service creation infrastructure.

5) Provides for carrier independent service creation across multiple domains through peer-controlled interpretation of the use of raw QoS qualifying bandwidth.

6) Provides for smarter network behavior based upon active agents interacting with network device controls based upon knowledge of the traffic that is passing through the device and the services which that traffic supports. Also provides the ability to arbitrate between traffic utilizing the peer control mechanism.

In creating the architecture and supporting the design attributes mentioned above, several novel structural elements were devised within the peer-oriented control and service creation infrastructure. These novel structural elements include:

1) Self-organizing Peer Collaboration Control Pattern
2) First-class treatment of communication links as part of the application
3) Use of orthogonal control to implement first-class communication links
4) Component-based communication services implemented as templates
5) In-stream application and peer-control signaling along with data-content
6) Peer-creation of services through mutually agreed interpretation of QoS bandwidth
7) Dynamically updateable services under peer control
8) Bridging of non-participating ATM domains with peer-control and surrogate agents
9) Per domain use of agents for resource accounting, billing and revenue proration
10) Smart intervention of agents with extended context awareness to influence devices
11) Use of in-stream processors and accelerator to provide enhanced services
12) Use of distributed state within peer-control agents to maintain network control Other structural elements that are noteworthy include:

1) Use of autonomous active agents
2) Accommodation of non-ATM based edge networks
3) Accommodation of non-participating devices The peer-oriented control and service creation infrastructure allows end-users to create (thereby making service consistent) their own services (which, it is maintained, have more characteristics than just bandwidth and quality of service) from raw bandwidth delivered with a guaranteed quality of service. Recent work regarding the use of ATM over various transmission mediums (i.e., satellite, wireless, XDSL type technologies, and Cable Modems) as well as the potential for running multiple protocols (particularly IP) is well documented in many sources, one of which is Handel, Huber, and Schroder (1998). This capability provides a number of paths by which, at least from a technical perspective, the level of uniform availability can be very substantially increased. The ability to address issues of consistency and uniform availability offered by the peer-oriented control and service creation infrastructure is sufficient to alter the value creation chain (i.e., the amount of total end value attributed to each intermediate factor of production) for telecommunications services in the following manner for the following reasons.

The manner by which the value creation chain is altered is that, by allowing end-users to create their own services, the raw bandwidth, even with its QoS attributes, becomes a commodity available from multiple sources. The value added from business operations based differentiators has been removed from the transmission business and placed in a services business which need not include its own physical transmission plant. Therefore, although the ultimate level of scalability and ability to be generalized for all potential users (i.e. ultimately there must be physical networks along with operators of those networks) is not known, the fact that an alternative exists for some population of end-users will create pressure for the expansion of the alternative to the extent that those with the capability will be able to adapt more quickly and compete more effectively. It is this potential for the ultimate end-user to adapt more quickly, with increased range for diversity of response, that should increase their ability to compete more effectively, thereby causing other end-users to seek access to the capability for their own organizations. This competitive advantage rationale is seen as a prime factor in increasing the influence of the new paradigm and thus the pressure for change.

Figure 31A:
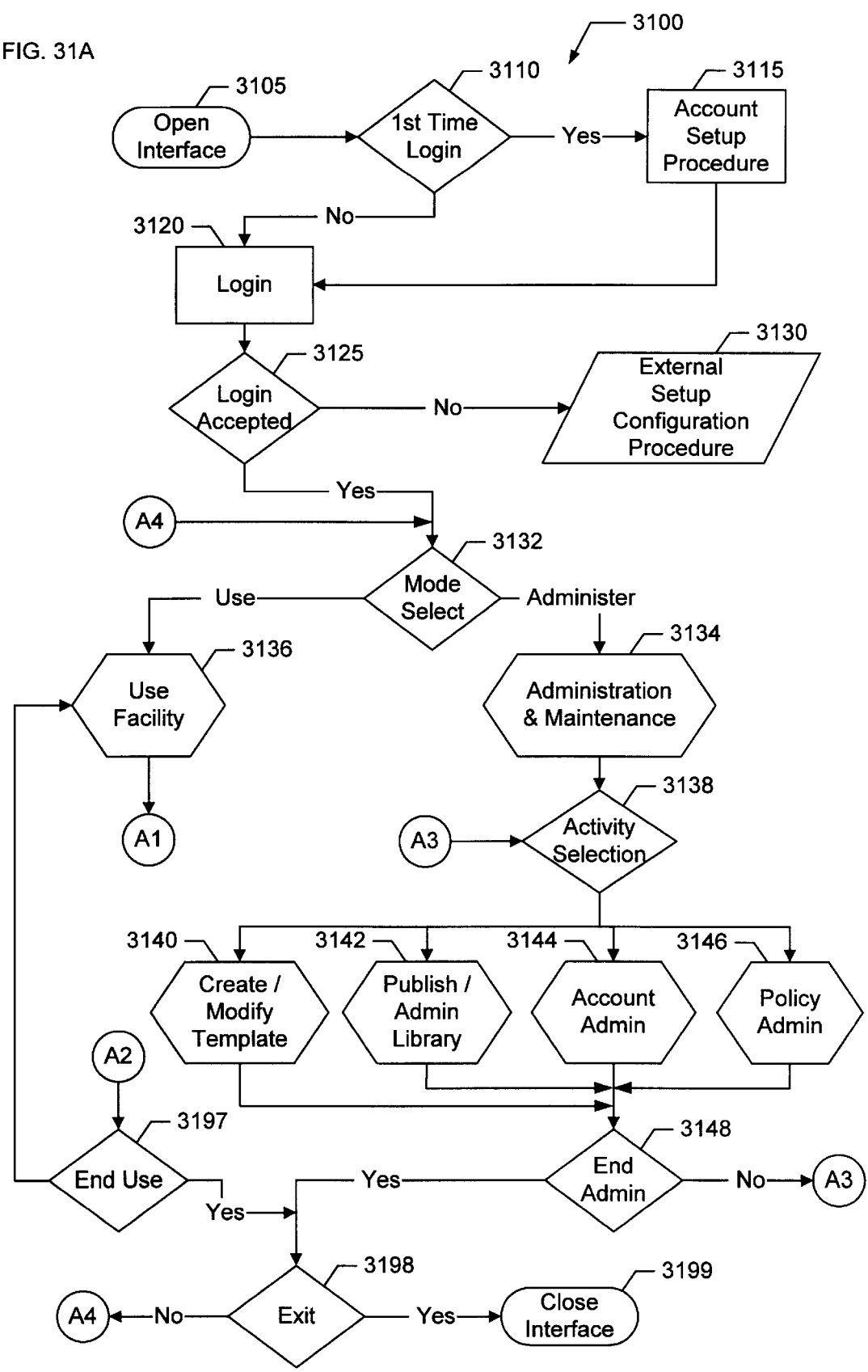
FIGS. 31A–31C are flowcharts illustrating the user interaction with a user interface to set up a telecommunications service in accordance with an embodiment of the present invention.
Figure 31B:
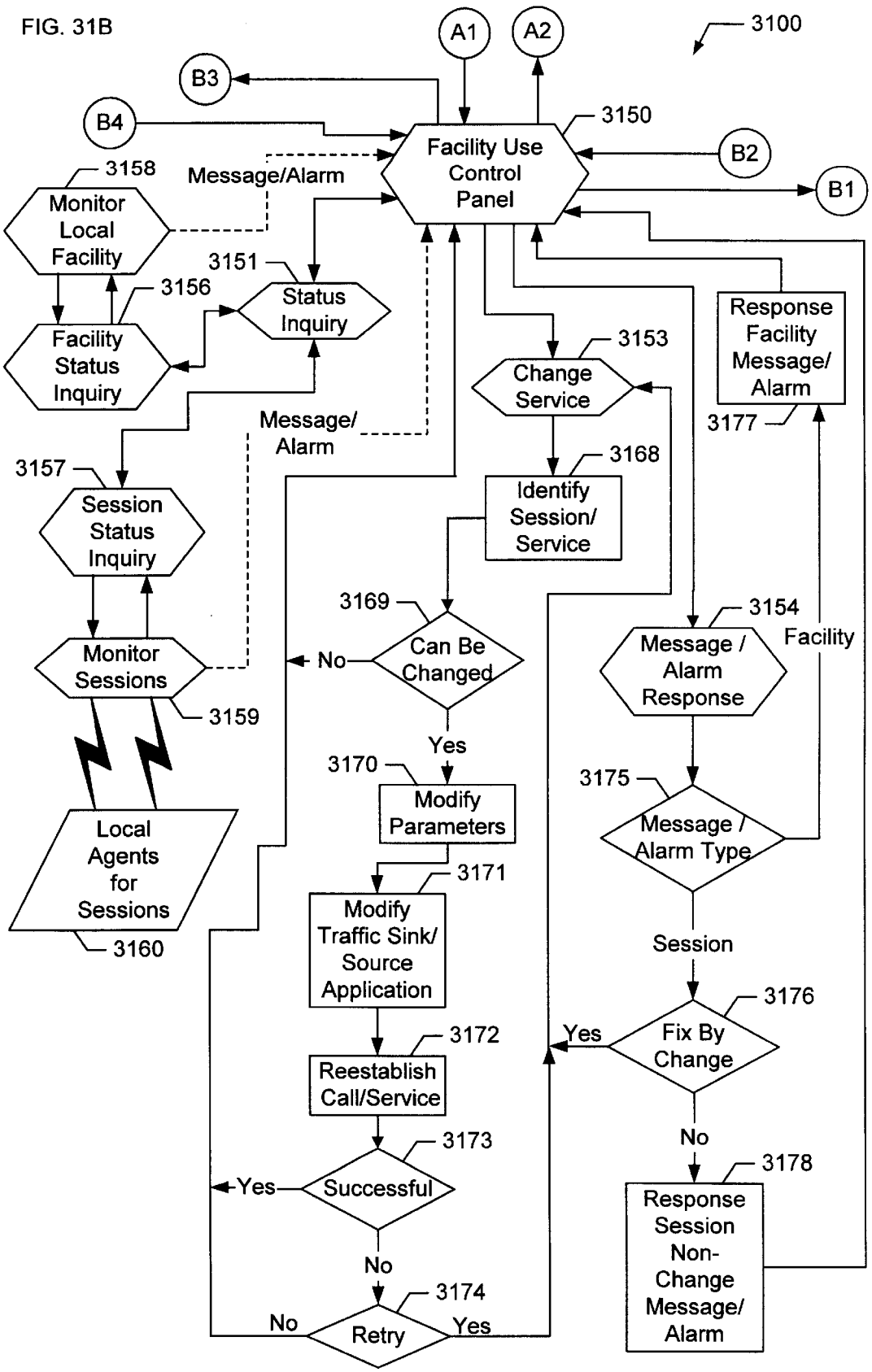
Figure 31C:
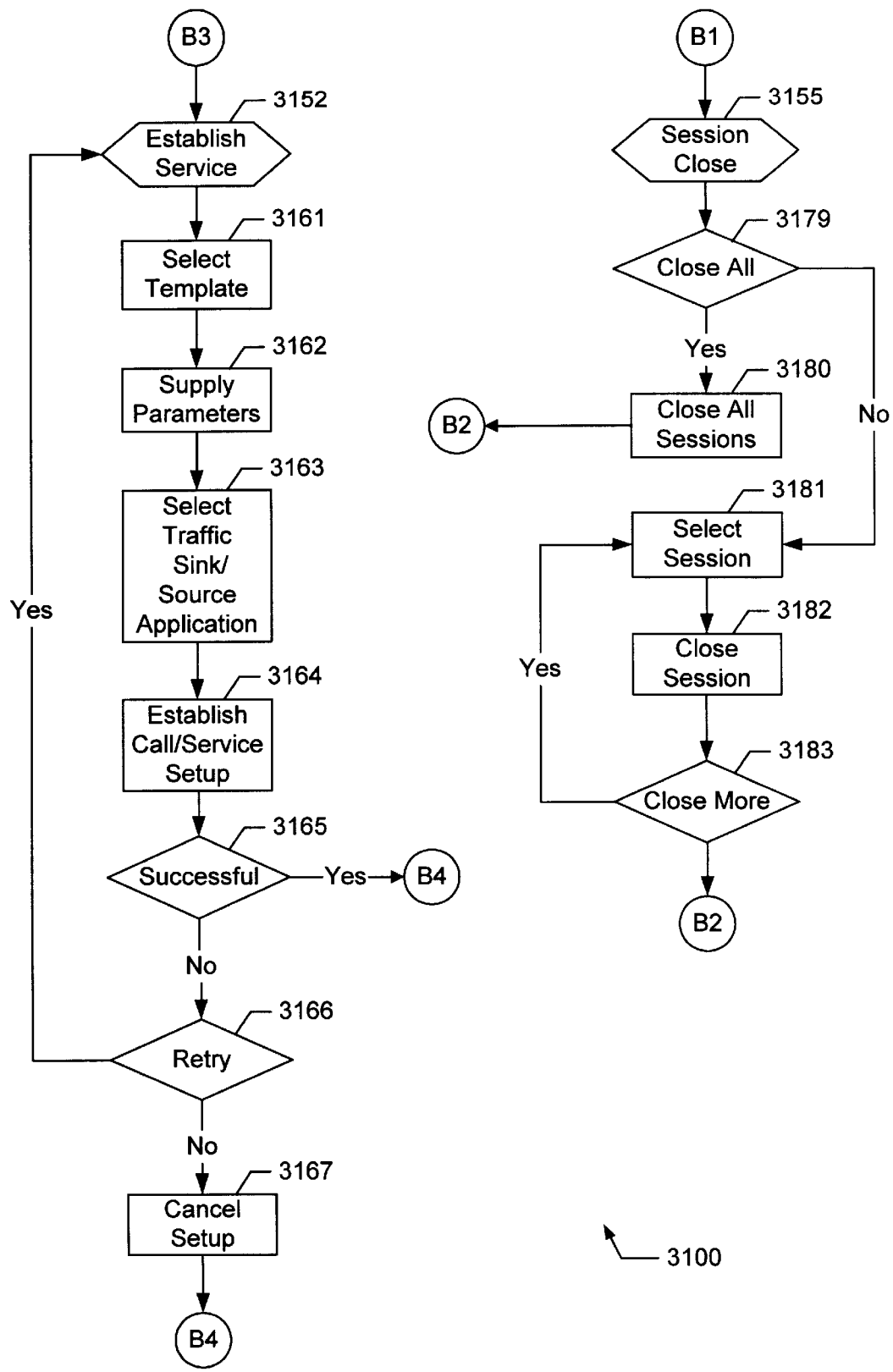

Referring now to FIGS. 31A–31C, flowcharts illustrating the user interaction with a user interface to set up a telecommunications service in accordance with an embodiment of the present invention will be described. The method 3100 begins at step 3105 when the user opens up the interface to set up a telecommunications service. The method 3100 then proceeds to decision step 3110.

At decision step 3110, it is determined whether the user is a first time user. If so, then the method proceeds to step 3115 where an account set-up procedure is performed. The method then proceeds to step 3120 where the user logs into the service. The method 3100 then proceeds to decision step 3125.

At decision step 3125, it is determined whether the login of the user was accepted. If not, then the method proceeds to an external setup configuration procedure at step 3130. If the login was accepted, then the method proceeds to decision step 3132.

At decision step 3132, it is determined whether the user has selected administration or use mode. If the user has selected administration mode, then the method proceeds to step 3134. However, if the user has selected use mode, then the method proceeds to step 3136.

While in administration mode, the method proceeds to decision step 3138 where it is determined which administrative function the user wants to perform. Typically, the user may perform the functions of create/modify service template 3140, publish/administer library 3142, account administration 3144, and policy administration 3146.

The create/modify service template 3140 is where a user would select elementary service elements and aggregate them into a service; select an existing service and modify its attributes; or select existing services and aggregate them into a compound service. Utilizing the Java beans component implementation approach, this area would be similar in concept and structure to the "Bean Box" which allows users to "wire" together existing components to form applications.

The publish/administer library 3142 is the administrative area that will control the activity of making a template generally available for use within the infrastructure. Through the orthogonal control mechanism, the interpretation of service templates may have significant financial and network operation impacts. It is likely that building and modifying of service templates will be a feature with restricted access so that only properly configured and tested service templates will be available to the general user community.

The account administration function 3144 would support the various administrative functions dealing with account setup, use, billing inquiry, etc. This function may have a general user and a restricted mode which would protect supervisory level functions.

The policy administration function 3146 defines and maintains the organizational policy regarding the use of the peer infrastructure. Such policies might include such restrictions as the calling area (local, regional, national, international) that a certain workstation or group of workstations might be able to access and create a service for.

After the functions 3140–3146 have been performed, then the method proceeds to decision step 3148. At decision step 3148, it is determined whether the user has completed administration and maintenance. If not, then the method returns to decision step 3138. However, if the user has completed administration and maintenance, then the method proceeds to decision step 3198.

At decision step 3198, it is determined whether the user is ready to exit the program. If not, then the method returns to decision step 3132. If the user is ready to exit, then the program exits and the user interface is closed at step 3199.

Returning to step 3136, when the user has selected use mode, the method proceeds to step 3150 where the user is presented with a facility use control panel, which will be described in reference to FIG. 31B. From the facility use control panel, the user may select the following actions: status inquiry 3151, establish service 3152, change service 3153, message/alarm response 3154, and session close 3155.

If the user selects status inquiry 3151, then the method proceeds to either a facility status inquiry 3156 or a session status inquiry 3157. If the method proceeds to a facility status inquiry 3156, then the local facilities of the network are monitored at step 3158 and an alarm or message is sent back to the facility use control panel indicating the status of the facility.

If the method proceeds to a session status inquiry 3157, then the current sessions being conducted by the user are monitored at step 3159 including the local agents throughout the network transmitting status and data at step 3160. An alarm or message is sent back to the facility use control panel 3150 indicating the status of the sessions.

If, from step 3150, the method proceeds to establish service 3152, then a service template is selected by the user at step 3161. The user may also be asked to supply some parameters for the service that are not supplied by the service template at step 3162. At step 3163, the user selects the traffic sink/source application. The traffic sink/source application is the application which is connected to the first class communication component created by the infrastructure. For example, the Microsoft NETMEETING application might be used as the sink/source for a conferencing service. At step 3164, call/service setup is established and the method proceeds to decision step 3165.

At decision step 3165, it is determined whether the call/service setup was successful. If so, then the method returns to the facility use control panel at step 3150. If the call/service setup was not successful, then the method proceeds to decision step 3166 where it is determined whether the user wants a retry conducted. If not, then setup is canceled at step 3167 and the method returns to the facility use control panel at step 3150. If the user wants a retry, then the method returns to step 3152.

If, from step 3150, the method proceeds to change service 3153, the selected session/services are identified at step 3168 and the method proceeds to decision step 3169. At decision step 3169, it is determined whether the identified session/services can be changed. If not, then the method returns to the facility use control panel at step 3150. However, if the identified session/service can be changed, then the parameters of the identified session/service are modified at step 3170. The traffic sink/source application of the identified session/service is modified at step 3171. The call/service is re-established at step 3172. At decision step 3173, it is determined whether the change in service was successful. If so, then the method returns to the facility use control panel at step 3150. If not, then the method proceeds to decision step 3174 where it is determined whether the user wants to retry the change in service.

If, from step 3150, the method proceeds to message/alarm response 3154, then at decision step 3175 it is determined what type of message/alarm was received. If it is a session message/alarm, then the method proceeds to decision step 3176. If it is a facility alarm type, then the method proceeds to step 3177 where the message/alarm is responded to and the method returns to the facility use control panel at step 3150.

At decision step 3176, it is determined whether the message/alarm condition can be alleviated by a change in service. If not, then the message/alarm is responded to at step 3178 and the method returns to the facility use control panel at step 3150. At step 3178, the logic activities to resolve the condition are performed, up to and including discontinuation of the service if there is no other way to recover.

If, from step 3150, the method proceeds to session close 3155, then at decision step 3179 it is determined whether to close all of the open sessions. If so, then all sessions are closed at step 3180 and the method returns to the facility use control panel at step 3150. If not, then the method proceeds to steps 3181–3183 where the sessions that the user wants to close are closed.

Figure 32A:
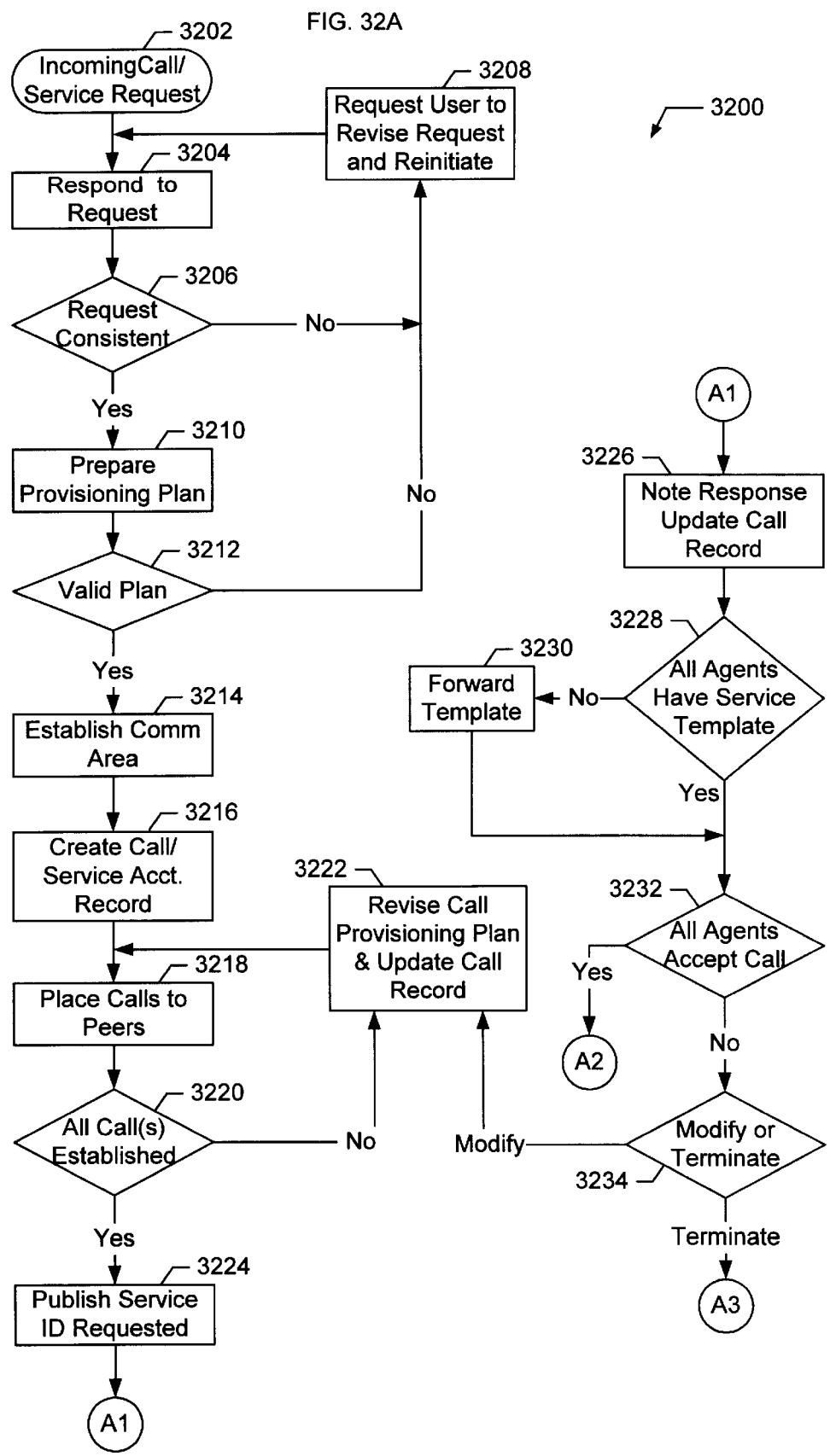
FIGS. 32A–32B are a flowchart for establishing a call between peer elements in accordance with an embodiment of the present invention.
Figure 32B:
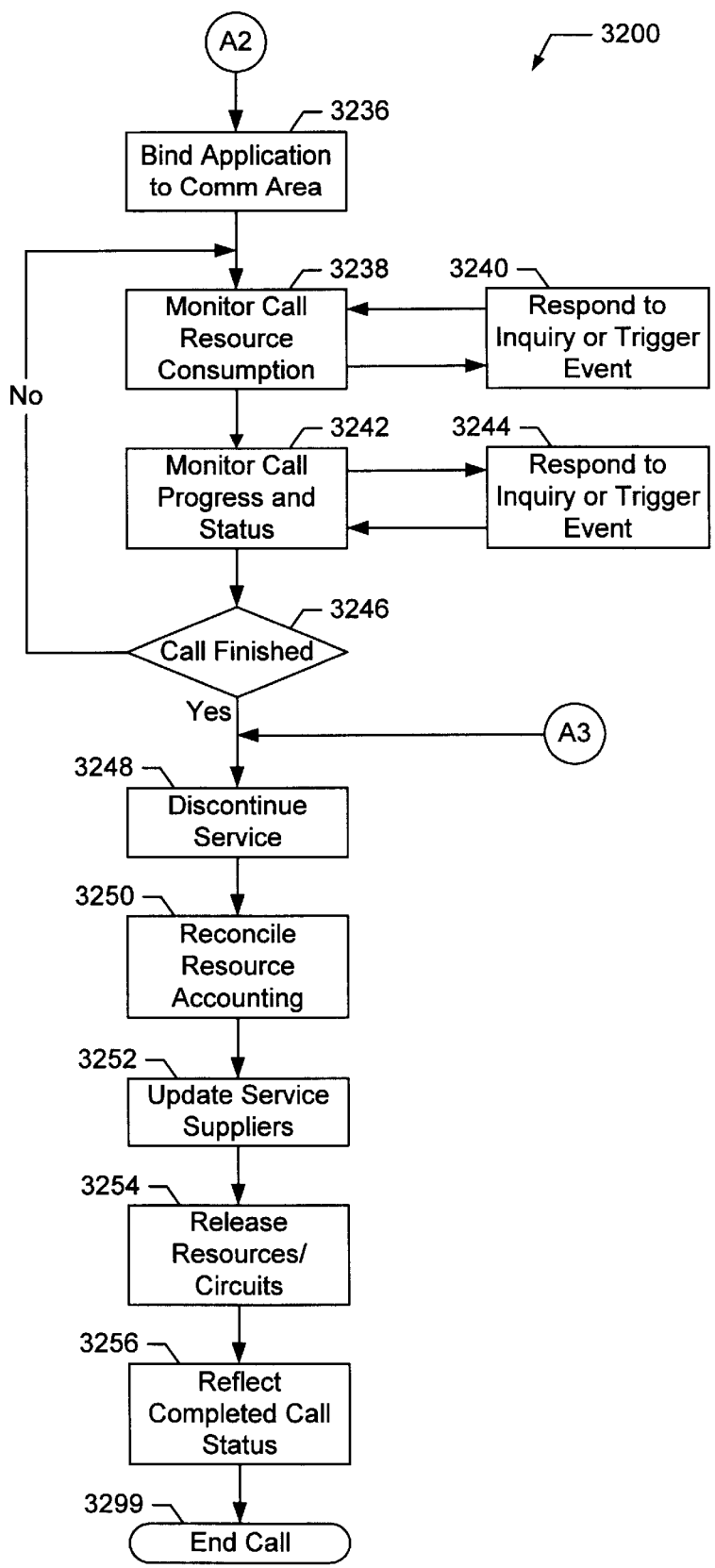

Referring now to FIGS. 32A–32B, a flowchart illustrating a method 3200 for establishing a call between two collaborating peer elements in accordance with an embodiment of the present invention will be described. The method 3200 begins with an incoming call/service request at step 3202. At step 3204, the response to the call/service request begins and proceeds to decision step 3206.

At decision step 3206, the consistency between the service template, the service template parameters, and the capabilities of the source/sink application that will be connected to the communications channel is verified. If the request is not consistent, then the method proceeds to step 3208 where the user is requested to revise the request and reinitiate. If, at decision step 3206, it is determined that the request is consistent, then the method proceeds to step 3210. Because the user may enter parameter values, or import a service template, it is possible to receive a specification that the agent cannot comply with using its currently available resources. The verify consistency step 3206 is where such a situation would be detected and dealt with.

At step 3210, a call/service provisioning plan is prepared based on service request and participant list, policy constraints, and the user's authority profile. If necessary, the service and network resource directory is consulted to obtain information necessary to complete the call/service provisioning plan. The call/service provisioning plan is the initial result of the local agent examining the template for the requested service and, based upon available resources (network and support), selecting a set of those resources that would allow the creation of the first-class communications component represented by the template. The creation of this plan is the essence of orthogonal control. The method 3200 then proceeds to decision step 3212.

At decision step 3212, it is determined whether a valid provisioning plan is possible. If not, then the method proceeds to step 3208. If so, then the method proceeds to step 3214. It should be understood that the telecom/networking environment is dynamic. Even though the organizational policy profile and user authorizations profile would be consulted in the process of creating the provisioning plan, it is possible for such things as network errors, access card failures, etc. to be part of a current event which might invalidate a particular provisioning plan at the stated moment in time.

At step 3214, a communications area for linking a communications channel to the target traffic source/sink application is established. At step 3216, a call/service accounting record is established. At step 3218, call(s) is placed to the peer network element requesting bandwidth and QoS indicated by the provisioning plan.

At decision step 3220, it is determined whether all call(s) to peer network elements have been established. If not, then the method 3200 proceeds to step 3222 where the call provisioning plan is revised and the call record is updated before returning to step 3218. If all call(s) to peer network elements have been established at decision step 3220, then the method proceeds to step 3224 where the service template ID for the requested service to be implemented on the established channel is published.

At step 3226, the list of responding agents is noted for inclusion in the call/service accounting record. At decision step 3228, it is determined whether all agents have a copy of the service template for the service plan being requested. If not, then a copy of the service template is forwarded to the agent at step 3230.

At decision step 3232, it is determined whether all agents have accepted the call. It should be understood that responding agents will verify the validity of the call/service described by the service template for the capabilitites, policies, user authority and access rights for the domain that it represents. If it is determined that all agents have not accepted the call, then the method 3200 proceeds to decision step 3234.

At decision step 3234, it is determined whether to modify or terminate. It should be understood that if an exception is raised by any agent, the exception may be passed back to the calling user interface for modification of the call provisioning plan. Thus, the user may modify and resubmit or terminate the call request. If modification is chosen, then the method returns to step 3222. If the user modifies the call/service provisioning plan, the relevant changes are noted in the call/service accounting record and an attempt is made to establish the revised call/service plan.

If termination is selected at decision step 3234, then the method proceeds to step 3248. If the call is terminated, resources used are noted in the call accounting record along with the status "unable to complete" and the reason code and the call record is closed and archived.

At step 3236, if the call/service request is accepted by all participants, then the collaboration call/service continues by binding the source/sink application to the communication area reserved for this session. If the application is not active at the time final binding needs to occur, it can be launched by the collaboration communication facility.

At step 3238, the resources being used by the collaboration session are monitored. As noted by step 3240, the current status of resource consumption may be relayed back to the user environment either via an inquiry made from the use control panel to the session or via the triggering of an exception created by the violation of a policy, use plan or authorization constraint.

At step 3242, the progress and status of the ongoing call/service is monitored by the agents. As noted by step 3244, the status may be accessed by inquiry. The agents may also raise an exception up to the user level via the message/alarm event mechanism so that a user can intervene.

At decision step 3246, it is determined whether the call/service is finished. If not, then the method 3200 returns to step 3238. If so, then the method 3200 proceeds to step 3248. At step 3248, the service is discontinued. At step 3250, reconciliation of resource accounting between the agents occurs. At step 3252, common service supplier entities are advised of the completed call/service accounting record. At step 3254, the circuit is released. At step 3256, a user control panel reflects that the call has been terminated or completed. At step 3299, the method 3200 ends.

Figure 33:
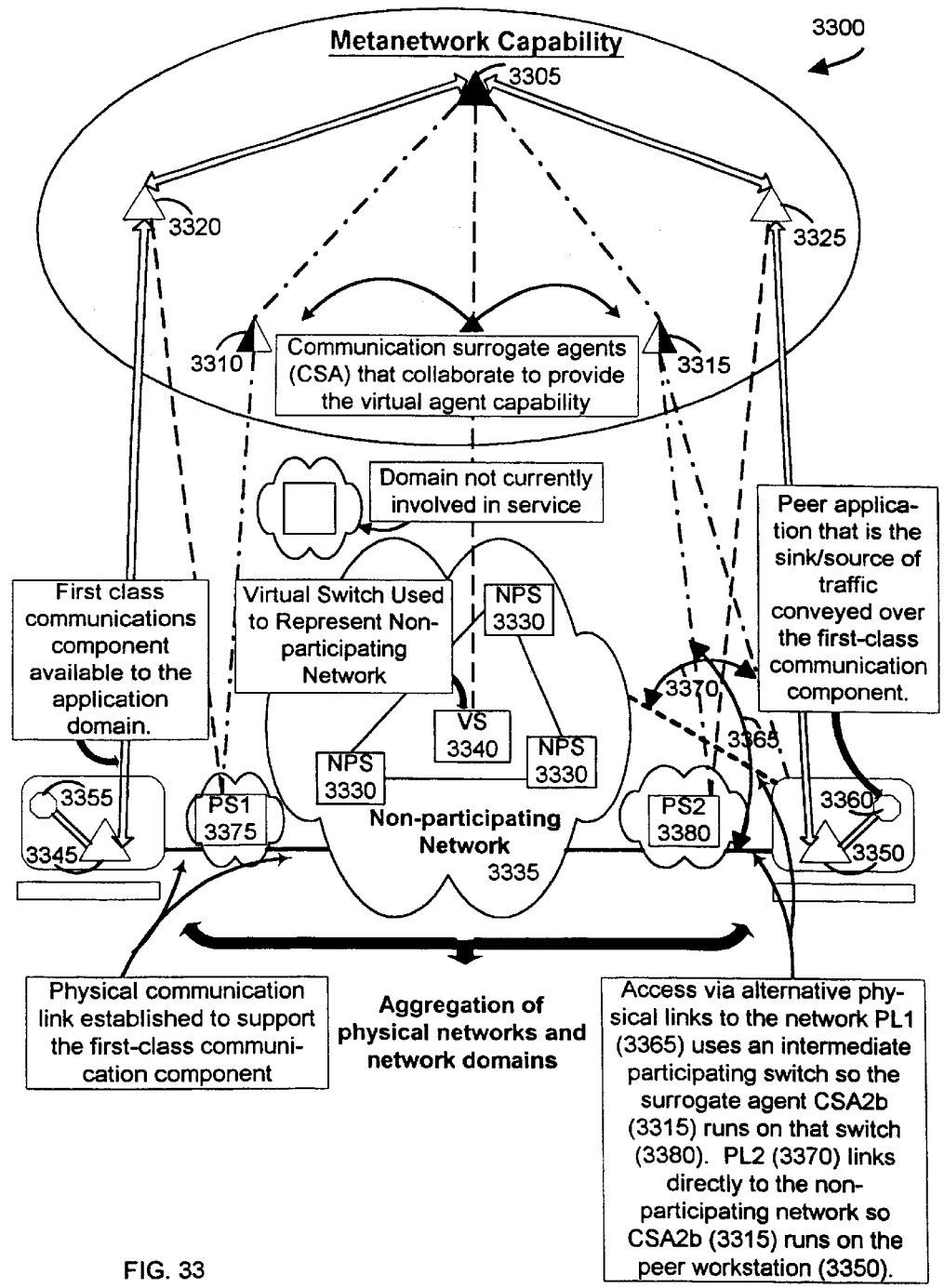
FIG. 33 is a diagram of the metanetwork capabilities of an embodiment of the present invention.

Referring now to FIG. 33, a diagram of the metanetwork capabilities of an embodiment of the present invention will be described. The metanetwork 3300 includes orthogonal control and peer agent collaboration. The metanetwork comprises a collaborating virtual agent 3305 comprising collaborating surrogate agents 3310 and 3315. The metanetwork 3300 further comprises collaborating agents 3320 and 3325. The metanetwork 3300 may further comprise non-participating switches (NPS) 3330 in a non-participating network 3335 represented by a virtual switch 3340. The metanetwork may further comprise peer agents 3345, 3350 and peer applications 3355 and 3360. The metanetwork may further comprise physical links 3365 and 3370. The metanetwork may further comprise participating switches 3375 and 3380.

Peer agents are monitors and quality assurance facilitators of the bandwidth used to support the collaborative communication as well as the local domain representative for resources used to support the services (i.e., for a conferencing service component, the agent might use a resource discovery and bind protocol such as Salutation to find a local network printer to provide hardcopy support to the local conference member or members within its domain). In these roles, the types of communications between agents can be more diverse than simply quality of service monitoring and resource accounting for associated domains.

It should be understood from the foregoing description that the present invention includes the following novel features: a self-organizing peer collaboration pattern; orthogonal control (implemented via cooperating active agents); first-class communication links (described by service templates); and dynamic federation of cooperating agents (via virtual path or virtual circuit identifier).

It should be further understood that the primary network focus of the present invention is multi-protocol over ATM with non-ATM edge networks.

The architecture of the present invention is a metanetwork architecture designed to support dynamic, on-demand collaboration environments over virtual private networks that utilize links through a combination of public and private network domains (some of which may be non-participating) incorporating either an intranet, extranet, or internet organizational orientation and which can change the orientation under user control subject to programmable policy constrains.

It should be further understood that the present invention utilizes a two-stage notion of service creation which provides a first-class communication link between collaborating end users created by active agents executing on the end user work stations (or their surrogates) and some number of active agents executing on some (0 to all) intervening switching devices and some (0 to N) supporting application or network servers collectively agreeing to an interpretation of the service requested as it relates to the quality of service for the communication link, the amount of bandwidth, the type of supporting network functionality required and supporting application servers involved.

It should be understood that one of the novel techniques of the present invention is the use of the "Self-organizing Peer Collaboration" control pattern and controlled execution environments which provides the equivalent of a virtual machine for implementing services. The present invention further includes establishment of metanetwork characteristics through the implementation of first class communication links through the orthogonal control exercised by the agents over the encompassed network domains and the exercise of metanetwork control via the reverse mapping of real network control information into the virtual network domain by the agent.

The present invention further utilizes the following signaling: 1) Peer signaling between active agents cooperating to support a service between collaborating peers, and 2) Network signaling between an active agent and the participating device and network domain that it is associated with. The latter form of signaling is specific to the environment of the "local" domain with which the active agent is associated. The peer signaling between cooperating active agents is based on specially identified packets that conform to the specifications of the base transport protocol that is associated with the local domain. Signaling packets can be reconfigured for different base transport protocols via a gateway service. The signaling mechanism implementation involves peer signaling packet detection. Handling of the peer signaling packet is slightly varied between switching elements and end elements (user stations or application/network servers). For the switching elements, peer signaling packets are detected and cloned. The original signaling packet is switched or routed by the device while the cloned signaling packet is deposited in a memory repository keyed by the virtual circuit or virtual path identifier. The use of the virtual path or virtual circuit identifier binds the subsequent actions of the agent interpreting the service request template to the communications channel. The action for end elements simply involves the separation of peer signaling packets from other packets associated with the virtual circuit or path, prior to the peer-signaling packets being deposited in a memory repository keyed by the virtual circuit or virtual path identifier. Additionally, agents may cause the creation of secondary communication links in support of their role in supporting the requested service. These secondary links need not (but may if required) participate in the logical signaling bus which connects the cooperating agents connected by the primary communications link which delivers the requested service. The combination of primary plus required secondary communication links function as a logical bus for peer signaling communications. All cooperating agents can listen to all signaling messages sent between cooperating peer agents and can insert messages that all other cooperating agents can hear.

Under the present invention, it should be understood that there are two major architectures for implementing a signaling system in-band or out-of-band, also called common channel signaling. Although not a requirement, the evolution of industry architectures and practices have tended to associate common channel signaling with the telephony industry and in-band signaling with the data networking industry. As the two industries converge with telephony offering broadband networks and multiple services and transport over ATM and data networking getting into such things as voice traffic over IP networks, the need to bridge networks utilizing the two types of signaling is becoming increasingly important. The present invention of a peer-oriented control and service infrastructure provides an architectural mechanism for integrating networks utilizing both types of signaling in order to support the metanetwork capability. The mechanism is provided by the implementation of orthogonal control that utilizes a provisioning plan step followed by an agent controlled call setup and service establishment steps. The use of intelligent agents in this process provides the basis for being able to bridge networks utilizing these different signaling models.

It should be understood that the two-stage service creation (Call Setup/Service Setup) model is implicit in the flowchart of FIGS. 32A–32B describing the collaborative call establishment process. Simply put, based on a provisioning plan the required circuits are setup first then the interpretation or "service" is created. This two step process allows for standards-based circuit setup independent of carrier or domain specific service setup. This allows for the establishment of first-class communication components across networks and network domains that might not support the requested service offering on their own.

With regard to QoS mechanism integration (Call Setup/Client Subscription), it should be understood that there are two major models for requesting QoS for a communication link. Requesting a QoS at call setup time is used in the ATM specification while the client subscription model is specified for the TCP/IP Internet by the IETF. Again, utilizing the intelligent agents working from a call/service provisioning plan allows for accommodating either or both models within the metanetwork capability.

With regard to the role of service templates and agent based orthogonal control in establishing first class communication links for the application environment, the basic role of service templates is indicated in FIGS. 32A–32B and 33. The service template describes the first-class communication object that the peer-oriented control and service creation infrastructure offers to the application domain. The abstract first-class communication object description is interpreted by the local agent to come up with a call/service provisioning plan that can be setup utilizing available communication links. This interpretation of abstract call/service into specific network services is a major portion of the orthogonal control mechanism. The other part is the provisioning of support applications or services required by the service portion of the call/service pair. This provisioning plan approach allows great flexibility for agents to utilize various infrastructures in order to support the first-class communication component being requested.

It should be understood that the present invention allows a user to multiplex and change their telecommunications services, thus creating a great value to the user. The user is then in a position to bargain with carriers for bandwidth rather than bargaining with carriers for services. The user is able to jump between networks such as the Internet, ATM, frame relay, to name a few.

In one embodiment of the present invention, control cells are inserted into the data stream, such as ATM, to control peer agent creation and monitoring of the service in a manner that is benign to the normal functioning of networks (participating and non-participating) used to create the service. Non-participating network elements are unaware of these control cells or ignore these control cells and route them through the non-participating network as data. Participating network elements are actively aware of these control cells and adjust the service and make decisions according to these control cells.

The present invention has been described in relation to particular embodiments which are intended in all respects to be illustrative rather than restrictive. Those skilled in the art will understand that the principles of the present invention may be applied to, and embodied in, various alternative embodiments.

Alternative embodiments will become apparent to those skilled in the art to which the present invention pertains without departing from its spirit and scope. Accordingly, the scope of the present invention is described by the appended claims and supported by the foregoing description.

What is claimed is:

1. In a telecommunications and data network environment including non-participating elements and participating elements, a method for providing a telecommunications service between a first peer element connected to the telecommunications network environment and a second peer element connected to the telecommunications network, comprising the steps of:

receiving at the first peer element an indication of the type of telecommunications service to be provided between the first peer element and the second peer element;

determining a telecommunications service template in association with the indicated telecommunications service, the telecommunications service template including instructions for configuring the non-participating elements of the telecommunications network environment to provide the indicated telecommunications service and instructions for configuring the participating elements of the telecommunications network environment, the telecommunications service template further comprising routing instructions for the non-participating elements of the telecommunications network environment and routing instructions for the participating elements of the telecommunications network environment;

executing the instructions to configure the participating elements and non-participating elements of the telecommunications network environment to provide the telecommunications service; and transmitting data between the first peer element and the second peer element via a predefined transmission protocol indicated by the telecommunications service template, the data including the routing instructions for the non-participating elements of the telecommunications network environment in a first portion of the predefined transmission protocol and the routing instructions for the participating elements of the telecommunications network environment in a second portion of the predefined transmission protocol.

2. The method of claim 1 wherein the first peer element and second peer element are computer systems.

3. The method of claim 1 wherein the predefined transmission protocol is asynchronous transfer mode (ATM), and access protocols is a second transmission protocol.

4. The method of claim 1 wherein the indication received by the first peer element is in response to a user dragging and dropping a telecommunications service icon associated with the telecommunications service template.

5. The method of claim 1 wherein the first portion of the predefined transmission protocol is a header portion.

6. The method of claim 1 wherein the second portion of the predefined transmission protocol is a payload portion.

7. The method of claim 1 wherein the participating elements are connected in an active network such that the participating elements may receive communications data from each other and transmit communications data to each other.

8. The method of claim 7 wherein the communications data comprises status information and routing information.

9. The method of claim 1, further comprising the step of connecting the first peer element to the network via a first network interface and connecting the second peer element to the network via a second network interface.

10. The method of claim 9, wherein the first network interface and the second network interface comprise a first network interface card and a second network interface card, respectively.

11. A system for providing a telecommunication service between a first peer element and a second peer element, the system comprising:

a first peer element connected to a first network interface, wherein the first peer element comprises means for determining a telecommunications service template in association with the telecommunications service, the telecommunications service template comprising instructions for configuring the non-participating network to provide the telecommunications service and instructions for configuring the participating network, the telecommunications service template further comprising routing instructions for the non-participating network and the participating network, and an executing means to configure the participating elements and non-participating elements of the telecommunications network environment to provide the telecommunications service;

a second peer element connected to a second network interface;

at least one participating network interconnecting first network interface and the second network interface; and at least one non-participating network interconnecting first peer clement and the second peer element and an edge network that is non-participating.

* * * * *